United States Patent
Gell et al.

(10) Patent No.: US 11,258,688 B2
(45) Date of Patent: Feb. 22, 2022

(54) NETWORK PATH DETERMINATION MODULE, NETWORK PATH DETERMINING METHOD THEREFOF, AND NON-TRANSITORY STORAGE MEDIUM THEREOF

(71) Applicant: Taiwan Semiconductor Manufacturing Co., Ltd., Hsinchu (TW)

(72) Inventors: David Gell, San Diego, CA (US); Ahmed ElArabawy, San Diego, CA (US); Yiliang L. Bao, San Diego, CA (US)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 437 days.

(21) Appl. No.: 16/403,644

(22) Filed: May 6, 2019

(65) Prior Publication Data

US 2019/0260658 A1 Aug. 22, 2019

Related U.S. Application Data

(63) Continuation of application No. 15/060,455, filed on Mar. 3, 2016, now Pat. No. 10,291,503, which is a
(Continued)

(51) Int. Cl.
*G06F 16/00* (2019.01)
*H04L 12/26* (2006.01)
(Continued)

(52) U.S. Cl.
CPC .......... *H04L 43/0882* (2013.01); *G06F 3/064* (2013.01); *G06F 3/0605* (2013.01);
(Continued)

(58) Field of Classification Search
CPC .................................................. G06F 16/1844
(Continued)

(56) References Cited

U.S. PATENT DOCUMENTS

| 2006/0159020 | A1* | 7/2006 | Porat | H04L 41/0856 370/235 |
| 2014/0280829 | A1* | 9/2014 | Kjendal | H04L 43/028 709/223 |
| 2014/0282823 | A1* | 9/2014 | Rash | H04L 63/20 726/1 |

* cited by examiner

*Primary Examiner* — Alexandria Y Bromell
(74) *Attorney, Agent, or Firm* — JCIPRNET

(57) ABSTRACT

The disclosure provides a network path determination module, a method of determining a network path, and a non-transitory storage medium which stores computer readable instruction to execute functions related to the method of determining a network path. In an aspect, the network path determination module includes not limited to: a first port; a non-transitory storage medium; and a processor coupled to the non-transitory storage medium, configured at least to: receive, through the first port, a requested generated by a detected data flow to create a forwarding entry in a network node for the data flow; retrieve a current network topology and a network status; select a network path based on the current network topology and the network status; generate a network control instruction based on the network path which has been selected; and execute the network control instruction to forward the data flow on the network path.

14 Claims, 29 Drawing Sheets

Related U.S. Application Data continuation-in-part of application No. 14/812,859, filed on Jul. 29, 2015, now Pat. No. 10,341,208, which is a continuation-in-part of application No. 14/038,123, filed on Sep. 26, 2013, now Pat. No. 9,633,041.

(60) Provisional application No. 62/127,683, filed on Mar. 3, 2015, provisional application No. 62/030,496, filed on Jul. 29, 2014.

(51) Int. Cl.
| *H04L 29/08* | (2006.01) |
| *G06F 3/06* | (2006.01) |
| *H04L 12/911* | (2013.01) |
| *H04L 12/24* | (2006.01) |
| *H04L 12/729* | (2013.01) |
| *G06F 16/182* | (2019.01) |
| *H04L 12/801* | (2013.01) |

(52) U.S. Cl.
CPC ............ *G06F 3/067* (2013.01); *G06F 3/0643* (2013.01); *G06F 16/1844* (2019.01); *H04L 41/5025* (2013.01); *H04L 45/125* (2013.01); *H04L 47/822* (2013.01); *H04L 67/1023* (2013.01); *H04L 67/1095* (2013.01); *H04L 67/1097* (2013.01); *H04L 43/04* (2013.01); *H04L 47/127* (2013.01)

(58) Field of Classification Search
USPC ........................................................ 707/634
See application file for complete search history.

NETWORK PATH DETERMINATION MODULE, NETWORK PATH DETERMINING METHOD THEREFOF, AND NON-TRANSITORY STORAGE MEDIUM THEREOF

CROSS-REFERENCE TO RELATED APPLICATIONS

This application is a continuation of application of and claims the priority benefit of U.S. application Ser. No. 15/060,455, filed on Mar. 3, 2016, now pending, which claims the benefit of U.S. provisional application Ser. No. 62/127,683, filed on Mar. 3, 2015. The prior application Ser. No. 15/060,455 is a continuation-in-part application of and claims the priority benefit of U.S. patent application Ser. No. 14/812,859, filed on Jul. 29, 2015, now pending, which claims the benefit of U.S. provisional application Ser. No. 62/030,496, filed on Jul. 29, 2014. The prior application Ser. No. 14/812,859 is a continuation-in-part application of and claims the priority benefit of U.S. patent application Ser. No. 14/038,123 filed on Sep. 26, 2013 now patented as U.S. Pat. No. 9,633,041. The entirety of each of the above-mentioned patent applications is hereby incorporated by reference herein and made a part of this specification.

BACKGROUND

The present invention generally relates to the field of distributed file systems and, in particular, to the placement of file blocks within a distributed file system.

As people have become increasingly connected to the Internet from home, at work or through mobile devices, more data is consumed through web browsing, video streaming, social networking, instant communication and e-commerce. At the same time, people generate more data by publishing photos, uploading videos, updating social network status, and purchasing goods and services on the Internet. This large amount of data is referred to as "webscale" data or "big data." Known systems exist for the storage and processing of big data in a distributed manner across large numbers of computing and/or storage devices, which may be maintained in one or more clusters. An example of a distributed file system is the Google File System (GFS), which is a scalable distributed file system built with a large number of inexpensive commodity hardware devices for supporting large distributed data-intensive applications. GFS is used by Google's MapReduce programming model in which programs are automatically parallelized and executed on one or more large clusters built with commodity computers.

Another example of a distributed file system is the open source Apache Hadoop, which is a popular software framework that supports data-intensive distributed processing on large clusters of commodity hardware devices. Some companies currently use Apache Hadoop not only for their own distributed data storage and processing, but to offer distributed data storage and processing to customers via cloud-based services. Distributed file systems, such as Hadoop, save large data sets of big data by dividing a large data set into smaller blocks and storing the blocks in multiple nodes within a cluster that contains a large number of computers, each with its own data storage. To reduce the network bandwidth required for the processing of the large data set, the necessary data processing code is moved to the computer node that contains the data blocks. This strategy of moving computation to the data, instead of moving data to the computation, seeks to maximize data locality and reduce unnecessary network transfers for the processing of the stored data.

A typical distributed file system cluster may be comprised of many racks of computers, where each rack contains a number of computers, such as 50 computers. Each computer on a rack is connected to the "top of rack" (ToR) switch on the rack. The top of rack switch on each rack is also connected to one or more aggregation or core switches in the cluster. Together the ToR, aggregation and core switches provide interconnectivity among all computers in the cluster, and access to the external world via one or more gateways connected to the cluster.

In such a distributed file system, one of the computers acts as a file manager node and the other computers act as storage nodes. The file manager node acts as a master that decides where blocks of a large file should be replicated when a file is created or appended. The file manager node also decides where extra replicas of a block should be stored when a storage node storing a block fails or when the replication value of the file is increased. By dividing a large file into blocks and storing multiple copies of each block in different storage nodes, the distributed file system is able to store a very large file (e.g., from terabytes to petabytes) reliably in a large cluster of computers running as storage nodes. Storage nodes can be added as needed to increase the storage capability of a cluster, and failed storage nodes can be replaced and the replicas of the file blocks stored in the failed storage nodes can be accessed from the other storage nodes in which they are stored.

Typically, the distributed file system handles a file storage request from a client of the system by creating an entry in the file manager node metadata to identify the new file. The client then breaks the data of the new file into a sequence of blocks. Then, starting with the first block of the new file and block by block, the client asks the file manager node for permission to append a new block to the new file, and the client then receives from the file manager node the ID of the new block and a list of the storage nodes where the block should be replicated.

After the client receives the list of storage nodes where the new block should be replicated, the client prepares a block write pipeline, such as: the client will send the ID of the new block and the IDs of other storage nodes to the 1st storage node, and request it to prepare to receive the new block; the 1st storage node will request the 2nd storage node to prepare to receive the new block, and the 2nd storage node will request the 3rd storage node to prepare to receive the new block, and so on so forth until all storage nodes are ready to receive the new block. After the block write pipeline is prepared, the client initiates the block copies by copying the new block to the 1st storage node. Next, the 1st storage node copies the new block to the 2nd storage node, and so on, until the block is replicated the number of times specified by the replication factor of the file.

The placement of file block replicas is important to the reliability and performance of the distributed file system. While placing the replicas of a block in storage nodes located in different racks can improve reliability against rack failure, it may increase traffic loads in the top of rack switches and the core switches connecting the pipeline of storage nodes during block replication. Hadoop provides a rack-aware replica placement policy to improve data reliability, availability and some reduction of network bandwidth utilization. The default Hadoop rack-aware block placement policy tries to simultaneously meet two goals: (a) to place the replicas of a block in more than one rack to improve reliability against a single rack failure; and (b) to place multiple replicas in a single rack to reduce inter-rack traffic during block creation.

Unfortunately, such a block placement policy does not consider the real time status and conditions of the network and treats all the network connections between the storage nodes and the top of rack switches in the same manner. For example, a block replica may be designated for placement in a storage node even when the block replication pipeline would be congested at the network connection to/from that storage node. Furthermore, once a block placement decision has been made, no effort is made in the network to prepare for and support the upcoming transfers required by the block placement pipeline. The block replication transfer operations are left to contend and compete with all other traffic on the network. Accordingly, such a block placement policy may lead to inefficient use of the cluster network for block placement and may lead to increased congestion in the network connections to/from storage nodes and in the top of rack switches and the core switches of the cluster.

This may also lead to a problem for client users, such as clients of a cloud-based file distribution and data processing system, that have certain timing and service level requirements related to the client's Service Level Agreement (SLA) and/or contracted Quality of Service (QoS) requirements. This is because the default block placement policy does not consider any notion of service assurance via the client's Service Level Agreement (SLA) and/or and QoS requirements during the block placement decision process. Accordingly, the block placement decision may not satisfy the client's SLA and QoS requirements because of network congestion to/from the various storage nodes in the block placement pipeline and in the ToR and core switches.

SUMMARY

In one aspect, the disclosure provides a network path determination module which includes not limited to: a first port; a non-transitory storage medium; and a processor coupled to the non-transitory storage medium, configured at least to: receive, through the first port, a requested generated by a detected data flow to create a forwarding entry in a network node for the data flow; retrieve a current network topology and a network status; select a network path based on the current network topology and the network status; generate a network control instruction based on the network path which has been selected; and execute the network control instruction to forward the data flow on the network path.

In another aspect, the disclosure provides a method of determining a network path used by a network path determination module, the method includes not limited to: receiving a requested generated by a detected data flow to create a forwarding entry in a network node for the data flow; retrieving a current network topology and a network status; selecting a network path based on the current network topology and the network status; generating a network control instruction based on the network path which has been selected; and executing the network control instruction to forward the data flow on the network path.

In another aspect, a non-transitory computer readable medium is provided that stores instructions that, when executed by a processor, perform functions including receiving a requested generated by a detected data flow to create a forwarding entry in a network node for the data flow; retrieving a current network topology and a network status; selecting a network path based on the current network topology and the network status; generating a network control instruction based on the network path which has been selected; and executing the network control instruction to forward the data flow on the network path.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

File block placement in a distributed file system (DFS) is provided in which network conditions are taken into account when determining the placement of file blocks. In an aspect, the determined file block placement is facilitated by utilizing Software Defined Networking (SDN) enabled networking functions. In an aspect an enhanced DFS block placement algorithm obtains the real time cluster topology from the SDN controller of a software defined network, obtains the real time status of the network, evaluates the impact of potential block placement combinations on a specific client's SLA and QoS requirements, selects an optimal block placement based on the real time cluster topology and network status, and, optionally, allocates resources in the SDN network accordingly in support of the upcoming transfers associated with the block placement selection.

Figure 1:
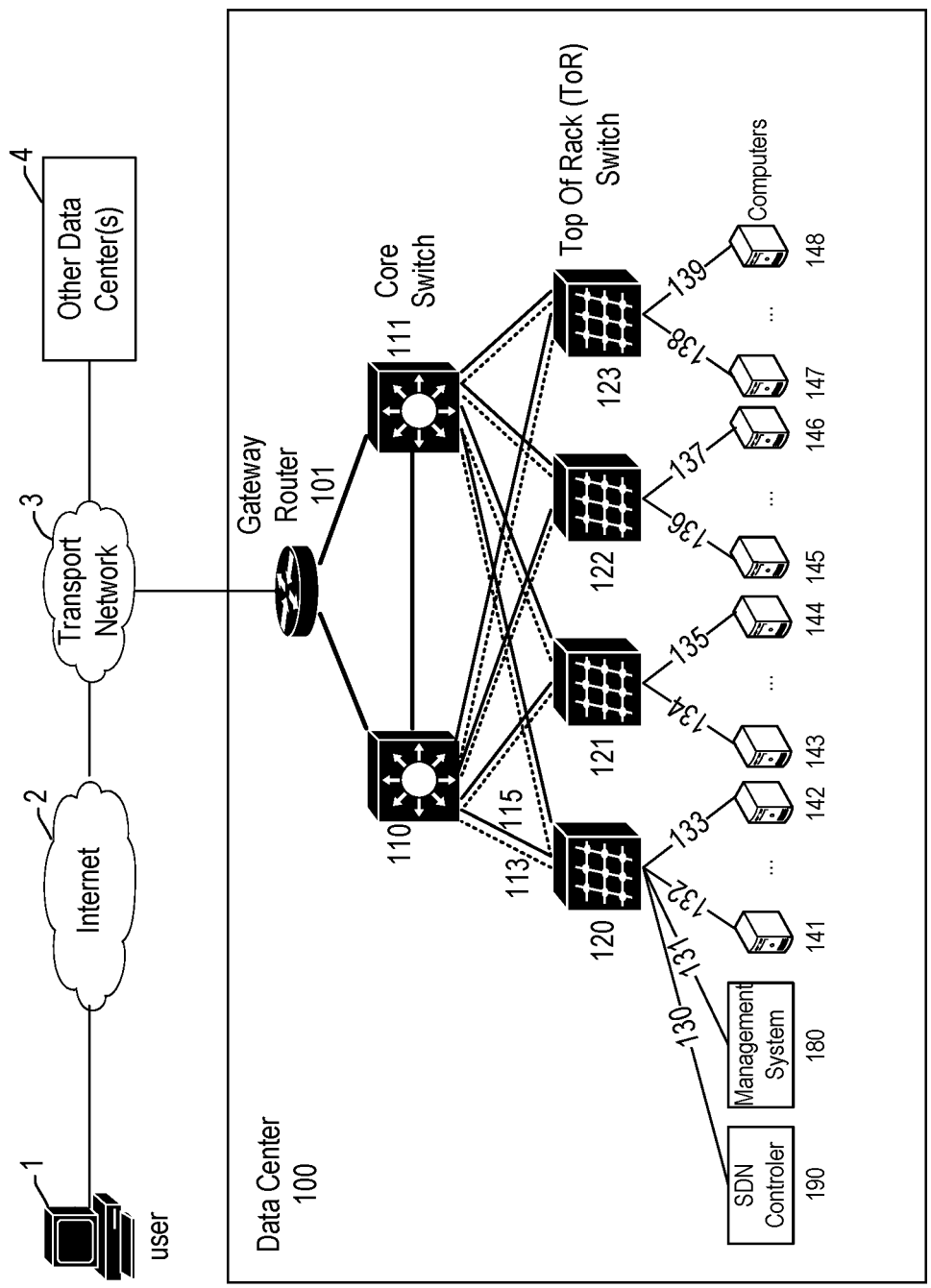
FIG. 1 is a block diagram of a distributed file system network in accordance with aspects of the invention.

FIG. 1 is a block diagram of a distributed file system (DFS) in which aspects disclosed herein may be implemented. As seen in FIG. 1, data center 100 is a cluster made up of many racks of computers (141-148, 180 & 190), each rack containing numerous computers. Each computer on a rack is connected to a top of rack switch (120-123) on the rack, and the top of rack switch on each rack is connected to one or more core switches (110, 111) of the data center 100. Data center 100 is connected to the Internet 2 through a transport network 3. A ToR (top of rack) switch is connected to multiple core switches with multiple connections to increase network reliability and performance of the cluster. The core switches 110 and 111 are interconnected with each other to exchange traffic between ToR switches (120-123). The core switches 110, 111 are connected to a gateway router 101 that provides network connectivity to the Internet 2 and other data centers 4. Each computer (141-148) may run processes to implement the distributed file system function and the data processing function of the cluster, such as a task monitor process and a storage node process for implementation of the DFS functionality of the cluster. In the example of Hadoop, these processes are known as the TaskTracker and the DataNode functions, respectively.

In an aspect, each task monitor and storage node pair runs on a dedicated computer. For example, a task monitor and a storage node may run on physical computer 141. Alternatively, multiple task monitor and storage node pairs may run simultaneously on a single physical computer. For example, a task monitor 1, a storage node 1, a task monitor 2 and a storage node 2 may all run on computer 141. Computer operating system virtualization, such as VMware virtual machines or similar systems, may be used to support multiple task monitor and storage node pairs running on a single physical computer. In an aspect, one or more of computers 141-148 may run a file manager node (referred to as NameNode in Hadoop) process to oversee file system management and determine block file placement among the storage nodes. Alternatively, the file manager node function may reside in a dedicated computer, such as computer 180, separate from computers running task monitor and/or storage node processes.

The computers in the data center can also run other tasks. For example, computer 190 may run software defined network (SDN) controller software to function as a SDN controller for the cluster network of data center 100, and computer 180 may run tasks to operate as a data center management system server, e.g., element management system (EMS), network management system (NMS), or operations, administration, and maintenance (OAM) system, to support fault management, configuration management, accounting management, performance management and security management, among other tasks. As described above, a two-tier switch network consisting of ToR switches 120-123 and core switches 110, 111 is used to connect the computers of the cluster. It should be appreciated that other types of network topologies can also be used for this purpose. For example, a three-tier switch network may be used that consists of ToR switches, End of Row (EoR) switches and core switches. In such a three-tier switches network, the ToR switches are connected to the EoR switches and the EoR switches are connected to the core switches. Of course, the cluster of data center 100 in FIG. 1 is exemplary and other configurations of computer, switches and network interconnections may be utilized in practicing aspects of the present invention. A data center may use, for example, a fat-tree or a mesh network architecture. Other data center 4 may have a similar network architecture, and may be in communication with data center 100. In an aspect, other data center 4 can participate in file block placement processes described herein.

Figure 2:
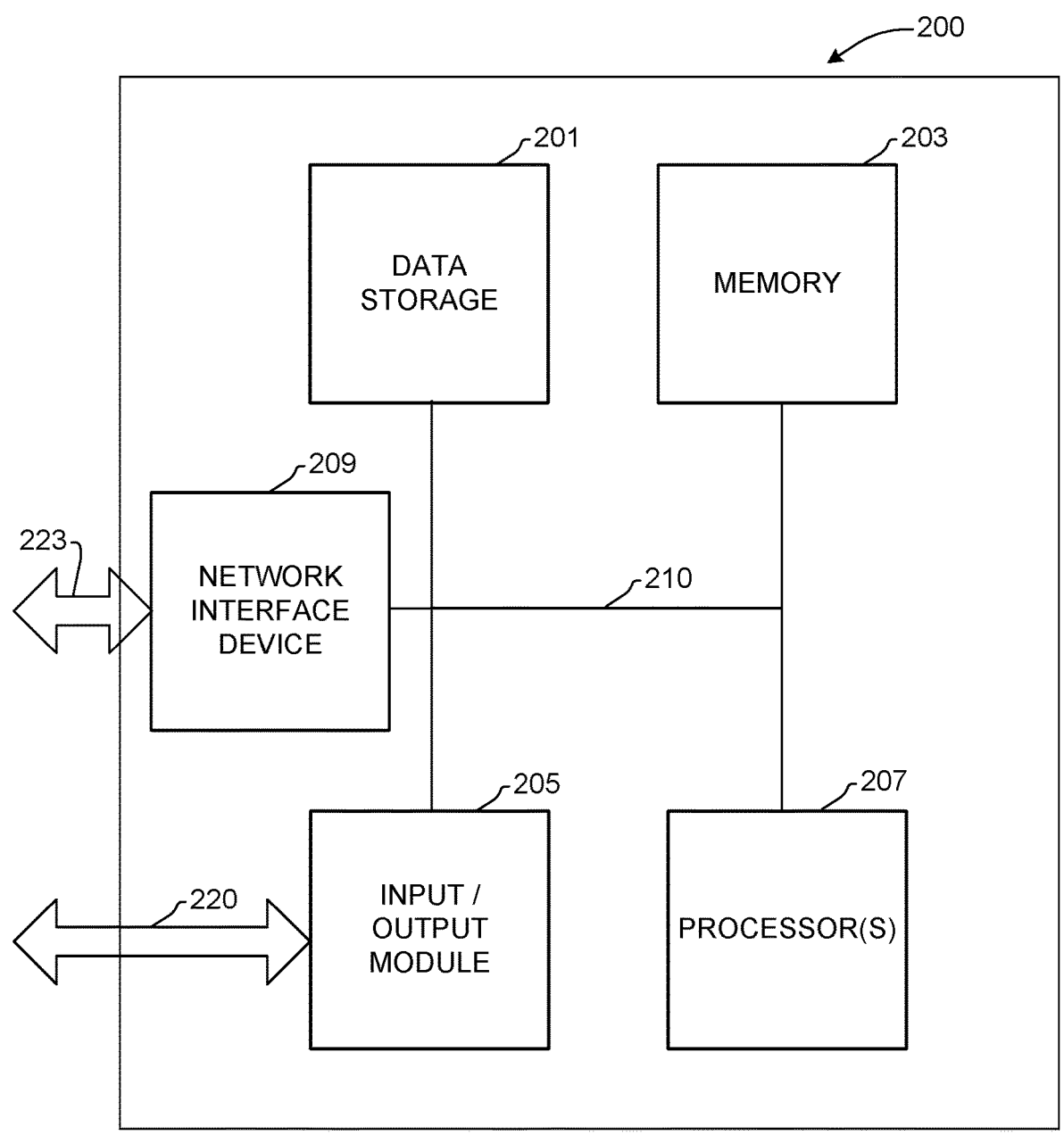
FIG. 2 is a block diagram of a network node in accordance with aspects of the invention.

FIG. 2 is a block diagram of a network node (or computer) in accordance with aspects of the invention. The computer 200 may be used, for example, to implement one of computers 141-148, 180 & 190 of data center 100 of FIG. 1. In FIG. 2, computer 200 includes a bus 210 or other communication device for communicating information, and a processor 207 coupled with bus 210 for processing information. Computer 200 also includes a memory 203, such as a random access memory ("RAM") or other dynamic storage device, coupled to bus 210 for storing information and instructions to be executed by processor 207. Memory 203 may also be used for storing temporary, variable or other intermediate information during execution of instructions by processor 207. Computer 200 further includes a data storage device 201, such as a magnetic disk drive, optical disk drive or solid state memory device, coupled to bus 210 for storing information and instructions.

Computer 200 may also include input/output (I/O) module 205 which optionally may be connected by connection(s) 220 to a display device (not illustrated), such as a cathode ray tube ("CRT"), liquid crystal display ("LCD"), light-emitting diode ("LED") display, organic light emitting diode (OLED) display, or other form of display for displaying information to a computer user. An input device, such as, for example, a keyboard, a mouse, a pointing device, a number of buttons, a microphone, and/or other inputs may also be optionally coupled to computer 200 via I/O module 205 for saving information to data storage device 201 and/or for communicating information and command selections to processor 207.

Network interface device 209 is also provided in computer 200 for one or more network connections to other computers, switches and devices in data center 100. Network interface device 209 may include one or more network interfaces that support wired and/or wireless connection(s) 223, and that may communicate via one or more protocols. For example, in an aspect, network interface device 209 may include one or more wired Ethernet network interfaces for connection(s) 223 that communicate via transmission control protocol (TCP)/internet protocol (IP). In an aspect, network interface device 209 may include one or more wireless network interfaces for connection(s) 223 that may communicate via WiFi, Bluetooth, LTE, WiMAX, CDMA, OFDM, or other wireless protocols. In an aspect, computer 200 may receive file blocks from other computers in data center 100 via network interface device 209, and may also send file blocks to other computers in data center 100 via network interface device 209.

According to an aspect, enhanced block placement functionality is performed by computer 200 by processor 207 executing one or more sequences of one or more instructions contained in memory 203. Such instructions may be read into memory 203 from another machine-readable medium, such as data storage device 201, or from an external machine-readable medium via I/O module 205. In an aspect, processor 207 may represent multiple processors arranged in a multi-processing arrangement to execute the sequences of instructions contained in memory 203, or received from another source via bus 210. In an alternative aspect, hard-wired circuitry may be used in place of or in combination with software instructions to implement the invention. Thus, embodiments of the invention are not limited to any specific combination of processors, hardware circuitry and software.

The term "machine-readable medium" as used herein refers to any medium or device that participates in providing instructions to processor 207 for execution. Such a medium may take many forms, including, but not limited to, non-volatile media, volatile media, and transmission media, such as a wired or wireless link. Non-volatile media include, for example, optical or magnetic disks, such as data storage device 201. Volatile media include dynamic memory, such as memory 203. Transmission media include coaxial cables, copper wire, and fiber optics, including the wires that comprise bus 210. Transmission media can also take the form of electromagnetic waves, acoustic waves, or light waves, such as those generated during radio frequency and infrared data communications. Common forms of machine-readable media include, for example, floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory device, chip or cartridge, a carrier wave, or any other medium from which a computer can read instructions or data. It should be appreciated that computer 200 may include other known components, devices and may be configured in other arrangements, while still supporting the implementation of the present invention.

Figure 3:
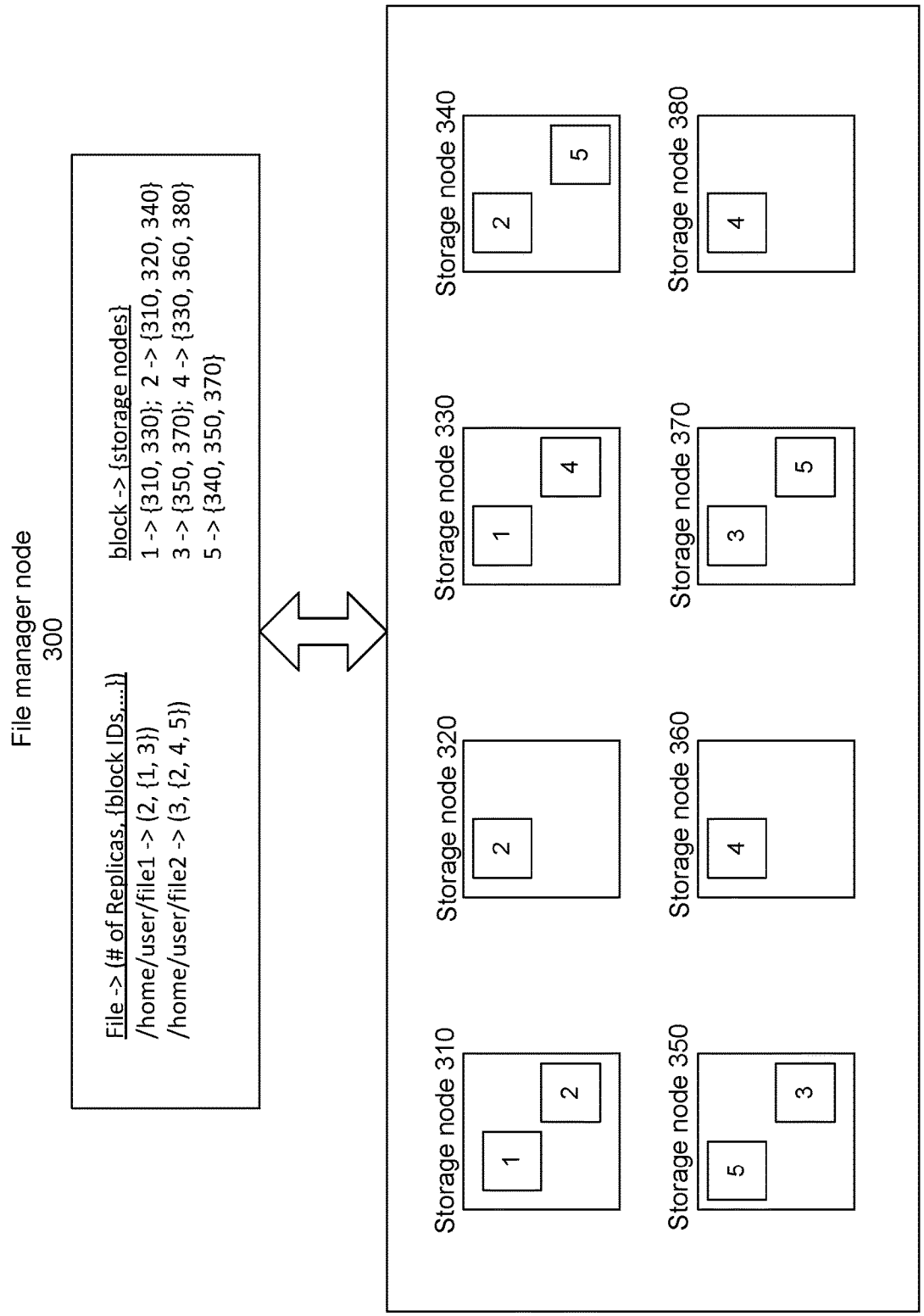
FIG. 3 is a block diagram of an exemplary block file placement in a distributed file system network in accordance with aspects of the invention.

FIG. 3 is a block diagram of an exemplary block file placement in a distributed file system network in accordance with aspects of the invention. The block diagram of FIG. 3 can provide a functional depiction of the cluster of data center 100 of FIG. 1, in which one of computers 141-148 is acting as a file manager node, and other computers are acting as storage nodes. In this regard, the cluster is depicted in FIG. 3 as including functional nodes including file manager node 300, and storage nodes 310-380 which are interconnected by network connections as described above. The example shown in FIG. 3 is a functional example of how files are broken into blocks and how each block is replicated across multiple storage nodes. As mentioned above, a DFS stores large data files in smaller fixed size blocks across a cluster. In an aspect, the size of each file block is the same, such as 64 MB for example, except for the last file block which may be smaller depending on the last remaining data. In another aspect, the file blocks may be of different sizes. In an aspect, each file block is replicated to multiple storage nodes to provide redundancy against node or rack failure in the cluster.

In an aspect, file manager node 300 and storage nodes 310-380 operate in a master-slave architecture. In an aspect, the file manager node and storage node functionalities are implemented in software designed to run on computers. The file manager node operates as a master that manages the file system namespace and maintains the file system directory tree and the metadata for all the files and directories in the tree. The file manager node manages all the operations such as creating, opening, closing and renaming files and directories. The file manager node also determines the mapping of files to their component blocks and the mapping of each of the blocks to the storage nodes where they are physically stored. The storage nodes store the file blocks and provide block reading/writing access to all users of the DFS service such as data processing administration (TaskTracker in Hadoop), and DFS import/export utilities. Storage nodes periodically report the list of blocks they are storing back to the file manager node in the form of periodic heartbeat and block report messages.

In the example of file block distribution shown in FIG. 3, two files, "/home/user/file1" and "/home/user/file2" are stored in the DFS cluster. File manager node 300 stores the mapping of the block IDs associated with each file along with the number of block replicas designated for the blocks of each file. In addition, file manager node 300 stores the mapping of each block to the storage nodes in which it is stored, based on the designated number of replicas for the file of which that block is a component. As seen in FIG. 3, the file "/home/user/file1" is broken into block IDs 1 and 3 and each block for this file is replicated 2 times. Similarly, the file "/home/user/file2" consists of block IDs 2, 4 and 5, and each block for this file is replicated 3 times. As shown in the diagram, the blocks making up the two files are replicated and stored in storage nodes 310-380 in the cluster according to the "block→{storage nodes}" mapping shown in file manager node 300. As seen in the example shown in FIG. 3, block ID 1 of "/home/user/file1" is replicated in storage nodes 310 and 330, and block ID 3 of "/home/user/file1" is replicated in storage nodes 350 and 370. Similarly, block ID 2 of "/home/user/file2" is replicated in storage nodes 310, 320 and 340, block ID 4 of "/home/user/file2" is replicated in storage nodes 330, 360 and 380, and block ID 5 of "/home/user/file2" is replicated in storage nodes 340, 350 and 370, The DFS, such as that shown in FIG. 3, is designed to support local data processing at the site of the stored blocks, such as the MapReduce type of data processing in Hadoop. In an aspect, the file blocks stored in a DFS can be read in parallel by multiple processing tasks at the same time. The file manager node of the DFS provides a process monitor, such as the MapReduce JobTracker of Hadoop, with the location of each file block. The process monitor can use the file block locations to schedule the processing tasks to be performed on the nodes where a replica of a block is available. If a task processing a file block fails, the process monitor can reschedule the task to run in a different node containing a replica of the file block.

In this regard, the nodes in the cluster may communicate with each other over a TCP/IP connection(s). The process tracker function, the file manager node function and the storage node function expose their functionalities through interfaces such as the Remote Procedure Call (RPC) call. Each of these functions listens on a pre-configured TCP port and responds to the function call received on the TCP socket. For example, in Hadoop, Java application programming interfaces (APIs) are provided to encapsulate the RPC interfaces exposed by Hadoop MapReduce and Hadoop distributed file system (HDFS). With the Hadoop Java API, a data processing task can be programmed in the Hadoop MapReduce framework and such tasks can be easily scheduled to run in multiple nodes in the cluster. Such an API also enables programs to create and access files stored in the cluster without worrying about the internal details of the DFS. A client then uses the API to access the features and capabilities provided by the cluster. Many common utilities for file access and cluster maintenance are also provided.

Figure 4:
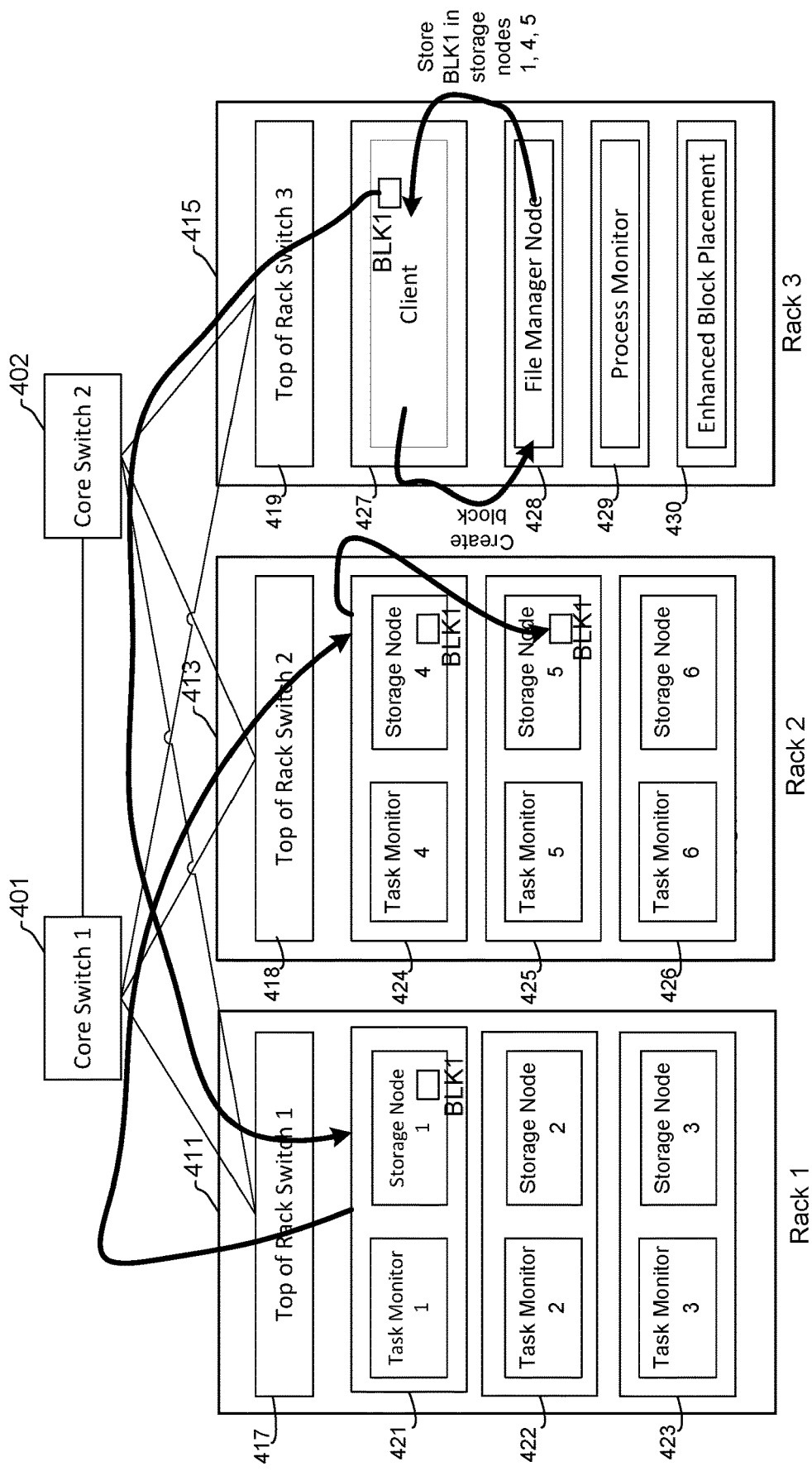
FIG. 4 is a block diagram showing network paths related to an exemplary block file placement in a distributed file system network in accordance with aspects of the invention.

FIG. 4 is a block diagram showing network paths related to an exemplary block file placement in a distributed file system network in accordance with aspects of the invention. FIG. 4 functionally depicts the file block replication process across multiple storage nodes in a distribution file system cluster. As seen in FIG. 4, three racks 411, 413 & 415 are shown, in which racks 411 and 413 contain three computers and a ToR switch. For example, rack 411 includes computers 421, 422 and 423, and ToR switch 417 which is connected to computers 421, 422 and 423. Each of the computers contained in racks 411 and 413 runs a task monitor process enabling it to support data processing of stored data and also runs a storage node process enabling it to function as a storage node for storage of file blocks. In this regard, the term "process" as used herein is used in the generic sense of a software procedure and the actual implementation may be in the form of an operating system process, a thread, a process implemented via a script, a daemon or other form of executable. The racks and switches of FIG. 4 may be implemented in the data center 100 of FIG. 1.

Rack 415 includes four computers 427, 428, 429 and 430 and a ToR switch 419. In the example of FIG. 4, computer 427 runs a client process enabling it to perform client tasks for a specific user of the distributed file system. In another aspect, the client process may be implemented in a computer external to data center 100, but in communication with data center 100. For example, the client process may be a client task that uses the distributed file system to store large data files in the distributed file system or to initiate data processing of data stored in the distributed file system. The client task may be performed on behalf of a user that is the operator of the distributed file system, or may be performed on behalf of a user that is external to the distributed file system and is utilizing the distributed file system via a cloud-based service. Computer 428 runs a file manager node process enabling it to function as the file manager node in the distributed file system cluster shown in FIG. 4, so as to control and track the mapping of files to their component blocks and the designation and mapping of blocks to storage nodes within the cluster. Computer 429 runs a process monitor process enabling it to function as the process monitor in the distributed file system cluster shown in FIG. 4, so as to control and monitor data processing tasks that may be distributed among the various task monitors operating in the computers of the cluster. Lastly, computer 430 runs an Enhanced Block Placement process enabling it to conduct enhanced placement of file blocks among the storage nodes in the cluster by also taking into account network conditions in the network paths to/from the various storage nodes and switches in the cluster.

The three ToR switches 417, 418 and 419 are each connected to both of core switches 401 and 402 for control and routing of data traffic among racks 411, 413 and 415, and for network connection of the cluster to an external network, such as the Internet or other data center(s). It should be appreciated that the configuration of functions and computers shown in FIG. 4 is exemplary and that other arrangements of the various functions within one or more computers are also possible for implementation of aspects of the invention.

FIG. 4 also depicts an example of file block replication and distribution among multiple storage nodes of the cluster. As described above, a file is stored in the distributed file system (DFS) as a sequence of blocks, all of which are the same size except, in some cases, the last block, and each file block is replicated in at least one storage node. In an aspect, the block size and replication factor may be configurable for each file. As the master node of the DFS, the file manager node decides where each file block should be replicated when the block is created. The file manager node also decides and designates where extra replicas of a block should be stored when a storage node storing the block fails or when the replication value of the file is increased.

When a client creates a new file in the DFS, it first requests the file manager node to create an entry in the file manager node metadata to identify the new file. The client then breaks the data of the new file into a sequence of blocks. Starting with the first block of the new file, and then block by block, the client asks the file manager node for permission to append a new block to the new file in DFS, and then the client receives from the file manager node the block ID of the new block and a list of storage nodes where the block is to be replicated. In the example of block creation shown in FIG. 4, computer 427 (as a client) first sends a request for the creation of new block to the file manager node 428. File manager node 428 then creates a new block ID of BLK1 in its metadata associated with the file, and determines that the new block should be replicated to storage node 1, storage node 4 and storage node 5, and returns this information back to client 427.

Client 427 then prepares a block write pipeline as follows: (1) the client is to send the new block ID and the IDs of other storage nodes (storage node4 and storage node5) to the storage node1, and requests storage node1 to prepare to receive the new block; (2) storage node1 is to request storage node4 to prepare to receive the new block, and the storage node4 is to request the storage node5 to prepare to receive the new block, and so on so forth until all designated storage nodes are ready to receive the new block. With the block write pipeline prepared, the client begins copies copying the new block to the storage node1 located in computer 421 of rack 411. As storage node 1 receives the new block, it begins copying the received portions of the block to storage node4 in computer 424 of rack 413, and so on, until the block is replicated the number of times specified by the designated replication factor for the file. Replicating file blocks in a pipeline fashion accelerates file creation and reduces the amount of processing the client needs to perform to store all replicas of the blocks of file. In the example shown in FIG. 4, the client copies the block to storage node1, storage node1 copies the block to storage node4, and storage node4 copies the block to the storage node5.

During file block replication and transfer to the designated storage nodes, each file block is divided into smaller portions referred to as packets. Each packet is typically the same size, such as 64 Kbytes for example. Once a storage node finishes receiving a file packet of a block from the previous storage node in the pipeline, it starts transmitting the file packet to the next storage node in the pipeline without waiting for all other file packets of the file block to be received.

Figure 5:
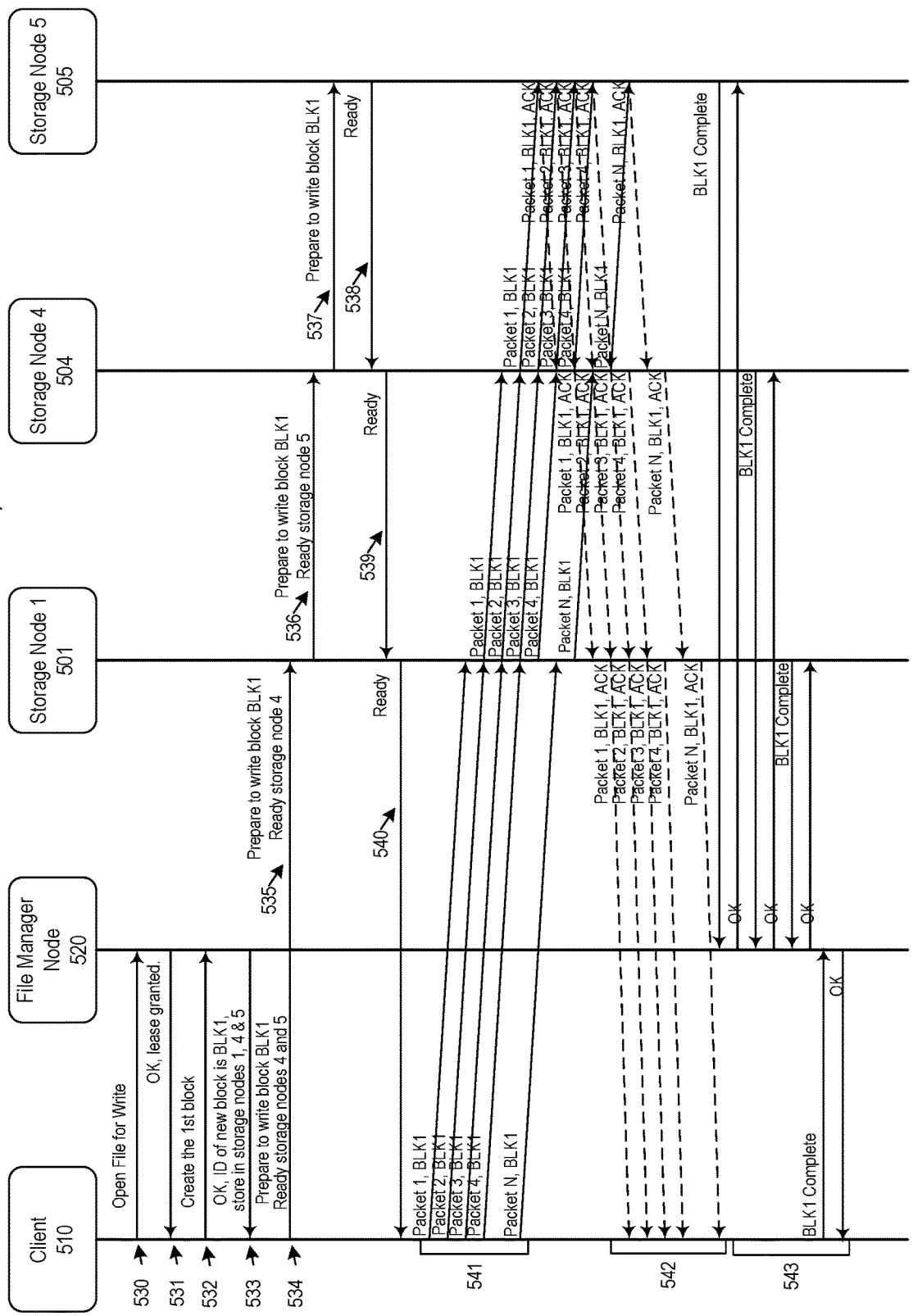
FIG. 5 is a sequence diagram showing block file creation and storage sequencing associated with an exemplary block file placement in a distributed file system network in accordance with aspects of the invention.

FIG. 5 is a sequence diagram showing block file creation and storage sequencing associated with an exemplary block file placement in a distributed file system network in accordance with aspects of the invention. FIG. 5 shows how the Client, the file manager node and the storage nodes of FIG. 4 interact to create the first block of a file and how that block is replicated across three of the storage nodes (1, 4 and 5). As shown in the FIG. 5, the process begins at step 530 in which Client 510 (corresponding to computer 427 in FIG. 4) sends a request to file manager node 520 (corresponding to computer 428 in FIG. 4) to open a new file for writing to the distributed file system (DFS) so that Client 510 can store a particular data file in the DFS. Next, file manager node 520 responds in step 531 with an OK to indicate that a lease was granted for Client 510 to write the new file in the DFS. In step 532, Client 510 partitions the file and creates the first block and sends the indication of the first block to file manager node 520 to obtain a block ID for the first block and a designation of the multiple storage nodes (referred to as the "pipeline" of storage nodes) in which replicates of the block are to be stored. In the example shown in FIG. 5, the new block is assigned a block ID of BLK1 by file manager node 520 and is designated by file manager node 520 to be replicated into storage node1 501, storage node4 504 and storage node5 505, and file manager node 520 replies to Client 510 with this information in step 533. Now that Client 510 has the storage node pipeline information from file manager node 520 for the first block BLK1, Client 510 proceeds in step 534 to send instructions to storage node1 501 to prepare to write block BLK1 and to ready storage node4 and storage node5 for writing of block BLK1.

As mentioned above, as each block of a file is sent to a storage node for storage, it is actually partitioned into smaller uniform-size packets for efficient transfer. In step 541, Client 510 sequentially initiates transfer of multiple packets (1, 2, . . . , N) that make up block BLK1 to storage node1 501. As depicted in FIG. 5, once storage node1 and each subsequent storage node in the designated pipeline for the block receives a packet, they then begin transmission of the packet to the next storage node in the pipeline, without waiting for receipt of the next packet of that block. Similarly, in step 542, as each storage node receives a packet it then sends a packet acknowledgment back to the previous storage node in the pipeline that sent the packet, and the previous storage node sends the acknowledgment back to its previous storage node until the packet acknowledgment is finally received at Client 510. As seen in step 543, as the last packet of the block is received at a storage node, the storage node sends a block complete acknowledgment for that block (BLK1) back to file manager node 520, and when Client 510 receives the packet complete acknowledgments for all of the packets in the block, Client 510 sends a block complete acknowledgment for that block back to file manager node 520 It should be appreciated that the sequence scheme depicted in FIG. 5 is exemplary, and that other sequence arrangements for writing a block to multiple storage nodes in the DFS may be used to implement aspects of the invention.

In an aspect, an enhanced block placement process is used to designate a storage node pipeline for writing of a block that takes into account the state of the network connections in the cluster between the storage nodes and the expected timing requirements of the client, among other factors. Through the use of, for example, software defined network (SDN) functionality, the enhanced block placement algorithm can obtain the real time cluster topology from the SDN controller of the software defined network. The enhanced block placement algorithm can also obtain the real time status of the cluster network, evaluate the impact of potential block pipeline combinations on a client's SLA and QoS requirements, select an optimal block pipeline based on the real time cluster network topology and network status, and, optionally, allocate resources in the SDN accordingly to efficiently support the upcoming transfer of block data via the designated pipeline.

Figure 6:
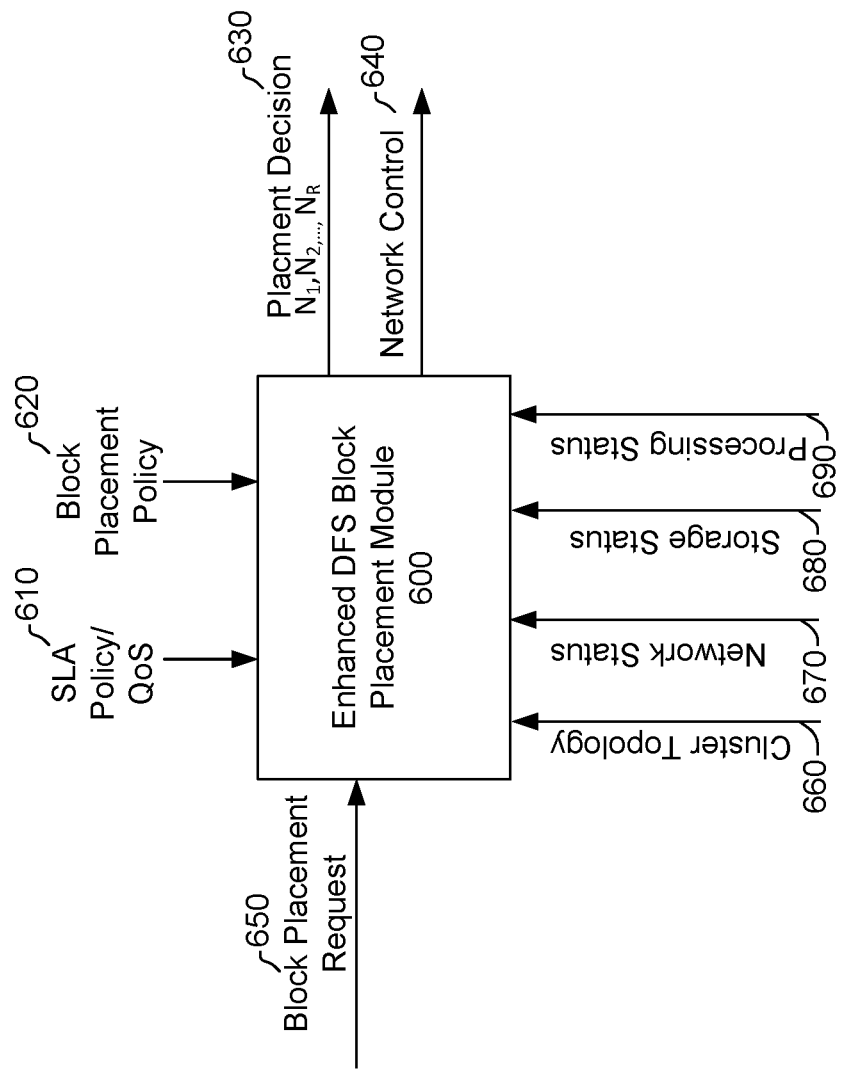
FIG. 6 is a block diagram of an enhanced block placement module in accordance with aspects of the invention.

FIG. 6 is a block diagram of an enhanced block placement module in accordance with aspects of the invention. The enhanced block placement module can provide designation of a storage node pipeline for use in, for example, the distributed file system network of FIG. 1. As seen in FIG. 6, enhanced DFS block placement module 600 has inputs that include the block placement request 650, the real time cluster topology 660, network status 670, storage status 680, processing status 690, block placement policy 620, client SLA policy and QoS requirements 610 and provides an optimum block placement decision 630 (storage node pipeline) for the client to write replicates of a file block in the DFS. In an aspect, enhanced DFS block placement module 600 may also output network control instructions to the SDN controller of the DFS to reconfigure the network in order to efficiently support the transfer of the block data via the storage node pipeline and thereby improve network performance and drive toward meeting the client's SLA and QoS requirements.

The enhanced DFS block placement process of module 600 shown in FIG. 6 can be implemented as part of the file manager node process, the process monitor process or a separate standalone process. Similarly, the enhanced DFS block placement process can be executed on the same computer that runs other processes such as file manager node or process monitor, or can be executed on a separate dedicated computer, as depicted by computer 430 in FIG. 4. The various inputs for enhanced DFS block placement module 600 of FIG. 6 are described below.

Block Placement Request 650: In an aspect, when a DFS client sends a request to the file manager node of the cluster to create a DFS file block, block placement request 650 is also sent to enhanced DFS block placement module 600 from the file manager node. Block placement request 650 includes information related to the request, including at least one or more of the following:

Information of the client for which the DFS file block is created;

The computer from which the request is initiated; and

Information of the file for which the DFS file block is created (file block size, replication factor, etc.).

Cluster Topology 660: In an aspect, enhanced DFS block placement module 600 may obtain cluster topology 660 from a SDN controller (or management system or another source) and the file manager node of the cluster. The topology may be a map of the cluster and may contain information describing the computers and switches of the cluster and their interconnection via a network. In an aspect, at least one or more of the following information may be gathered for each computer in the cluster:

Computer ID;

Hardware configuration (number of processors/cores, type and size of memory, type and size of storage, number of network ports);

Software configuration (OS version, Java version, DFS version, etc.); and

Power consumption information (joules per million instructions per second (MIPS), watts per million floating point operations per second (MFLOPS), etc.)

Each computer in the cluster is connected to the network with one or more network ports. For each network port on each computer, at least one or more of the following information may be obtained:

Port ID;

MAC address;

IP address;

Port capabilities (speed, duplex, etc.);

Port status (activated, deactivated, etc.); and

Connection information (ID of the peer network device and the ID of corresponding port on the peer network device).

For each network node (e.g., switch or router), at least one or more of the following information may be obtained:

Network node ID;

Network node type (ToR switch, core switch, etc.);

Capabilities (number of ports, OpenFlow support, etc.); and

Power consumption information (average/maximum/idle power consumption, etc.).

For each port of all the network nodes, at least one or more of the following information may be obtained:

Port ID;

Port capabilities (speed, duplex, etc.);

Port status (activated, deactivated, etc.); and

Connection information (ID of the peer computer or network node and the ID of corresponding port on the peer computer or network node).

Based upon the above information, a map of the nodes and connections may be established. The resulting cluster topology can be maintained in various forms such as tables, databases, etc. Various methods to discover the topology of the cluster and network can be used. The file manager node can get the computer hardware/software configuration information and power consumption information from the storage node process that runs on each computer. In an aspect, the SDN controller may discover the addresses of the computers in the cluster by observing the traffic generated by the computers. For example, a SDN controller can program all of the ToR switches so that all address resolution protocol (ARP) and dynamic host configuration protocol (DHCP) packets generated by the computers are copied by the ToR switches to the SDN controller. With all the ARP and DHCP messages received, the SDN controller can discover the MAC address and IP address of all the computers as well as the ToR switches and the switches' ports to which the computers are connected. The SDN controller can program all of the ToR switches and core switches to use Link Layer Discover Protocol to discover how the ToR switches and core switches are interconnected. Some or all of this information can be used to generate cluster topology 660 which is input to enhanced DFS block placement module 600.

Network Status 670: The network status is information describing the current state of the cluster network. The network status may include at least one or more of the following information for each network port in each network node:

Throughput, latency and jitter;

% capacity utilization;

Queue length and quantity of discarded frames; and

The active traffic flows and their configuration and status.

A traffic flow in a network node identifies a sequence of packets from a source port to a destination port. A traffic flow in a network node usually identifies all the packets generated by a user application such as a DFS file import utility operating on the network node. A user application usually generates many traffic flows in multiple networks nodes. For example, when a file is imported to the DFS, the DFS file import utility creates many DFS file blocks in the cluster. A file block replication pipeline is recreated to replicate each block. Two traffic flows are created on all the network nodes connecting the storage nodes in the pipeline, one for each direction of the traffic on the pipeline. For each active traffic flow in each network node, at least one or more of the following configuration and status information may be obtained:

Traffic flow ID;

Ingress port ID;

Egress port ID;

Customer ID (e.g., the ID of the customer for whom the traffic flow is created);

Customer Job ID (e.g., the ID of the customer's MapReduce Job);

Customer Task ID (e.g., the ID of the customer's MapReduce Tasks);

Capacity reservation (e.g., how much bandwidth is reserved for the traffic flow);

Utilization of the network connection (e.g., the percent of bandwidth of the network connection used by the flow);

Queue length (e.g., how many packets are queued for processing); and

Average latency.

In an aspect, the above configuration and status information may be collected from an SDN controller, such as SDN controller 190 of FIG. 1, which may track this information using the OpenFlow protocol. The SDN controller can query the network nodes for network status information as needed, and can also instruct the network nodes to report their status information to the SDN controller proactively. For example, a network node can be programmed to report its status periodically. Alternatively, a network node can be programmed to report its current status when its status has changed by a certain threshold amount compared with its last report status.

Storage Status 680: The storage status includes information about the current storage state of all of the computers in the cluster. At least one or more of the following information is obtained for each computer:

Total size of the storage devices (e.g., HDD); and

The amount of storage used.

In an aspect, the DFS file manager node obtains storage space utilization information based on the storage node configuration information and the storage node status information provided in the heartbeat (periodic) messages and block report messages sent by each of the storage nodes in the cluster.

Processing Status 690: The processing status is the information about the jobs currently performed by all the computers in the cluster. At least one or more of the following information is maintained and provided in the Processing Status for each job performed in the cluster:
- Job ID;
- Job type (e.g., blocks replication, map task, reduce task, etc.);
- Customer ID (e.g., the ID of the customer for whom the job and task is performed);
- The IDs of the network nodes used to support the job;
- The IDs of the computers used to process the job;
- The network connections used to support the job; and
- The QoS/SLA targets and guarantees provided to the job (e.g., reserved network capacity, delay budget, network processing priority, block replication time per GB, etc.).

On each computer, at least one or more of the following information is maintained and provided in the Processing Status:
- The number of CPUs or processor cores installed;
- Overall CPU utilization (e.g., the percentage of CPUs currently used);
- Job IDs (e.g., all the jobs currently processed by the computer); and
- CPU utilization per job.

In an aspect, the Processing Status information can be gathered from the DFS file manager node and from the process monitor.

SLA Policy/QoS requirements 610: In an aspect, through virtualization, multiple virtual DFS clusters can be created on the same cluster of physical computers in a data center. The Service Level Agreement (SLA) Policy/QoS describes how traffic for different users will be queued and processed by the network and describes the performance guarantees promised to different users. Accordingly, a data center operator may offer different service levels, possibly described by an SLA with certain QoS targets, to account for different user needs and budgets. For example, a Bronze SLA level user may purchase the services of a virtual DFS cluster with a best effort type of service that does not have any QoS guarantee, a Silver SLA level user may use the services of a virtual DFS cluster with prioritized traffic processing but without any QoS performance guarantee, and a Gold SLA level user may use a virtual DFS cluster with guaranteed network throughput, latency and jitter QoS performance guarantees at a higher monetary cost. In an aspect, the table below describes an alternative example where different service level agreements (SLAs) are guaranteed with different QoS targets and different processing priorities guaranteed.

TABLE 1

SLA Policy/QoS Parameters Example

| Service Level (SLA) | Throughput | Packet Loss | Packet Delay | Processing Priority |
|---|---|---|---|---|
| Gold | >=100 Mbps | <=0.0001% | <=2 ms | High |
| Silver | >=10 Mbps | <=0.01% | <=5 ms | Medium |
| Bronze | >=5 Mbps | <=1% | <=10 ms | Low |

Block Placement Policy 620: In an aspect, the block placement policy includes a set of rules specifying how many replicas of a DFS block should be created and where the replicas of the block may be placed. In one example, a default block placement policy may specify that three replicas of a block should be placed in at least two different racks of the cluster and that two of the three replicas should be located in the same rack. In another example, a block placement policy may specify that five replicas of a block be placed in at least three racks and that at least two replicas should be placed in the same rack.

Returning to FIG. 6, the enhanced DFS block placement module 600 generates two outputs, Placement Decision 630 and Network Control 640. Placement Decision 630 indicates a sequence of storage nodes where the block should be replicated. For a block in a file configured with a replication factor R, Placement Decision 630 is a sequence of R computer IDs (storage nodes $N_1, N_2, \ldots N_R$) in which each computer ID identifies a storage node in the cluster. The generation of Placement Decision 630 by enhanced DFS block placement module 600 is discussed in more detail below.

In an aspect, Network Control 640 includes instructions for the SDN controller to prepare the cluster network for the traffic that will be generated for transferring and storing blocks according to the block replication pipeline specified in the Placement Decision. For example, Network Control 640 may include instructions for the SDN controller to create flow entries in the network nodes so that the required block replication network traffic is transported in one or more network paths that avoid congested network segments. Alternatively, Network Control 640 may include instructions for the SDN controller to assign or adjust the priority of a traffic flow associated with the replication of a DFS file block. In another example, the Network Control 640 can include instructions for the SDN controller to activate and optionally reserve additional network capacity by aggregating a new network connection between a top of rack (ToR) switch and a core switch to avoid potential congestion that might be caused by required block replication traffic. Additional network capacity may be provisioned, for example, using the Link Aggregation Control Protocol (LACP, as defined in IEEE 802.1ax) between two nodes. Network capacity may be reserved for the upcoming transfer using for example, the Resource Reservation Protocol (RSVP) or Resource Reservation Protocol-Traffic Engineering (RSVP-TE) protocols.

In an aspect, network capacity may be reserved using explicit traffic policing algorithms in SDN enabled network nodes. For example, in a SDN enabled network node that supports OpenFlow Spec. 1.3, a meter table with ID meter_id can be created to drop any packet after the data rate exceeds a threshold. Additionally a flow entry with an instruction "Meter meter_id" can be added to the flow table to match each direction of the TCP traffic generated by the file block replication pipeline. The new flow entry and meter table together may effectively limit the bandwidth available to the file block replication traffic flow. Network capacity may be effectively reserved by: (a) enforcing bandwidth limits for all of the traffic flows; and (b) making sure the total bandwidth limit of all the traffic flows in each network node does not exceed the total output bandwidth for egress network connection.

Figure 7:
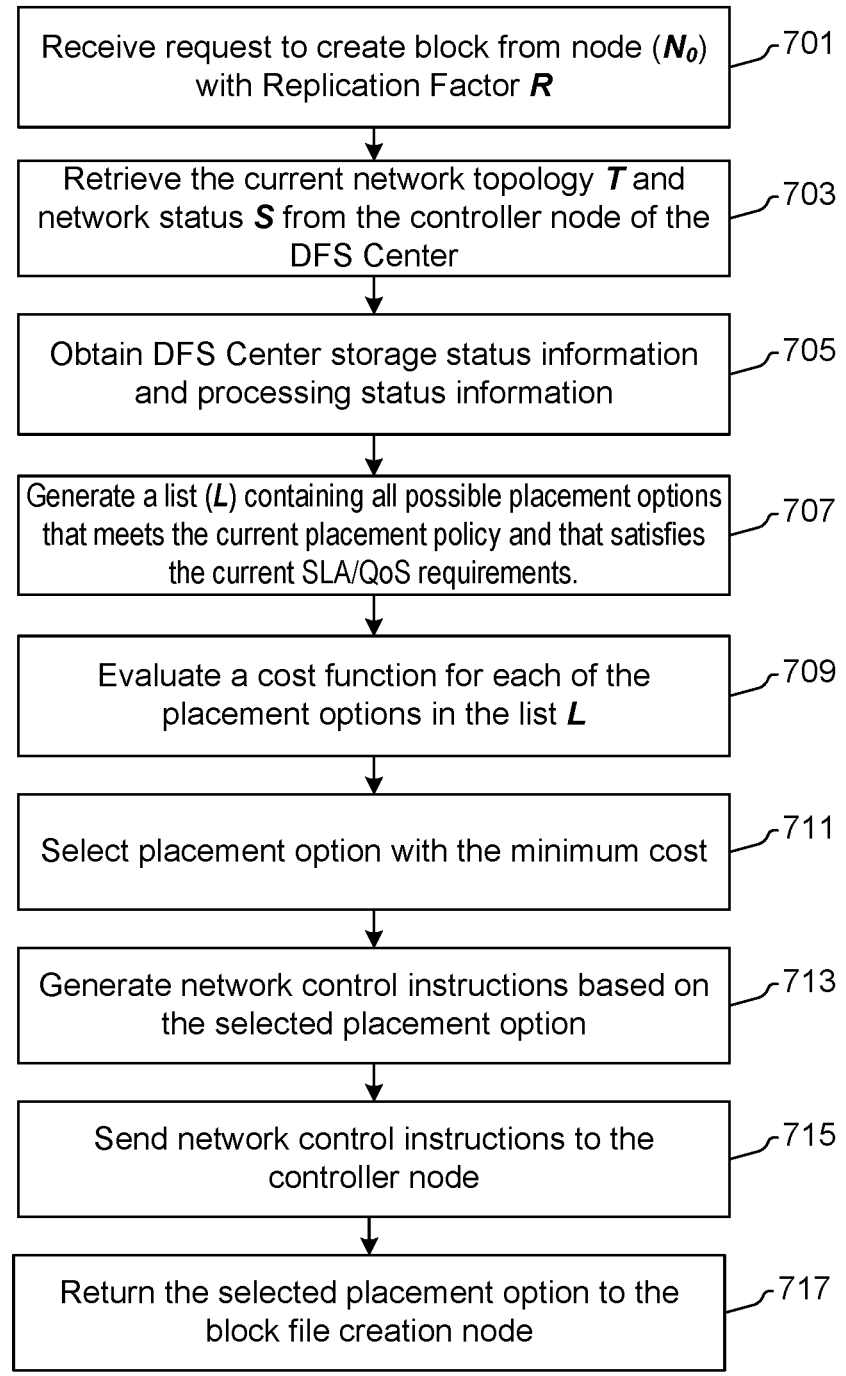
FIG. 7 is a flowchart depicting an enhanced block placement algorithm in accordance with aspects of the invention.

FIG. 7 is a flowchart depicting an enhanced block placement algorithm in accordance with aspects of the invention. An example of the generation of Placement Decision 630 by enhanced DFS block placement module 600 is now discussed in more detail with regard to FIG. 7. In step 701 of FIG. 7, a DFS client sends a new block request to the file manager node to create a new file block. In an aspect, the request may be from a DFS utility that imports a large file from outside of the cluster. In an aspect, the client may also be a data processing task (e.g., MapReduce task in Hadoop) that requests to write the processing output to a file in the DFS. The request to create a new block may be for the first block of a file, or for a new block to be appended to an existing file. In an aspect, the file manager node then sends a block placement request to the enhanced DFS block placement module, in which the block placement request includes the following information: the ID of the customer, the node ID No of the client, the size of the file block and the replication factor (R) of the file. The file manager node may determine this information from the new block request it received from the DFS client.

In step 703, the enhanced DFS block placement module retrieves the network topology and real time network status from, for example, the SDN controller of the cluster or from one or more other sources of network information in the cluster (e.g., a network or element management system). In an aspect, the enhanced DFS block placement module may obtain this information in real time when the client requests the creation of a block. In another aspect, the enhanced DFS block placement module may request this information from the SDN controller periodically and then use the last updated network topology and network status when the client requests the creation of a block. In another aspect, the SDN controller may send this information to the enhanced DFS block placement module periodically or at a time when the network topology or network status changes. For example a node addition or removal in the cluster may trigger the SDN controller to send an updated topology to the enhanced DFS block placement module. Similarly, the determination that a bandwidth utilization of a network link crosses a threshold (e.g., >95% utilized for >1 minute) may trigger a network status update. Hybrid solutions also may be used. For example, the network topology may be sent by the SDN controller only when network topology changes are made, but the network status may be queried by the enhanced DFS block placement module as required. With the network topology and real time network status, the enhanced DFS block placement module can evaluate and compare different block placement options.

In step 705, the enhanced DFS block placement module obtains the current storage status and processing status from the file manager node and from the process monitor of the cluster. In other aspects, the enhanced DFS block placement module may obtain the current storage status and processing status directly from each computer in the cluster.

Next, in step 707, the enhanced DFS block placement module generates a list L of possible block placement options that satisfies the current placement policy and the SLA/QoS requirements for the user. A block placement option indicates the R computers in which to store the block replicas and indicates the networking nodes and their network ports used to transport the block replication traffic.

In one aspect, the enhanced DFS block placement module may first generate a list $L_A$ of all possible block placement options using graphs. The network topology can be used to create a graph using all of the computers and network nodes as graph vertices and the network connections of the cluster as graph edges. Every path connecting the client node and R computers in the graph is a possible block placement option. For example, with reference to the block replication placement shown in FIG. 4, a possible path (Path1) is formed by connecting the following computers and network nodes in the order shown below:

Client;
ToR switch 3;
Core switch 1;
ToR switch 1;
Storage node 1;
ToR switch 1;
Core switch 1;
ToR switch 2;
Storage node 4;
ToR switch 2; and
Storage node 5.

A different path (Path2) with the same 3 storage nodes above can be formed by using core switch 2 instead of core switch 1 in the order shown below:

Client;
ToR switch 3;
Core switch 2;
ToR switch 1;
Storage node 1;
ToR switch 1;
Core switch 2;
ToR switch 2;
Storage node 4;
ToR switch 2; and
Storage node 5.

Path1 and Path2 in the above example are both possible block placement options. All of the possible block placement options in a graph can be created using known graph traversal algorithms.

From the list $L_A$ of all possible block placement options the enhanced DFS block placement module removes those options that are not consistent with the block placement policy, resulting in list $L_P$. For example, if the block placement policy requires that the replicas of a block be placed in at least two racks, the options that contain all of the R computers in a single rack will be removed. In another example, if the block placement policy requires that the replicas of a block be placed in at least three racks, then all the options that contain all of the R computers in a single rack or in only two racks will be removed.

In an aspect, the block placement options that are not consistent with block placement policy can also be excluded from the list of all possible block placement options as it is being generated. For example, if the list of all possible block placement options is being created using a graph traversal algorithm and the block placement policy requires that the replicas of a block be placed in at least two racks, and the current path being traversed already includes two computer nodes in a single rack, the graph traversal algorithm can remove all other computers in the same rack from its set of computer nodes to be traversed, and as a result the graph traversal algorithm generates a list of placement options that are consistent with the block placement policy.

The enhanced DFS block placement module next removes from $L_P$ those block placement options that would cause any user's SLA Policy/QoS guarantee to be violated if the DFS file block is replicated through the network path described by that block placement option, resulting in list L. For each block placement option, the enhanced DFS block placement module examines the network status on all network nodes used in the block placement option, and determines if the SLA policy/QoS guarantee for any current traffic flow in any network node would be violated. If the SLA policy/QoS guarantee for any current traffic flow would be violated on any network node by replicating the DFS file block through the network path, the block placement option will be removed. For example, referring to the block placement depicted in FIG. 4, the network status for ToR switch 3, core switch 1, ToR switch 1, ToR switch 2 will be examined for the block placement option Path1 described earlier. On each of these network nodes, the network status information will provide detailed information on each traffic flow along the network path. For example, ToR switch 1 may contain network status information such as the following:

TABLE 2

Network Status in ToR switch 1

| Traffic Flow ID | Ingress Port | Egress Port | Customer ID | Job ID | Bandwidth Reserved |
|---|---|---|---|---|---|
| FLOW_1 | 1 | 10 | CustomerA | JOB_X | 100 Mbps |
| FLOW_2 | 2 | 10 | CustomerB | JOB_Y | 200 Mbps |
| FLOW_3 | 3 | 10 | CustomerC | JOB_Z | 400 Mbps |

In Table 2 above, port 1, 2 and 3 of ToR switch 1 are the ports that connect to storage node 1, 2 and 3 respectively, and port 10 of ToR switch 1 is the port that connects to Core Switch 1. In this example, CustomerA, CustomerB and CustomerC have services with different SLA policy/QoS guarantees, and as a result the traffic flows FLOW_1, FLOW_2 and FLOW_3 are guaranteed 100 Mbps, 200 Mbps, and 400 Mbps of bandwidth on egress port 10, respectively. Since placement option Path1 requires replicating the block from storage node 1 to storage node 4, a new traffic flow from port 1 to port 10 will need to be added in ToR switch 1, and the new traffic flow will only have a maximum of 300 Mbps available if the egress port can only support a maximum of 1 Gbps. If the SLA policy/QoS guarantee for the current customer requires 400 Mbps reserved bandwidth, placement option Path1 will be removed because it would violate the current customer's SLA/QoS guarantees. In an aspect, a placement option that would violate the current customer's SLA/QoS guarantees is marked as inadequate and, in the case that all placement options are marked inadequate, the placement option that least violates the current customer's SLA/QoS guarantees may be selected.

In an aspect, the block placement options that would cause any user's SLA Policy/QoS guarantee to be violated can also be excluded from the list of all possible block placement options as it is being generated. For example, when the list of all possible block placement options is created using a graph traversal algorithm, the enhanced DFS block placement module examines the network status for each of the network nodes to be traversed from the current network path, and determines if the SLA policy/QoS guarantee for any current traffic flow in the network node would be violated. If the SLA policy/QoS guarantee for any current traffic flow would be violated, the network node is removed from the set of nodes to be traversed. As a result the graph traversal algorithm generates a list of placement options that would not violate any user's SLA Policy/QoS guarantee.

It should be appreciated that the order of the above-described sub-steps associated with step 707 may be changed. For example, the block placement options that violate users' SLA policy and/or QoS guarantee requirements can be removed first, and then the block placement options that violate the block placement policy can be removed. In an aspect, some or all of the sub-steps may be combined with subsequent steps in the process. Similarly, some of the sub-steps may be eliminated, such as the filtering of the list of block placement options by SLA and/or QoS. In addition, it should be appreciated that other algorithms can be utilized in enhanced DFS block placement module for generating a list L of block placement options. In an aspect, enhanced DFS block placement module may generate only a partial list L' of block placement options, or enhanced DFS block placement module may generate a truncated list L" of block placement options by stopping after a fixed or variable time interval before all possible block placement options are generated. In an aspect, the functions of steps 707 and 709 (discussed in detail below) may be combined such that a cost function is evaluated to determine a cost valuation parameter for each possible placement option before it is placed in the list L and if the cost valuation parameter for that possible placement option exceeds a threshold then the possible placement option is not included in the list L. Otherwise, the possible placement option is included in the list L if it also satisfies the current block placement policy and the current SLA/QoS requirements.

In step 709, the enhanced DFS block placement module evaluates a cost function to determine a cost valuation parameter for each of the block placement options in the list generated in step 707. A cost function cost( ) is defined so that the enhanced DFS block placement module can evaluate and rank different block placement options quantitatively in order to maximize performance. Performance, in this context, may refer to one or more block placement service characteristics such as placement speed, reliability, repeatability and effect of the placement on the cluster. For a cluster of N nodes with each node assigned a unique ID, the inputs to the cost function may include one or more of the following items:

Block Placement Request (BPR): The block placement request received from the file manager node;

Current placement option (CPO): The placement option to be evaluated. The placement option includes the ID of the client node ($N_0$), the R computers nodes, the network nodes and their network ports that are used to transport the block replication traffic. The R computer nodes can be denoted as ($I_1, I_2, \ldots, I_R$) where $I_1$ is the ID of the first computer node of the block placement option, $I_2$ is the ID of the second computer node, . . . , and $I_R$ is the ID of the last computer node;

Cluster topology (CT);

Network status (NS); and

Storage status (SS) and processing status (PS).

The cost function cost( ) returns a quantitative value (a cost valuation parameter) indicating the cost of replicating the block for the current customer according to the current placement option being considered. The returned cost valuation parameter may be calculated via a summation of the three terms as shown below.

$$\text{cost}(BPR,CPO,CT,NS,SS,PS) = \text{weight}_{network} \times \text{cost}_{network}(BPR,CPO,CT,NS,SS,PS) + \text{weight}_{storage} \times \text{cost}_{storage}(BPR,CPO,CT,NS,SS,PS) + \text{weight}_{processing} \times \text{cost}_{processing}(BPR,CPO,CT,NS,SS,PS)$$

Where $\text{cost}_{network}$, $\text{cost}_{storage}$ and $\text{cost}_{processing}$ indicate the network cost, storage cost and processing cost associated with replicating the block, and $\text{weight}_{network}$, $\text{weight}_{storage}$ and $\text{weight}_{processing}$ are coefficients that can be used to adjust how the network cost, storage cost and processing cost contribute to the output of the cost function cost( ). Different functions for $\text{cost}_{network}$, $\text{cost}_{storage}$ and $\text{cost}_{processing}$ may be defined so that cost( ) may indicate any combination of the network cost, storage cost and/or processing cost. For example, $cost_{storage}$ and $cost_{processing}$ may be defined to always return 0 so that cost( ) only includes the network cost, $cost_{network}$, associated with the current block placement option. In another example, $cost_{network}$ and $cost_{processing}$ may be defined to always return 0 so that cost( ) only includes the storage cost, $cost_{storage}$, associated with the current block placement option.

Different functions for $cost_{network}$, $cost_{storage}$ and $cost_{processing}$ may be created or tuned to support different objectives. For example, if the objective is to minimize network traffic in the cluster, the output of $cost_{network}$ may be the number of network segments or links used to transfer the block replication traffic:

$$cost_{network}(BPR,CPO,CT,NS,SS,PS)=\text{hop\_count}(CPO)$$

where hop_count(CPO) returns the number of network hops used in the current block placement option (CPO) under consideration. In an aspect, as a variation of this example, if network traffic involving the core switches in the data center requires higher monetary cost than traffic involving ToR switches, the cost function can use a higher weight for traffic that would need to travel across the core network switches and lower weight for the traffic that would need to travel across the ToR switches.

In another aspect, the objective is to balance the storage utilization across the cluster, and so $cost_{storage}$ may be defined as:

$$cost_{storage}(BPR, CPO, CT, NS, SS, PS) = \sum_{i=1}^{R}\left|\frac{\text{storage\_used}(I_i)}{\text{total\_storage}(I_i)} - \text{average\_utilization}(CPO, SS)\right|$$

where average_utilization(CPO,SS) is the average storage utilization of all the computer nodes in the cluster, $(I_1, I_2, \ldots, I_R)$ are the IDs of the R computer nodes in the current placement option, storage_used($I_i$) is the total amount of storage used in computer node $I_i$ and total_storage($I_i$) is the total amount of storage installed in computer node $I_i$.

In another aspect, the placement objective is to minimize replication time, and so the output of $cost_{network}$ may be the time it takes to complete the placement of the block replicas. Since the block is replicated in a pipeline fashion, the block is transferred across all of the network hops as specified in the current block placement option. The time it takes to complete the block replication is the time it takes to transfer the block across the network hop with the lowest bandwidth available to the current customer. Accordingly, in this aspect, $cost_{network}$ may be defined as:

$$cost_{network}(BPR, CPO, CT, NS, SS, PS) = \frac{\text{block\_size}(BPR)}{\text{lowest\_available\_bandwidth}(CPO)}$$

in which:
block_size(BPR)=the size of the current HDFS file block
lowest_available_bandwidth(CPO)=the lowest available bandwidth to the current customer on all the network hops used in the current block placement option.

In an aspect, the lowest available bandwidth may be obtained through the SDN services by retrieving network capacity reservation information via a SDN function call. In another aspect, the lowest available bandwidth may be obtained through the SDN services by retrieving average network percentage utilization information via a SDN function call. In another aspect, the lowest available bandwidth may be obtained from utilization of a network diagnostic probe from which available bandwidth information can be determined.

In a further aspect, the cost function may also be defined to minimize the energy consumption of the block replication associated with the block placement option. In this case, the cost functions $cost_{network}$, $cost_{storage}$ and $cost_{processing}$ may be calculated by summing the amount of energy (e.g., joules) or power (e.g., watts) required to transfer, store and process the data block replicas associated with the current block placement option (CPO).

For example, $cost_{network}$ may be a summation of the energy or power used per bit transferred by each port of each network node participating in the CPO. In another example, $cost_{storage}$ may be a summation of the energy or power used per byte stored by each storage device (e.g., hard disk drive, solid state drive, etc.) participating in the CPO. Further, $cost_{processing}$ may be a summation of the energy or power used per processing unit. For example, $cost_{processing}$ may be defined in terms of joules per million instructions per second (MIPS), or watts per million floating point operations per second (MFLOPS).

In an aspect, the above energy/power information may be obtained from the device manufacturer and stored in each device or in the device's management system. In an aspect, the information may be provided to the enhanced DFS block placement module via the cluster topology input from an SDN controller, an element management system or an alternative management method.

In an another aspect, $cost_{network}$ may be calculated by summing the average or maximum power consumption of the device(s) containing each network port used in the CPO, with an equation for network cost as follows:

$$cost_{network}=\Sigma_{i=1}^{n}P_i$$

in which n=the number of network ports involved in the CPO, and $P_i$=the average or maximum power dissipation (e.g., watts) of the device containing port i.

For example, consider two possible paths in which both paths traverse a total of 6 ports through two switches, as follows:
PathA: Computer 1=>Switch 1 (Port 0)=>Switch 1 (Port 1)=>Switch 2 (Port 0)=>Switch 2 (Port 1)=>Computer 2
PathB: Computer 1=>Switch 1' (Port 0)=>Switch 1' (Port 1)=>Switch 2' (Port 0)=>Switch 2' (Port 1)=>Computer 2

Further consider the following average power dissipation of each device:
Computer 1 100 watts;
Computer 2 100 watts;
Switch 1 100 watts;
Switch 2 100 watts;
Switch 1' 150 watts;
Switch 2' 150 watts;
so that, using the equation above, the cost for PathA and PathB would be 600 and 800, respectively.

In another aspect, the network cost may be calculated as the sum of the average or maximum power consumption of the device(s) containing each network port, normalized by the number of device ports, as follows:

$$cost_{network}=\Sigma_{i=1}^{n}P_i/\text{numports}_i$$

in which $P_i$=the average or maximum power dissipation (e.g., watts) of the device containing port i, and numports$_i$=the number of network ports on device containing port i.

In another aspect, the cost function may be calculated by summing the incremental power consumed by each port used in the CPO. This may be calculated, for example, using the following equation:

$$\text{cost}_{network} = \Sigma_{i=1}^{n}(P_{max,i} - P_{idle,i})/\text{numports}_i$$

in which:
$P_{max,i}$=the maximum power dissipation of the device containing port i (i.e. the power dissipation with all ports operating at full line rate);
$P_{idle,i}$=the idle power dissipation of the device containing port i (i.e. the power dissipation with all ports idle); and
numports$_i$=the number of network ports on the device containing port i.

Further, the cost function may be normalized based on port speed, as follows:

$$\text{cost}_{network} = \Sigma_{i=1}^{n}(P_{max,i} - P_{idle,i})/(\text{numports}_i \times \text{portspeed}_i)$$

in which:
$P_{max,i}$=the maximum power dissipation of the device containing port i (i.e. the power dissipation with all ports operating at full line rate);
$P_{idle,i}$=the idle power dissipation of the device containing port i (i.e. the power dissipation with all ports idle);
numports$_i$=the number of network ports on the device containing port I; and
portspeed$_i$=the line rate of network port i, as measured, for example, in Gbps.

In an aspect, the idle, average and maximum power consumption specifications for devices in the cluster may be obtained from the device manufacturer and may be stored on a network device or within a network management system. These specifications may be provided to the enhanced DFS block placement module via the cluster topology input from an SDN controller, element management system or other management entity in the cluster. One skilled in the art will appreciate that the "device containing port i" may refer to various forms factors including but not limited to: rack mounted enclosure, network cards/blades, network modules, SFP (small form factor pluggable) and NIC (network interface card).

In another aspect, the objective is to balance the network utilization across the cluster, and so cost$_{network}$ may be defined as:

$$\text{cost}_{network}(BPR,CPO,CT,NS,SS,PS) = \Sigma_{i=1}^{n} \text{weight}(CT, L_i) \times |\text{link\_utilization}(L_i) - \text{average\_network\_utilization}(CT,NS)|$$

where: $(L_1, L_2, \ldots, L_n)$ are the network links used in the block replication pipeline for the current placement option; link_utilization($L_i$) is the current bandwidth utilization of network link $L_i$; average_network_utilization(CT,NS) is the average network utilization of all the network links in the cluster; and weight(CT, $L_i$) is a coefficient for network link $L_i$. In this definition of cost$_{network}$, weight(CT, $L_i$) allows different network links to contribute differently to the output of cost$_{network}$, depending on the location and/or type of network link $L_i$ in the cluster. For example, a first network link between a computer and a ToR switch and a second network link between a ToR switch and a core switch can each have a different weight and thereby contribute differently to the output of cost$_{network}$. In an aspect, link_utilization and average_network_utilization may be normalized by dividing current link utilization (e.g., in Mbps) by the maximum link capacity (e.g., the port speed in units of Mbps), thereby allowing a cost function to be evaluation for networks with different link speeds.

Figure 8:
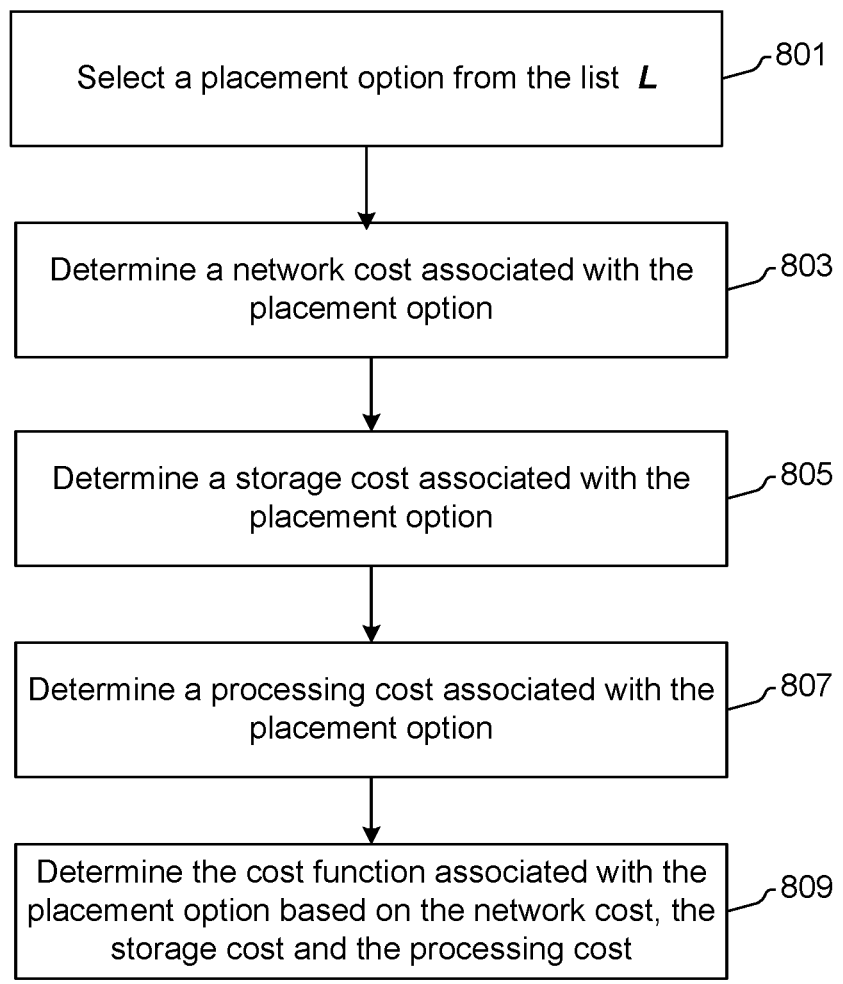
FIG. 8 is a flowchart depicting the determination of a cost function associated with a block placement option in accordance with aspects of the invention.

FIG. 8 is a flowchart depicting the determination of a cost function associated with a block placement option in accordance with aspects of the invention. FIG. 8 provides a summary of the sub-steps of step 709 of FIG. 7, as discussed above. In step 801, a block placement option is selected from the list of block placement options L. In an aspect, the block placement option may be selected from the list in order, or may be selected based on criteria such as the number of racks involved in the block placement option, etc. In step 803, a network cost, network$_{cost}$, as described above, is determined for the associated selected block placement option. A storage cost, storage$_{cost}$, as described above, is determined for the associated selected block placement option in step 805. In step 807, processing$_{cost}$, as described above, is determined for the associated selected block placement option. Lastly, a cost valuation parameter, cost( ), is determined in step 809 for the selected block placement option based on the determined network$_{cost}$, storage$_{cost}$, and processing$_{cost}$, as described above. It should be appreciated that the order of steps shown in FIG. 8 is exemplary, and the steps may be performed in other orders or combinations.

In an aspect, other inputs may be included in the calculation of the cost functions. For example, if the cost functions attempt to account for monetary cost that depends on when the block is replicated, the current time can be added as an input to the cost functions. Similarly, the cost function may extended to include the financial cost of using a particular hop (or network node port), because the operating cost of each device may differ, especially in a network which may have components managed by more than one service provider. In another aspect, different brands or models of network switches maybe be used together in the cluster network at the same time, and some brands or models of network switches may be less reliable than the others (due to brand reputation, well known benchmarks, observed performance, etc.), and it is preferable to use the more reliable network switches. The brand and model of the network switches and their reliability metrics may be included in the calculation of the cost function so that the cost of using less reliable network switches is higher, and the cost of using more reliable network switches is lower.

In an aspect, the cost$_{processing}$ may be determined based on processing capabilities associated with each processing unit which may be measured in MIPS, Megaflops, or another indicator of such processing capabilities. In an aspect, the cost$_{processing}$ may be determined based on the current utilization (before implementation of the placement option) of the processing capabilities associated with each processing unit, which may be reported by the operating system (OS) of the processing unit.

In an aspect, functions for cost$_{network}$, cost$_{storage}$ and cost$_{processing}$ may be created or tuned to support multiple objectives. Mathematical terms representing each objective may be weighted by a coefficient (set to reflect by each objective's relative importance) and then summed to form the final cost function (e.g., cost$_{network}$). For example, cost$_{network}$ may be calculated to include both the time it takes to complete the block replication and the sum of the average or maximum power consumption of the device(s) containing each network port used in the CPO. Such an equation for network cost is provided, as follows:

$$cost_{network}(BPR,CPO,CT,NS,SS,PS) =$$
$$weight_{network,time} \times cost_{network,time} +$$
$$weight_{network,power} \times cost_{network,power}$$

in which:

$$cost_{network,time} = \frac{block\_size(BPR)}{lowest\_available\_bandwidth(CPO)};$$

$$cost_{network,power} = \Sigma_{i=1}^{n} P_i;$$

weight$_{network,time}$=the weight or coefficient that controls how much cost$_{network,time}$ contributes to cost$_{network}$;
weight$_{network,power}$=the weight or coefficient that controls how much cost$_{network,power}$ contributes to cost$_{network}$;
lowest_available_bandwidth(CPO)=the lowest bandwidth available to the current customer on all the network hops used in the CPO;
block_size(BPR)=the size of the current DFS file block;
n=the number of network ports involved in the CPO; and
$P_i$=the average or maximum power dissipation (e.g., watts) of the device containing port i.

Of course, it should be appreciated that the above descriptions of evaluating a cost function to determine a cost valuation parameter associated with a block placement option are exemplary, and that other known cost function algorithms and models may be used as well.

Returning to FIG. 7, in step 711 the enhanced DFS block placement module selects the placement option with the lowest cost, based on the cost valuation parameters determined from the cost function evaluations in step 709. In an alternative aspect, the enhanced DFS block placement module may select the placement option with the lowest cost from the first N placement options that have a cost lower than a threshold. In an aspect, the placement options may be sorted by cost by using a sorting algorithm. Alternatively, status variables may be maintained to track the current minimum cost and the associated block placement option as the cost for each placement option is determined in step 709. As soon as the cost of a block placement option is determined to be higher than the current minimum cost, further cost calculation for the current placement option may be stopped. Then the cost of the next block placement option is determined in the same manner, resulting in the block placement option(s) with the lowest cost (or n lowest costs) being known at the completion of the cost determinations in step 709.

In step 713, the enhanced DFS block placement module generates network control instructions for the SDN controller to prepare the network for transfer of the block replicas for storage according to the selected block placement option from step 711. In an aspect, the network control instructions may be directed to an OAM or EMS system/device in the cluster. In an aspect, the enhanced DFS block placement module may generate network control instructions to direct the SDN controller to generate OpenFlow instructions for switches, routers or other devices in the network. In an aspect, the enhanced DFS block placement module may generate network control instructions to request the SDN controller to establish OpenFlow flow entries in the network nodes so that the block replication network traffic follows the specific path as defined by the selected block placement option. For example, if the selected block placement option is Path2 as described above in step 707, the enhanced DFS block placement module may generate network control instructions to request the SDN controller to set up flow entries in ToR switch 3, core switch 2, ToR switch 1, and ToR switch 2. In this example, flow entries in core switch 2 are established so that:

Block replication data packets from Client node through ToR switch 3 are forwarded to ToR switch 1;
Block replication confirmation packets from storage node 1 through ToR switch 1 are forwarded to ToR switch 3;
Block replication data packets from storage node 1 through ToR switch 1 are forwarded to ToR switch 2; and
Block replication confirmation packets from storage node 4 through ToR switch 2 are forwarded to ToR switch 1.

In an aspect, the enhanced DFS block placement module may update the stored network status information so that flow entries created in this step are included with the latest status information such as customer ID, job ID and other flow configuration and reservation information. In an aspect, the enhanced DFS block placement module may generate network control instructions to modify existing OpenFlow entries in different network nodes through the SDN controller in order to accommodate the incoming block replication traffic. The enhanced DFS block placement module may generate network control instructions to modify processing priorities of existing traffic flows in different network nodes. For example, when a new block replication is requested from a client with higher service level, and there exist other traffic flows being processed for clients with a lower service level, the enhanced DFS block placement module may generate network control instructions to decrease the priorities for the existing traffic flows so that the traffic for the new block replication receives prioritized processing.

In an aspect, the enhanced DFS block placement module may modify other QoS parameters such as bandwidth reservations on existing traffic flows so that the traffic flow for the new block replication can be assigned appropriate QoS parameters. For example, if a new traffic flow from port 4 to port 10 needs to be created for CustomerD in the ToR switch 1 as shown above in Table 2, and the new traffic flow must be reserved at a bandwidth of 400 Mbps, and according to CustomerC's SLA Policy/QoS guarantee the bandwidth reserved for FLOW_3 can be reduced to 300 Mbps, the enhanced DFS block placement module may create a new traffic flow FLOW_4 for CustomerD and at the same time modify traffic flow FLOW_3 to reduce its bandwidth reservation from 400 Mbps to 300 Mbps. The table below shows the modified existing traffic flow FLOW_3 and the new traffic flow FLOW_4 for this example.

TABLE 3

Adding New Flow and Modifying Existing Flow in ToR Switch 1

| Traffic Flow ID | Ingress Port | Egress Port | Customer ID | Job ID | Bandwidth Reserved |
| --- | --- | --- | --- | --- | --- |
| FLOW_1 | 1 | 10 | CustomerA | JOB_X | 100 Mbps |
| FLOW_2 | 2 | 10 | CustomerB | JOB_Y | 200 Mbps |
| FLOW_3 | 3 | 10 | CustomerC | JOB_Z | 300 Mbps |
| FLOW_4 | 4 | 10 | CustomerD | JOB_D | 400 Mbps |

In an aspect, the enhanced DFS block placement module may also reconfigure the network for efficient accommodation of traffic associated with the selected placement option. For example, the enhanced DFS block placement module may generate network instructions to reconfigure how the ToR switches are connected to the core switches. Typically, a ToR switch is connected to a core switch through multiple network connections and those networks connections can be aggregated as multiple trunk groups. Network traffic from/to different computer nodes or different customers can be directed to different truck groups. In an aspect, the enhanced DFS block placement module may generate network instructions to dynamically adjust how many network connections will be aggregated in each trunk group in order to increase/decrease the link capacity of each trunk group.

Figure 9B:
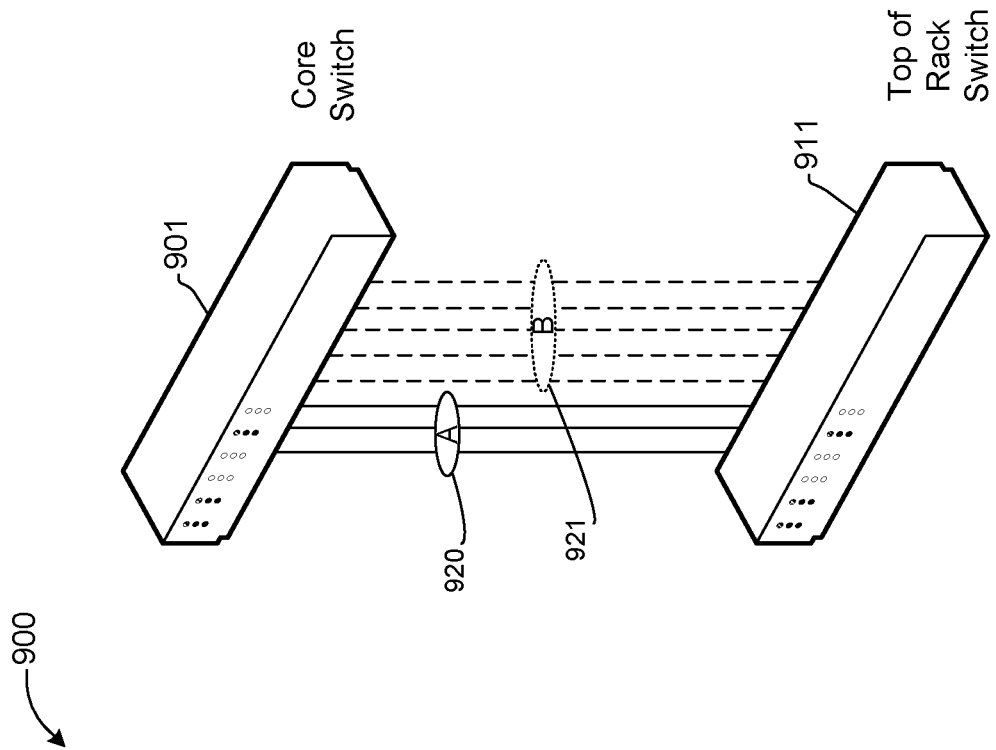
FIGS. 9A and 9B are block diagrams depicting reconfiguration of network connections between a core switch and a top of rack switch in accordance with aspects of the invention.
Figure 9A:
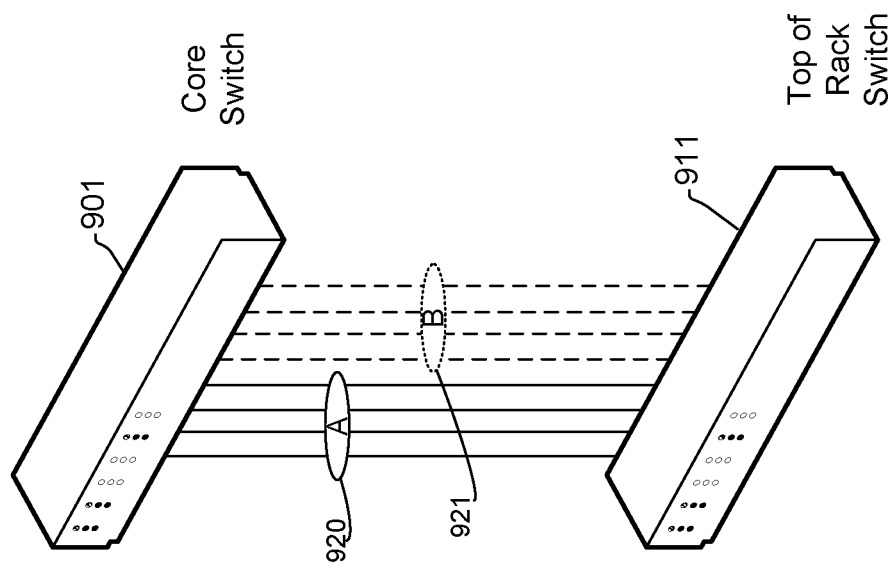

In an aspect, the enhanced DFS block placement module may generate network instructions to move a network connection from an underutilized trunk group to a heavily utilized trunk group in order to increase the link capacity in the heavily utilized trunk group. FIGS. 9A and 9B are block diagrams depicting reconfiguration of network connections between a core switch and a top of rack switch in accordance with aspects of the invention. FIGS. 9A and 9B show a cluster 900 which may be, for example, in the distributed file system network of FIG. 1. Cluster 900 includes a ToR switch 911 is connected to a core switch 901 through 8 Gigabit Ethernet connections, and the 8 connections are configured as trunk group A 920 and trunk group B 921. In FIG. 9A, trunk group A and trunk group B each include 4 Gigabit Ethernet connections each providing a link capacity of 4 Gbps. When the enhanced DFS block placement module determines that the link capacity of trunk group B should be increased to 5 Gbps and trunk group A currently utilizes 3 Gbps or less, the enhanced DFS block placement module reconfigures the network as shown in FIG. 9B in which trunk group A 920 has lost one Ethernet connection and trunk group B 921 has added one Ethernet connection.

Returning to FIG. 7, as described above with regard to step 713, the network control instruction set may configure or modify different elements in the cluster, and/or different performance characteristics associated with different elements, traffic and users of the cluster. It should be appreciated that the descriptions of network instructions provided herein are exemplary, and that such instructions may be performed in other orders or combinations.

In step 715 the enhanced DFS block placement module sends the determined network control instructions to the controller node, which may be an SDN controller or may be an OAM or EMS system/device operating in, or in connection with, the cluster. In this manner, the controller node may operate on the instructions and configure the network accordingly to accommodate the network traffic associated with the selected block placement option. In step 717, the enhanced DFS block placement module returns the sequence of computer nodes (storage nodes) specified in the selected block placement option to the file manager node, and the file manager node then returns the sequence as the block placement decision to the DFS client that initiated the request for a new block to the file manager node.

In aspects described above, the enhanced DFS block placement module executes the steps of FIG. 7 every time a new file block is requested. In another aspect, the enhanced DFS block placement module may be executed for multiple new file blocks at a time, or even for all file blocks of an entire new file at a time. For example, when a DFS client imports a file from a different file system to DFS, it knows the size of the original file and therefore the number of blocks that need to be created and replicated to the DFS cluster. The DFS client may provide the size information to the enhanced DFS block placement module which uses the steps described above to determine and store the selected block placement option for each of the blocks all at once.

In an aspect, the selected block placement option can be returned to the DFS client and the corresponding network controls can be sent to the SDN controller for each block as it is created and replicated. In another aspect, the enhanced DFS block placement module may use the steps described above to determine and return the selected block placement option to the DFS client and to send network control instructions to the SDN controller for a number of blocks at a time, and the number of blocks may be determined by the DFS client or by the enhanced DFS block placement module in accordance with its configuration and/or the configuration and/or the real time status of the cluster network.

In an embodiment, steps 713 and 715 may be omitted. That is, the algorithm depicted in FIG. 7 may be used to determine an improved placement option (step 711) and return the placement option to the block file creation node (step 717) without configuration of any network nodes. In this scenario, routing protocols (e.g., open shortest path first (OSPF), equal-cost multi-path (ECMP)) or load balancing systems, known to one skilled in the art, could determine the accommodation of replication traffic across the network.

Using Link Models in DFS Block Placement

As described above (illustrated, for example, by the network of FIG. 1), the process of file block replication and transfer to designated storage nodes may be conducted using TCP/IP protocols. For example, in HDFS, file blocks are transferred as remote procedure calls over TCP connections. As such, the performance of applications such as HDFS is often strongly correlated to the behavior of TCP/IP in the network. Since the behavior of TCP is reasonably well understood, the performance of such applications may be managed through the use of predictions or models describing how TCP may respond under past, current or expected future situations. Several TCP models are disclosed that may be used, for example, by the systems and methods for DFS block placement described herein. Using one or more TCP models can, for example, improve management of user SLA performance targets and guarantees.

Steady State TCP Behavior

If a network link is used to carry one TCP traffic flow (or "flow"), and that link is the only link used in transport, then the entire link capacity will be available to support the flow in steady-state operation. If a network link is used to carry n flows, and that link is the only link used in transport for all n flows, then in the steady state, each flow may be allocated the link capacity divided by n. Such capacity allocation assumes (a) the use of link scheduling schemes such as stochastic fair queuing with no preferential treatment (e.g., priority) given to any one flow over another and (b) no rate limitation at the source node.

If multiple network links are used to carry n flows, then the throughput of each flow will be governed by the network link which allocates the smallest capacity (the "constraint" link).

Available Bandwidth Calculation, Method 1

Returning to the methods outlined with reference to FIG. 7 and specifically step 709, the lowest available bandwidth of a current placement option (CPO) may be determined by calculating the bandwidth available for a candidate flow for each link in the CPO and then selecting the lowest result. The calculation of the available bandwidth for a candidate flow in a link may use one of the methods described below.

Figure 10:
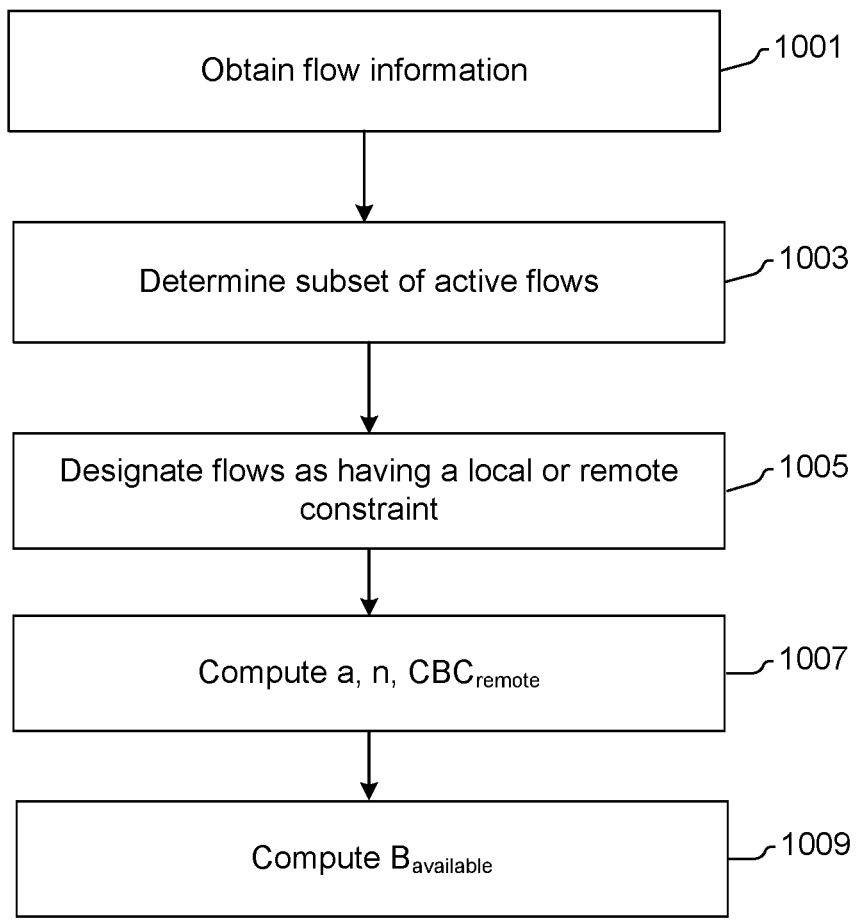
FIG. 10 is a flowchart of a method for prediction of available bandwidth on a link in accordance with aspects of the invention.

FIG. 10 is a flowchart of a method for prediction of available bandwidth on a link in accordance with aspects of the invention. The method may be performed, for example, in combination with the various methods described with reference to FIG. 7 and by the enhanced block placement module of FIG. 6. To provide specific examples, the method will be described with reference to various systems, modules, and methods; however, the method is not so limited.

In an embodiment, the calculation of the available bandwidth of a link for a candidate flow (e.g., one link of a CPO) may be based on the following equation:

$$B_{available} = \frac{C_{link} - \sum_{i=1}^{a} CBC_{remote}(i)}{n - a + 1} \quad \text{(Equation 1)}$$

Where:
- $B_{available}$ is the predicted bandwidth or capacity available to the candidate flow, if the candidate flow chooses to utilize this link;
- $C_{link}$ is the link capacity (e.g., 1 Gbps);
- n is the total number of active flows carried by the link;
- a is the total number of active flows carried by this link having a throughput constraint in another link ("remote constraint"); and
- $CBC_{remote}(i)$ is the Current Bandwidth Consumption (CBC) by the ith active flow with a remote constraint.

Enhanced DFS block placement module 600 of FIG. 6 may obtain $C_{link}$ as input Cluster Topology 660 which may be obtained in step 703 in FIG. 7. Values for n, a, and $CBC_{remote}$ may be determined as described below.

In step 1001, flow information is obtained for each link of the CPO using, for example, the Network Status interface 670. Per link flow information may include a set of unique flow IDs and corresponding CBC of the flow. The CBC of a flow represents the amount of link capacity (e.g., in Mbps) being used by a flow. CBC may be an instantaneous value or calculated as an average across some period of time (e.g., 1 second).

In step 1003, the non-active flows are removed from the set of unique flow IDs. A non-active flow is a flow with zero or very low average demand due, for example, to (a) very low, continuous data transmission, (b) infrequent, bursty data transmission, or (c) a connection that persists following the transport of data. A non-active flow may be determined by comparing the bandwidth consumption of each flow, measured over some time period, to a minimum threshold. Flows below the minimum threshold are considered non-active and are removed from the set.

A fixed threshold may be established a priori based on knowledge of the types and characteristics of flows used in the network. For example, a threshold of 1 Mbps over a 1 second period may be used for a network in which large file transfers are performed and are known to utilize at least 10 Mbps of system capacity. A 1 Mbps threshold thus becomes capable of filtering signaling, control plane or management traffic which often involves very small transactions consuming much less than 1 Mbps over a 1 second period.

Alternatively, statistical processing may be used to determine which flows are non-active. For example, multiple values of bandwidth consumption may be retained for each flow. If the current or recent bandwidth consumption is less than a longer term average consumption, then the flow may be deemed non-active. Alternatively, the threshold may be set to a percentage of the capacity currently consumed by the largest flow. For example, consider a 100 Mbps link carrying 50 flows where 25 of the flows are consuming 3 Mbps each and each of the remaining flows consumes less than 3 Mbps. In such a scenario, the threshold may be set to 5% of the maximum flow consumption of 3 Mbps or 150 kbps.

In an embodiment, the CBC of all flows deemed non-active is summed and stored as $CBC_{non\text{-}active,\ all}$. In an embodiment, step 1003 is omitted and no flows are removed from the set.

In step 1005, flows are designated as having a local constraint or a remote constraint. A local constraint refers to the situation in which the current link being analyzed is the throughput constraint (or limiter) for a flow. A remote constraint refers to the situation where the throughput constraint of a flow is not the current link being analyzed. For example, the throughput constraint may be a link other than the current link being analyzed, a bandwidth limitation in the data source itself (e.g., an HTTP server) which limits the egress data flow, or bandwidth limitation in the data sink which limits the ingress data flow.

The process to designate each flow as having a local or remote constraint may be based on the steady state nature of TCP operation wherein link capacity will be shared equally across all flows, unless flows are constrained elsewhere.

If the sum of CBCs for all flows on a link is less than the capacity of the link, or alternatively, less than some threshold related to the link capacity (e.g., 95% of link capacity), then all flows on that link may be designated as having a remote constraint. Alternatively, if the sum of CBCs for all active flows on a link is less than some threshold related to link capacity, then all active flows on that link may be designated as having a remote constraint. The threshold, for the latter case, may be a static parameter, determined heuristically, or may be dynamic and based, for example, on the number of non-active flows and the sum of CBCs for all non-active flows. For example, if the sum of CBCs on a 1000 Mbps link for all non-active flows is 100 Mbps, then the threshold may be set to 900 Mbps.

If in the above scenarios, the sum of CBCs is equal to the capacity of the link, or greater than a threshold, then one or more flows are locally constrained. In such a link, all flows with a CBC equal (or approximately equal, for example, within 1% or 5%) to the bandwidth consumption of the flow with the maximum CBC for that link may be designated as having a local constraint. All remaining flows may be designated as having a remote constraint.

Alternatively, flows may be designated as having a local constraint if they have a CBC similar to, but not equal to, the bandwidth consumption of the flow with the maximum CBC. For example, a flow may be designated as having a local constraint if it has a CBC above a minimum threshold value, where the threshold may be a function of the CBC for the flow having the maximum CBC. For instance, the threshold may be 95% of 325 Mbps, where 325 Mbps is the CBC for the flow having the maximum CBC of the link.

In step 1007, values for a, n and $CBC_{remote}$ are determined. The value n is the number of active flows for each link and may be determined by totaling the number of flows remaining in the set following step 1003. The value of a is the number of active flows having a remote constraint, and may be determined by totaling the number of flows identified as having a remote constraint in step 1005. The values of $CBC_{remote}$ are the subset of bandwidth consumptions (obtained in step 1001) for each active flow having a remote constraint. One skilled in the art would appreciate that the set of flows and the corresponding designations of a flow being active and having a local or remote constraints may be implemented in a various ways, including in a table or database stored in memory.

In step 1009, $B_{available}$, the bandwidth (or capacity) available to a candidate flow, may be calculated using Equation 1.

In an embodiment, the effect of the non-active flows, may be included in the calculation of $B_{available}$, by using Equation 2 in step 1009 instead of Equation 1.

$$B_{available} = \frac{C_{link} - CBC_{non-active,all} - \sum_{i=1}^{a} CBC_{remote}(i)}{n - a + 1} \quad \text{(Equation 2)}$$

In an alternative embodiment, the method above may be simplified by ignoring the distinction between flows having local or remote constraints. For example, steps 1005 and 1007 of FIG. 10 may be omitted and $B_{available}$ may be calculated using Equation 3 or 4:

$$B_{available} = \frac{C_{link}}{n+1} \quad \text{(Equation 3)}$$

$$B_{available} = \frac{C_{link} - CBC_{non-active,all}}{n+1} \quad \text{(Equation 4)}$$

Available Bandwidth Prediction, Method 2

Figure 11:
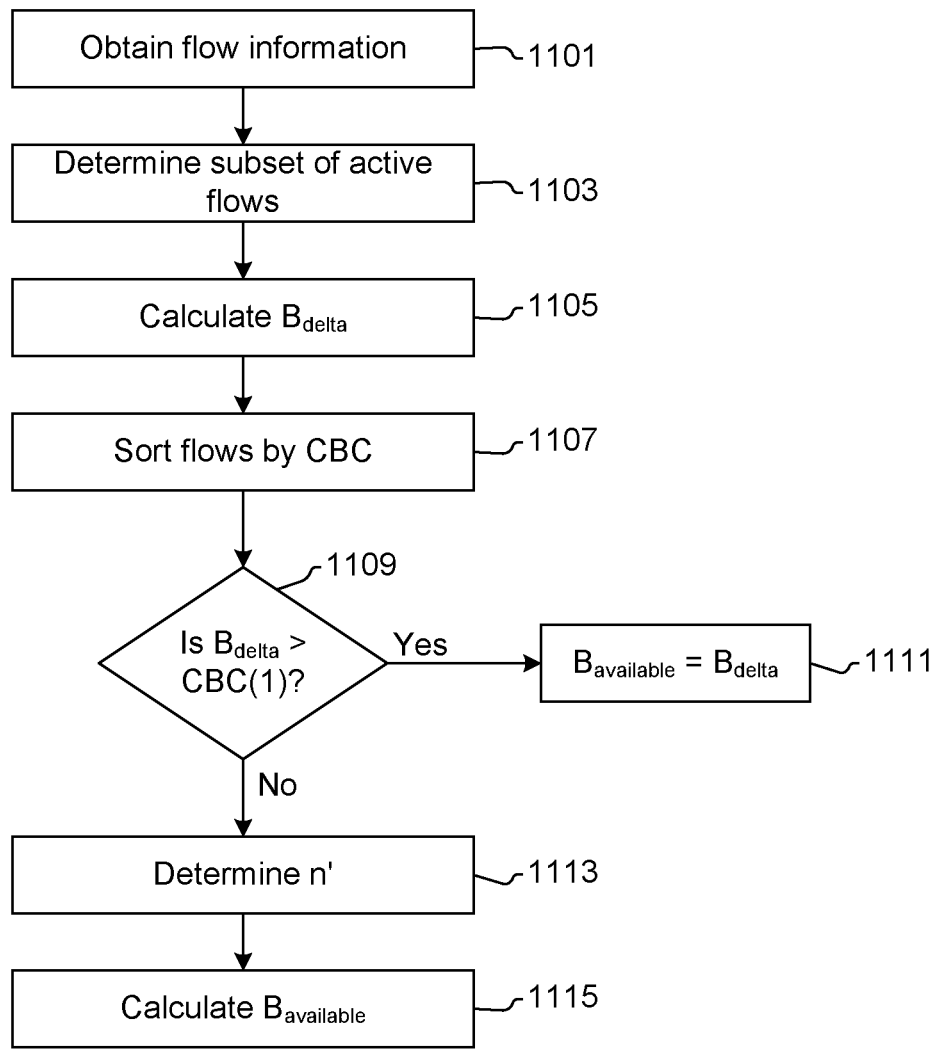
FIG. 11 is a flowchart of another method for prediction of available bandwidth on a link in accordance with aspects of the invention.

FIG. 11 is another flowchart of a method for prediction of available bandwidth on a link in accordance with aspects of the invention. The method may be performed, for example, in combination with the various methods described with reference to FIG. 7 and by the enhanced block placement module of FIG. 6. To provide specific examples, the method with be described with reference to various systems, modules, and other methods; however, the method is not so limited.

In step 1101, flow information is obtained. Step 1101 may be same as or similar to step 1001 of the method of FIG. 10. In step 1103, non-active flows are removed from the set of unique flow IDs. Step 1103 may be the same as or similar to step 1003 of the method of FIG. 10. Similar to the method of FIG. 10, step 1103 may be omitted from the method of FIG. 11.

In step 1105, a variable, $B_{delta}$, is assigned the value of $C_{link}$ minus the sum of CBC for all active flows. Alternatively, $B_{delta}$ may be assigned the value of $C_{link}$ minus the sum of CBC for all flows (active and non-active).

In step 1107 the active flows are sorted by CBC in descending order. The active flow with the highest CBC may be designated as CBC(1) and may be referred to as the flow with a CBC having an index of one. The lowest CBC is CBC(n). This flow may be referred as the flow with a CBC having an index of n.

In step 1109, the value of $B_{delta}$ is compared to CBC(1). Alternatively in step 1109, the value of $B_{delta}$ may be compared to CBC(1) plus a delta factor, where the delta factor is intended to filter sampling noise in a real-world system. The delta factor may be an absolute bandwidth or rate (e.g., 10 Mbps) or may be a function of CBC(1), for example, a percentage of CBC(1) such as 10% of CBC(1).

If the value of $B_{delta}$ is greater than CBC(1) or CBC(1) plus a delta factor, then the method proceeds to step 1111 where $B_{available}$ is set equal to $B_{delta}$. This flowchart branch is used to address situations in which all existing flows are remotely constrained and will remain so even following the addition of a new flow. In such a scenario, the bandwidth available to a new flow is simply the unused capacity of the link, $B_{delta}$.

If the value of $B_{delta}$ is not greater than CBC(1) or CBC(1) plus a delta factor, then the method proceeds to step 1113 where n' is determined. The parameter n' is the CBC index which predicts the boundary between the subset of locally constrained flows and the subset of remotely constrained flows if an additional flow were to be added. Flows having a CBC with an index less than or equal to n' are predicted to be locally constrained with the addition of a new flow. Flows having a CBC with an index greater than n' are predicted to remain remotely constrained even with the addition of a new flow.

The value of n' may be determined by numerous methods and based on the following aspects of flow behavior: (a) flows constrained locally will share the available bandwidth equally, (b) flows constrained remotely may become locally constrained once a new flow is added, and (c) no flows, such as a remotely constrained flow, will consume more bandwidth than that of locally constrained flows.

For example, the value of n' may be determined by finding the largest n' which satisfies the following inequality:

$$\frac{B_{delta} + \sum_{i=1}^{n'} CBC(i)}{n' + 1} < CBC(n')$$

In step 1115, the bandwidth available to a new flow, $B_{available}$ is calculated based on the value of n' determined in the previous step. The value of $B_{available}$ may be computed as follows $$B_{available} = \frac{B_{delta} + \sum_{i=1}^{n'} CBC(i)}{n' + 1}$$

Calculating the Effect on Existing Flows

The methods of FIG. 10 and FIG. 11 for calculating the available bandwidth for a candidate flow may be used to calculate the effect that a new flow may have on existing, active flows. In an embodiment, step 1009 of FIG. 10, using any of equations (1) through (4), may be modified to include the determination of the predicted bandwidth consumption (PBC) for all active flows on a link as follows:

PBC($i$)=$B_{available}$ for all active flows $i$ with CBC($i$)>
$B_{available}$      (Equation 5)

PBC($i$)=CBC($i$) for all active flows $i$ with
CBC($i$)<=$B_{available}$      (Equation 6)

In an alternative embodiment, step 1115 of FIG. 11 may be augmented using Equations 5 and 6 above. In Equations 5 and 6 above, the PBC is calculated for a flow with reference to a single link (a "local" PBC). However, flows may be carried using more than one link. As such, a global PBC may be computed for each flow which is carried across more than one link. In an embodiment, a set of local PBCs may be generated for a flow by using Equations 5 and 6 for each link carrying the flow. The global PBC for that flow is the local PBC having the lowest value.

Steps 1009 of FIG. 10 and 1115 of FIG. 11 may be augmented by computing a global PBC for each active flow, as described above.

Use of Predicted Bandwidth Consumption

In an aspect, the set of PBCs calculated for existing flows may be used to determine the effect a block placement option may have on the SLA/QoS requirements for existing flows (and their respective users). Similarly $B_{available}$ may be used to evaluate whether a particular block placement option meets the SLA/QoS requirements of the user generating a new block request.

Methods describing the management of user SLA/QoS requirements and performance targets or guarantees may be similarly applied to scenarios in which SLA/QoS requirements and performance targets or guarantees are associated with individual jobs. A job may be defined, for example, as a block replication process. It may be possible that a single user initiates multiple jobs, each job having unique SLA/QoS requirements.

For example, the set of PBCs and $B_{available}$ may be calculated and used in step 707 of FIG. 7. In an enhanced step 707, a block placement option may be eliminated from list L when one or more of the PBCs of active flows using one or more network links of a block placement option fall below the minimum SLA/QoS performance target or guarantee. For example, consider a gold-level user with an SLA which guarantees that flows will be carried with at least 500 Mbps of network bandwidth. If a block placement option for a new block request from another user yields a PBC for a flow associated with the gold-level user of 400 Mbps (less than the SLA guarantee of 500 Mbps), then the block placement option may be removed from list L. Similarly, if the gold-level user creates a new block request, and the $B_{available}$ of a block placement option is 350 Mbps (also less than the SLA guarantee of 500 Mbps), then the block placement option is removed from list L.

In an embodiment, $B_{available}$ and the set of PBCs, along with their associated SLA performance targets or guarantees, may be used as inputs to the cost function used in step 709 in FIG. 7 to evaluate each block placement option in the list L. For example, the following network cost function may be used:

$$cost_{network}k = w_1 \cdot cost_1 + w_2 \cdot cost_2 + w_3 \cdot cost_3 \quad \text{(Equation 7)}$$

in which:

$$cost_1 = \frac{block\_size(BPR)}{B_{available}};$$

$cost_2 = 0$, for $B_{available} \geq$ minimum SLA bandwidth target or guarantee, for the user associated with the new block request, or if no SLA bandwidth target or guarantee exists;
  1, for $B_{available} <$ minimum SLA bandwidth target or guarantee, for the user associated with the new block request;
$cost_3$=the number of other users having one or more existing flows along one or more network links of the block placement option where the PBC<minimum SLA bandwidth target or guarantee; and
$w_1$, $w_2$, $w_3$ are weights controlling the relative importance of the performance term (cost1), SLA term for the user of the new block request (cost2) and the SLA term for existing users affected by the new block request (cost3), respectively. Weights may be set to zero to eliminate the effect of one or more terms.

One skilled in the art would appreciate that this cost function may also be combined with cost functions having other terms, such as those described with reference to FIG. 6 and FIG. 7.

Alternatively, the term $cost_3$ may be a function of both (1) the number users with a PBC below a corresponding minimum SLA bandwidth target or guarantee and (2) the amount by which the PBC falls below the target or guarantee. For example:

$$cost_3 = \sum_{j=1}^{m} v_j * \left(\frac{SLA(j) - APBC(j)}{SLA(j)}\right)^{u_j}$$

Where:
  m is the number of users having one or more existing flows along one or more network links of the block placement option where the PBC<minimum SLA bandwidth target or guarantee;
  SLA(j) is the minimum SLA bandwidth target or guarantee (e.g., in Mbps) for the $j^{th}$ user having one or more existing flows along one or more network links of the block placement option where the PBC is less than the minimum SLA bandwidth target or guarantee;
  APBC(j) is the aggregate PBC (e.g., in Mbps) for the $j^{th}$ user having one or more existing flows along one or more network links of the block placement option where the sum of PBCs (local or global) for all flows associated with that user on a link is less than the minimum SLA bandwidth target or guarantee. The APBC may be calculated by summing the PBC for all active flows on a link associated with a user. If a user has a flow along more than one network link in which the APBC is less than the minimum SLA bandwidth target or guarantee, then the lowest APBC may be used for that user in the calculation of $cost_3$;
  $u_j$ is an optional parameter which, when set to a value greater than 1, may be used to assign increasingly larger costs for larger differences between an APBC and a corresponding SLA performance target or guarantee. This parameter may vary as a function of specific user or user classes; and
  $v_j$ is an optional parameter which may be used to overweight or underweight the effect of an SLA violation for certain users or user classes. For example, v may be set to 1 for bronze class users, 2 for silver class and 3 for gold class users, an SLA characteristic which may be known in advance via SLA policy/QoS interface 610.

Further SLA Management Techniques

In highly congested network conditions, it is possible that no block placement option (BPO) meets the placement policy and SLA/QoS requirements for the existing or new user, when evaluated in step 707 of FIG. 7. Similarly, it may be possible that no placement options exist with a cost below a maximum threshold when evaluated in step 711 of FIG. 7. A number of alternative approaches may be used to address these scenarios.

Reduced Location Policy Constraints

In a first approach, a second iteration of step 707 generating a $2^{nd}$ list L may be performed but with fewer location policy constraints. For example, step 707 may be repeated without requiring the placement options to meet some or all of the block placement location policy. The default Hadoop block placement location policy has two constraints (a) to place at least two of the replicas in different racks; and (b) to place at least two of the replicas in a single rack. In generating a $2^{nd}$ list L, constraint (a) or (b) or both may be eliminated.

SLA Degradation

In a second approach, the generation of a $2^{nd}$ list L may be performed with the SLA/QoS requirements of one or more users or classes of users reduced or eliminated. For example, in a first iteration of step 707, $B_{available}$ (for the new block placement request) and the set of all PBCs for active flows associated with other users having an SLA may be evaluated against a corresponding target or guaranteed bandwidth to generate list L, as previously described. If a first list L is empty, a $2^{nd}$ list L may be generated only considering PBCs for flows associated with users having an SLA with a guaranteed (but not target) bandwidth.

Alternatively, a $2^{nd}$ list L may be generated by reducing or eliminating the SLA/QoS requirement of the user making the new block placement request. If a suitable BPO is found using this second list, an optional message may be sent to the Client 510 (possibly by way of File Manager Node 520) requesting permission to suspend the SLA requirement for this replication.

A $2^{nd}$ list L may be generated only considering those PBCs for flows associated with users having an SLA with an equal or higher class of service than the user associated with the new block request. For example, consider a scenario having three SLA classes, listed in increasing importance and priority: bronze, silver, and gold. If a new block request is being processed for a user with a silver SLA, then a $2^{nd}$ list L may be generated only considering the effect that the new flow will have on existing flows of users with silver and gold SLAs. Flows associated with users having a bronze SLA will not be considered. If a suitable BPO is found using the $2^{nd}$ list L for the silver user, one or more flows associated with users having a bronze SLA may no longer meet their SLA performance targets or guarantees.

This method may be extended to operation beyond two iterations. By doing so, many PBC sets, each having fine-grained differences between them, may be evaluated. This approach may be used to precisely determine the impact that a new flow may have on existing flows and their users. Using the above example of a silver user making a new block request, a PBC set may be created suspending the bandwidth guarantee of a single bronze user to generate a $2^{nd}$ list L. If a suitable BPO is not found for the silver user, a PBC set suspending the guarantees for two bronze users may be used to generate a $3^{rd}$ list L. This process may continue until a suitable BPO is found for the silver user, or it is determined that no suitable BPO may be found without an unacceptable effect on the performance of existing users (e.g., suspension of the flows associated with a gold user).

Reduced Cost Function Constraints

In a third approach, the above methods may be applied in a similar fashion for situations where no BPOs exist having a cost function value below a maximum threshold, as evaluated in step 711. In such a situation, the cost function may be adjusted to reduce the quantity or importance of certain cost function criteria (e.g., terms in the cost function equations previously discussed). For example, consider a scenario in which the $cost_{network}$ function included a term quantifying energy usage, as described above with reference to FIG. 7. If no BPO exists with a cost below a maximum threshold, then the cost for each BPO may be recalculated after setting the weighting factor of the energy usage term (e.g., $weight_{network\_power}$) to zero.

Methods for Iteration

One skilled in the art would appreciate that the above iterative methods may be implemented in various ways. In an embodiment, step 707 is repeated completely, with the list L being filtered based on a different set of criteria (e.g., different sets of PBCs) for each iteration. Alternatively, step 707 may be performed once, with the SLA/QoS evaluation performed for more than one set of PBCs in parallel. Similarly step 709 may be simply repeated using different cost functions until a cost function results in a least one suitable BPO. Alternatively, step 709 may be executed one time, using a set of cost functions determined in advance. In this latter case, step 711 may be modified as follows:

Select the BPO with the lowest cost below a maximum threshold, based on use of the cost function having the most desired set of evaluation criteria.

If no BPO exists, then select a BPO with the lowest cost below a maximum threshold, based on use of the cost function having the second most desired set of evaluation criteria, and so on.

Replication Delay

In a fourth approach, the replication process may be delayed if no suitable BPO is found. In an embodiment, the delay may be for a specified period of time, for example, 5 seconds, after which steps 703 through 707, or possibly steps 703 through 711, may be repeated. This operation may continue indefinitely, or may terminate after a fixed number of attempts. A message may be sent to the user, for example, Client 427 and file manager node 428 indicating that a replication is delayed or terminated.

Limited Reduction of Replication Factor

In a fifth approach, the replication factor of a new block request is reduced and a new list L is created. As above, this approach may involve multiple iterations, for example, to determine if a suitable block placement option exists first for a replication factor of 3, then 2 and then 1. One skilled in the art would appreciate that this iterative method may be implemented in various ways, including full iteration of step 707. Alternatively, the method to develop an initial set of BPOs (e.g., list $L_A$) may be modified to generate a superset of BPOs for replication factors from 1 to the desired replication factor (e.g., 3). All subsequent steps to filter BPOs not meeting the requirements may process all replication factor options in parallel by operating on the BPO superset.

If the replication factor of a new block request is reduced, a message may be sent from the enhanced DFS block placement module 600 to file manager node 520 and Client 510 indicating the difference between requested and actual behavior.

If the replication factor of a new block request is reduced, a supplemental request may be created in the file manager node 520. The supplemental request may consist of the previous file block which was not successfully replicated the desired number of times, along with the replication factor needed to reach the original, desired replication quantity ("delta replication factor"). The supplemental request may be sent periodically by the file manager node 520 to the enhanced DFS block placement module 600 which responds with a recommended block placement, if one exists. Alternatively, the supplemental request may be made one time, stored by the enhanced DFS block placement module 600 and periodically evaluated (e.g., every 5 seconds) via, for example, steps 703 through 707 until a suitable BPO is determined, a maximum number of attempts is made, or the file block is no longer used or needed.

Global Reduction of Replication Factor

The enhanced DFS block placement module 600 may enforce a replication factor limit based on knowledge of severe congestion or performance degradation in the network. For example, based on network status 670, the enhanced DFS block placement module 600 may calculate the average network utilization by dividing the sum of the CBCs across all network links by the sum of the link capacity across all network links. If the average network utilization exceeds a maximum threshold (e.g., 70%), then the enhanced DFS block placement module 600 may enforce a maximum replication factor of 2.

This information may be communicated immediately upon determination to the file manager node 520, or may be communicated to the file manager node 520 at the time of a block placement request. This information may be communicated to each client 510 by either file manager node 520 or enhanced DFS block placement module 600. Each client 510 may choose to suspend future file writes or block creation requests of existing file writes, until the restriction is removed, or client 510 may continue to request file writes and block creation requests knowing that the replication factor will be reduced.

Multiple thresholds may be used to further improve operation. For example, a $2^{nd}$ average network utilization threshold of 85% may be established. When the average network utilization exceeds this $2^{nd}$ threshold, the maximum replication factor may be further reduced to 1.

If the replication factor of a block placement request is reduced, a supplemental request may be created by the file manager node 520. Supplemental requests may be used, as previously described, to create additional file block replications, once network conditions allow, so that the original number of desired replications are ultimately created.

A replication factor limit may be globally applied to all users and block creation requests. Alternatively, different replication factor limits may be applied to specific users or classes of users. For example, under certain network conditions, requests from bronze level users may be subjected to a more restrictive limit (e.g., replication factor of 1), whereas requests from silver level users may be subjected to a less restrictive limit (e.g., replication factor of 2), and requests from a gold level user subjected to no restriction.

Replication Pre-Emption

In a sixth approach, one or more existing block replication processes (or pipelines) may be suspended, and optionally resumed at a later time, in order to create bandwidth for a new block creation request with higher importance or priority. For example, two block replication processes for two users each with a Bronze SLA may be suspended in order to free enough capacity to determine a suitable BPO meeting the SLA requirements for a Gold user. In an aspect, one or more file replication processes, each consisting of multiple file block replication processes, may be terminated or delayed.

The effect of suspending an existing block replication process on a candidate flow may be predicted via calculation of $B_{available}$ as described above with the following modifications:

The value of n may be reduced by the number of flows to be eliminated.

The value of a may be adjusted by the number of flows to be eliminated having remote constraints.

An iterative approach may be used to determine the minimum number of block replication processes that need to be suspended in order to support a new block request. The iterative approach may begin first with suspension candidates having the lowest importance or priority (e.g., processes associated with users having no SLA) and continue to add suspension candidates with increasing importance or priority.

A block replication process or pipeline may be suspended using various methods. A message may be sent from the enhanced DFS block placement module 600 to the client 510 (optionally relayed through file manager node 520) requesting the immediate cessation of all new packet transmissions associated with the current block replication process. A message may be sent to all but the last storage node used for the block replication pipeline requesting the immediate cessation of all packet forwarding associated with each suspended block replication process. Each of the storage nodes 50x and/or client 510 may send an acknowledgment back to the enhanced DFS block placement module 600 and file manager node 520 indicating compliance with the request. In an aspect, once a suspend message is received, client 510 may suspend all subsequent block creation requests for the file associated with the suspended process. Alternatively, file manager node 520 may reject all block creation requests for subsequent file blocks associated with the suspended process.

In an embodiment, each suspended block replication process may become a candidate to resume replication. A delta block request may be created in file manager node 520 for each suspended process. The delta block request may consist of the file block which was not successfully replicated (or the subset of packets not successfully replicated), along with the list of storage nodes having a partial file block. The delta block request may be made periodically by the file manager to the enhanced DFS block placement module 600. The enhanced DFS block placement module 600 may respond with a resume OK message when replication may be restarted or resumed. The resume OK message may also include information confirming that replication may resume using (a) the previous BPO, (b) the previous set of storage nodes but using a different replication order and/or network path, or (c) that block replication should be restarted using a different BPO consisting of at least one new storage node. In the latter case, then file manager node 520 may request deletion of the partial file blocks previously stored.

Alternatively, the delta block request may be made one time, stored by the enhanced DFS block placement module 600 and periodically evaluated (e.g., every 5 seconds) via steps 703 through 707 until a suitable BPO is determined or possibly a maximum number of attempts is made.

Following the receipt of the resume OK message, the file manager node 520 may initiate the pipeline writes needed to complete the block replication process, or the file manager node may request that client 510 initiate the pipeline write.

In an embodiment, following the suspension of a block replication process, file manager node 520 may request the deletion of each partial file block stored in one or more storage nodes. Once completed, a resume OK message may be sent to each Client 510 having one or more suspended block replication process. Once Client 510 receives the resume OK message, it may begin sending new block creation requests for the file blocks previously suspended. Such new block creation requests may not be granted if network conditions have not improved, however use of previously described techniques may be used to ensure that such a condition is handled properly.

Once a resume OK message is received by client 510, the suspension of all subsequent block creation requests for the file associated with the suspended process may be removed.

One skilled in the art would appreciate that in each SLA management technique described above, there may exist certain network conditions in which no suitable BPO may be found. In such a case, and for any of the techniques, a maximum number (or duration) of attempts may be made after which operation using a technique will terminate. In such a case, a message may be sent to both file manager node 520 and possibly client 510 indicating a failure of the technique to determine a suitable BPO.

One skilled in the art would appreciate how the above SLA management techniques may be used in various combinations, each potentially being employed under different circumstances or potentially being performed one followed by another. For example, the technique of replication delay may be attempted first, and if unsuccessful (e.g., a maximum number of attempts made), a limited reduction of replication factor may be attempted next. If that technique fails to successfully identify a suitable BPO, then replication preemption may then be attempted.

It should be appreciated that the above techniques related to FIGS. 10 and 11, as described in the related text above, can be utilized to predict the performance of TCP flows in other network environments, such as wireless and wired communication network environments, and are not necessarily limited to the block placement applications as set forth herein.

A Crawler Algorithm for DFS Block Placement Optimization

A crawler algorithm is now described. The crawler algorithm will be described with reference to systems described above but may be used with any suitable system. In particular, the description of will reference the network described in FIG. 1, the process of file block replication, and transfer to designated storage nodes. Various methods described herein to estimate the available Bandwidth ($B_{available}$) for a new traffic flow ("flow") in each link in the file block placement pipeline for a block placement option may be used with the crawler algorithm.

Methods described above may generate an exhaustive plurality of all possible file block placement options (CPO) for a file block, wherein each block placement option is associated with at least one of the data storage nodes. A cost parameter may be associated with each of the plurality of file block placement options, and the selection of one of the plurality of file block placement options may be based at least in part on the cost parameter associated with each file block placement option.

In other aspects described herein, the selection of the chosen block placement option may not require an exhaustive cost determination of all possible options; but instead is performed via a different set of methods that rely on a making a selection link by link in the pipeline based on local link information. Methods described now may be referred to as "crawling methods."

The methods described above may perform calculation of a cost parameter for an exhaustive list of file block placement options. This may result in a large number of calculations. For example, for a fat tree network with 128 storage nodes, the file block placement options may possibly reach a count of hundreds of thousands of options, and the count may escalate further as the number of storage nodes increase in the system.

Accordingly, aspects described herein aim to reduce calculations and may be useful, for example, in some systems that aim to optimize processing requirements or in large systems where these calculations may become beyond practical processing capability.

Figure 12:
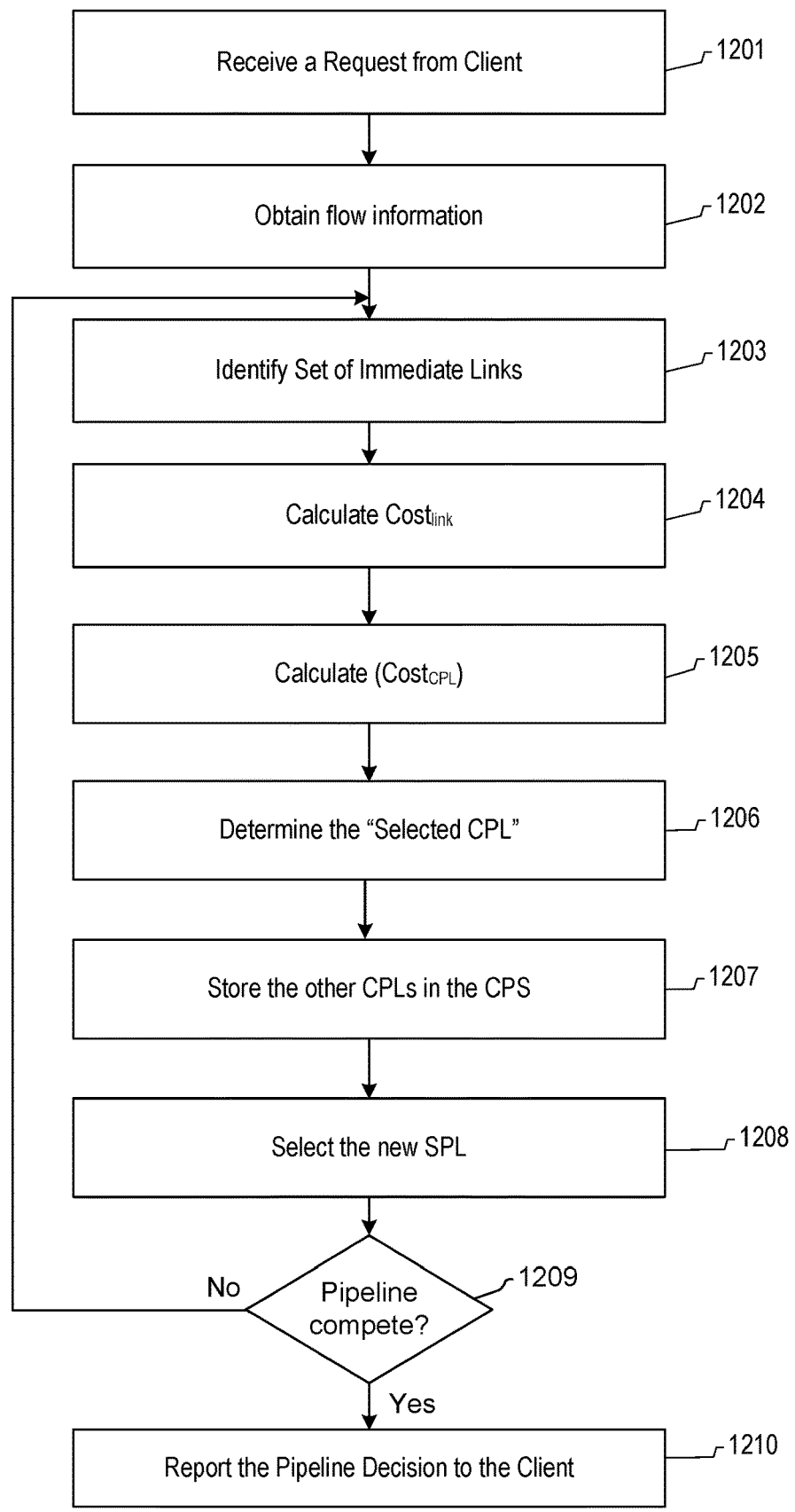
FIG. 12 is a flowchart of a process for use in file block placement in accordance with aspects of the invention.

Alternative aspects and methods are described herein that may, for example, provide more scalability and more efficient processing in the handling of file block placement decisions in big networks A Basic Crawler Method The method depicted in FIG. 12 may be used in performing a file block placement. For example, the steps in FIG. 12 may replace (or supplement) the steps illustrated in FIG. 7.

The method depicted in FIG. 12 may be triggered by the DFS client sending a new block request to the file manager node to create a new file block. The request to create a new block may be for the first block of a file, or for a new block to be appended to an existing file. This is shown in step 1201 of FIG. 12, which is similar to step 701 of FIG. 7. In response to this request, a file manager node such as file manager node 520 of FIG. 5 in collaboration with enhanced DFS block placement module 600 of FIG. 6, responds with a block ID for the new block and a list of storage nodes that may be used for the block replication, and optionally the path used in the replication. The remaining steps of FIG. 12 show a procedure to generate this response.

In step 1202, enhanced DFS block placement module 600 obtains flow information from the network. This information may include number of flows per link, flow IDs, and the CBC of each flow. Note that CBC is as described above and stands for "Current Bandwidth Consumption".

This flow information can be obtained for all links at the beginning of the algorithm as shown in step 1202. Alternatively, this information may be obtained on a per-link basis as the information is required by the algorithm such as during the processing of step 1204 or, a hybrid approach may be taken, by obtaining link information for multiple links throughout the algorithm such as during the processing of step 1204. The selection of which link to obtain information from may be based, for example, on the outcome of step 1203.

Next, the algorithm aims to identify the selected file block replication pipeline (SPL). An SPL is an ordered list of network links that describe a pipeline used to carry replication data from a client to one or more storage nodes. An SPL may be created in the form of a file, linked list, table, database, or other data structure. An SPL may contain a cost parameter for the entire set of network links ($Cost_{SPL}$) which can be based on the cost of each link.

The algorithm can determine the SPL link by link as follows. The SPL will start at the DFS client which issued the request in step 1201 and which has the block to be replicated. The SPL may start with a cost ($Cost_{SPL}$) of zero and with no links. Then the algorithm will determine the links to be appended to the SPL until the SPL concludes at the destination storage nodes.

For each iteration in the algorithm, in step 1203, the algorithm identifies a set of "immediate links". An immediate link is a link that is a candidate for the algorithm to add to the current SPL in order to build the SPL to reach its destination.

One criterion for the identification of an immediate link may be to consider only those links that connect to the node located at the end of the current SPL and whose destination is not a node that exists in the current SPL.

Another criterion for identifying the set of immediate links may be based on network topology. One example of this is to consider only those links on the northbound interface of a network node in a hierarchical network (i.e. links that bring traffic closer to the network core), or those links on the southbound interface (i.e. links that bring traffic closer to the network edge). Note that, in this case, selection of links on the northbound interface versus the southbound interface may be based on the location of the current node in the path, and the intermediate destination for the crawler. So if the crawler is aiming to reach the core of the network, the northbound interface would be selected, while if the crawler is targeting to reach the edge of the network, the southbound interface would be selected A further criterion for the identification of an immediate link may be based on a block placement policy (e.g. a next storage node must be within the same network pod or same rack, or a pipeline must utilize links of a specific layer of switches within a hierarchical network). The identification of the set of immediate links will be based on compliance to these restrictions or policies.

Once the set of immediate links are identified, a cost for each immediate link ($Cost_{link}$) is calculated as in step 1204. The cost of a link may be based on one or more factors and may be made via a calculation of a cost function using weighted values of those factors. Some examples of these factors are number of flows in this link, number of active flows in the link, and available bandwidth of the link ($B_{available}$) as described above. Various methods to calculate a prediction for the ($B_{available}$) may be used.

For example, $Cost_{link}$=Number of active flows in this link (where definition of active flows is as described above).

For each immediate link, a new pipeline is composed by appending the immediate link to the end of the current SPL. This new pipeline will be referred to as "Candidate Pipeline" or CPL.

In step 1205, the cost of the CPL ($Cost_{CPL}$) is calculated based on the immediate link cost ($Cost_{link}$) and the current SPL cost ($Cost_{SPL}$). For example, $Cost_{CPL}$ may be calculated as follows:

$$Cost_{CPL}=\max(Cost_{SPL}, Cost_{link})$$

Other costs of the CPL may also be used. For example, when a link cost is used (e.g., available bandwidth of the link) where higher values are preferred, the cost may be calculated as the $\min(Cost_{SPL}, Cost_{link})$.

In step 1206, the CPL with the lowest $Cost_{CPL}$ is determined, and is referred to as the 'selected CPL.' In the case that more than one CPL has the same or similar (e.g. within 10%) lowest $Cost_{CPL}$, then one CPL is selected from that subset of CPLs with the same or similar lowest $Cost_{CPL}$. The selected CPL may be determined, for example, by randomly selecting the CPL from the subset of CPLs with the same or similar lowest $Cost_{CPL}$.

Another criteria that may be used to determine the selected CPL among a set of CPLs with equal or similar cost, is to select the CPL based on the cost of the immediate link associated with it.

For example, consider having 2 immediate links
Link #1 with $Cost_{link1}$
Link #2 with $Cost_{link2}$
Assume, $$Cost_{SPL} > Cost_{link1} > Cost_{link2}$$

Accordingly, and based on the equation above for calculating $Cost_{CPL}$, both CPLs will have equal cost. One approach for determining the selected CPL is to pick the one with minimum immediate link cost (in this case it will be the one associated with Link #2).

Another approach is to select the CPL with the highest immediate link cost (Link #1 in this example). A motivation for using this approach is to save the link with lower cost for another pipeline supporting a different file block replication process, which may lead to improved overall system performance.

Figure 13:
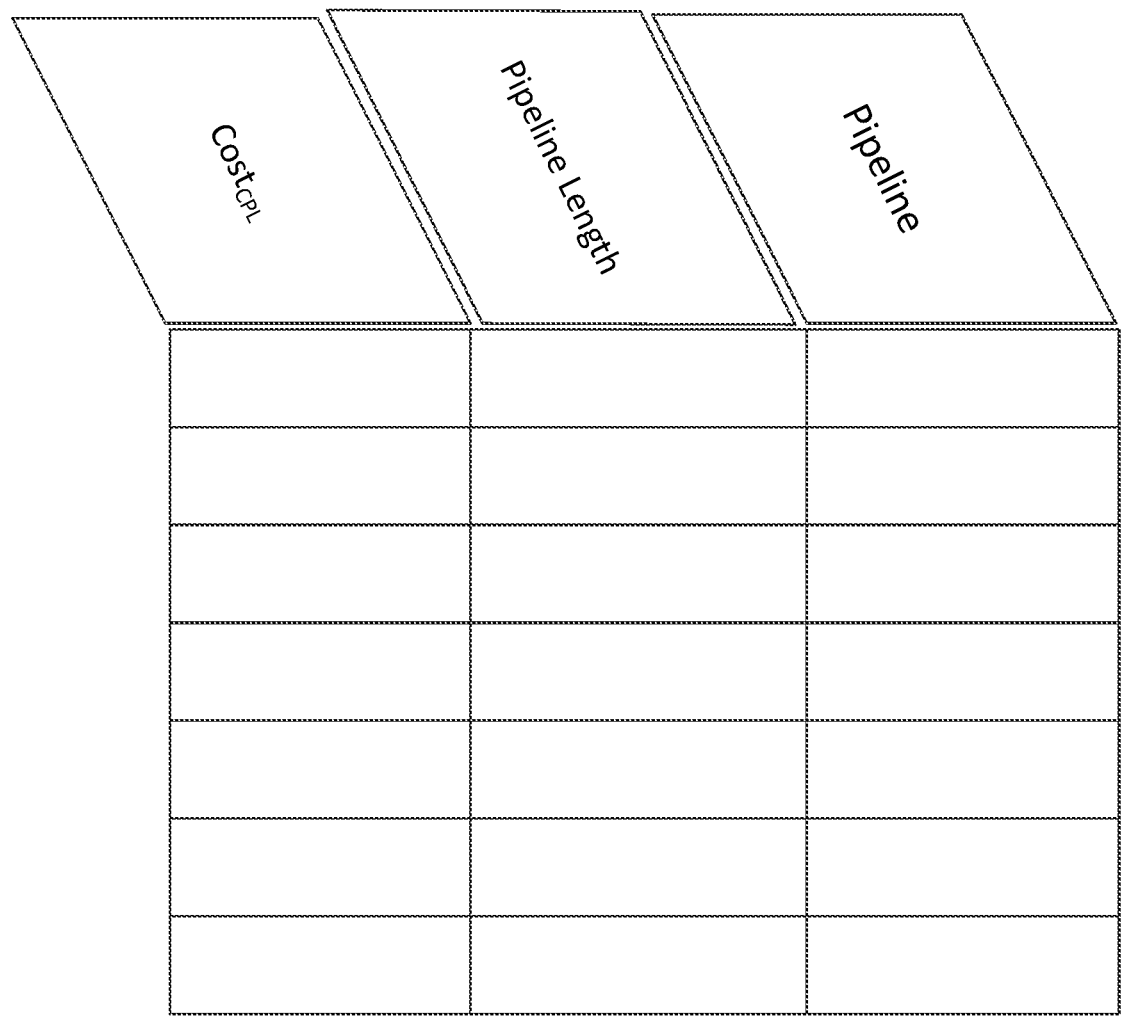
FIG. 13 is a block diagram of a candidate pipeline store in accordance with aspects of the invention.

In step 1207, all CPLs except for the selected CPL are stored in the Candidate Pipeline Store (CPS) along with some of their parameters. The CPS may be a table of CPLs along with their length (link count in the pipeline) and cost ($Cost_{CPL}$), or may be some other data structure or data storage construct. In this aspect, information in the CPS may be used for obtaining the SPL for this block placement decision, and it is not used in future block placement decisions. Another aspect may consider using information in CPS for future block placement decisions as well. In that case, CPS may contain more info for each stored CPL such as an expiry time to define the validity time of this information. The reader is referred to FIG. 13 for an example of a candidate pipeline store (CPS).

In step 1208 of FIG. 12, the $Cost_{CPL}$ for the selected CPL is compared with $Cost_{SPL}$. If they are the same value, then the selected CPL becomes the new SPL and the algorithm proceeds to the next step. If, however, the selected CPL has a higher cost than the current SPL, then the CPS is searched for other CPLs with a cost less than that of the selected CPL. If none are found, then the selected CPL becomes the new SPL.

If a CPL is found in the CPS with a lower cost than that of the selected CPL, then that CPL with the lower cost is removed from the CPS and becomes the new SPL. Additionally, the selected CPL is stored in the CPS.

If there are multiple CPLs in the CPS with a cost lower than the selected CPL, a selection criterion will be used to determine which CPL to remove from the CPS and to be assigned as the new SPL. One possible criterion may be to select the CPL with the least cost. In case there are multiple CPLs that meet this criterion, another selection criterion may be considered such as to base the selection on the CPL pipeline length. In an aspect, the CPL with the lowest cost and shortest pipeline length may be removed from the CPS and may be assigned as the new SPL. In another aspect, the CPL with the lowest cost and longest pipeline length may be removed from the CPS and may be assigned as the new SPL.

In step 1209, the algorithm iterates steps 1203-2008 until the SPL reaches its final destination as the pipeline is complete. This may be defined as reaching the nth storage node where n is the desired block replication factor. The desired replication factor may be a stored configuration in the crawler or alternatively, it may be obtained from another node in the system. It may be a fixed value for all block placement decisions, or alternatively, it may be variable per request, and in this case it may be obtained in step 1201 along with the block placement request from the client.

In step 1210, enhanced DFS block placement module 600 reports the placement decision 630 to the file manager node 520 which in turn reports the placement decision to the client 510. Optionally, enhanced DFS block placement module 600 sends network control instructions 640 to the controller node, which may be an SDN controller or may be an OAM or EMS system/device operating in, or in connection with, the cluster. This decision may be cached for some time to be used in future client block placement requests. This may be associated with some expiry time for the validity of this data.

In various embodiments, steps shown in FIG. 12 may be omitted or altered and other steps may be added. Additionally, some steps may vary in different iterations. For example, in a first iteration, some steps may be simplified or omitted.

Figure 14:
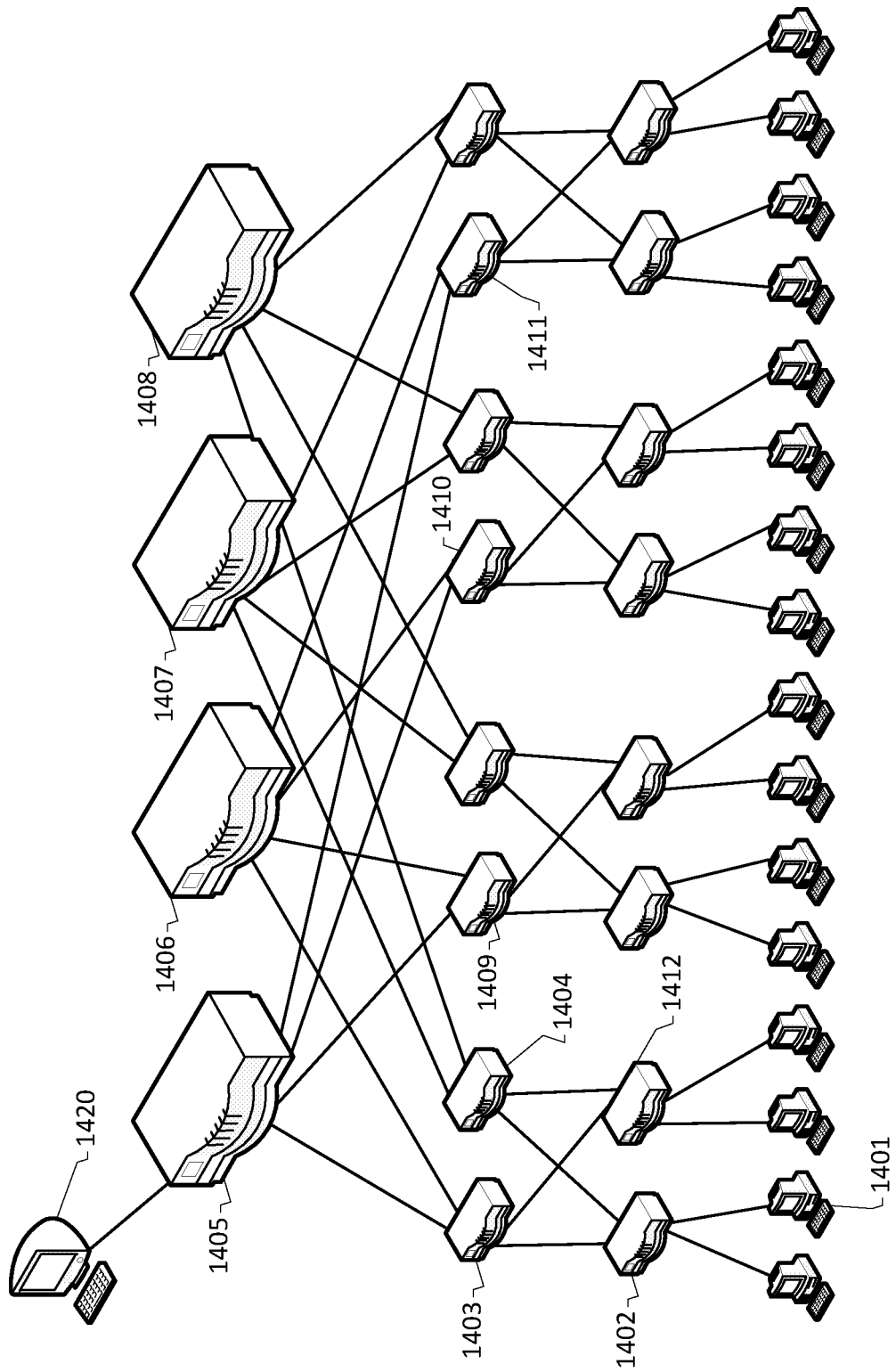
FIG. 14 is a diagram of an example network for use in illustrating the process of FIG. 12.

Assuming the network shown in FIG. 14, the following section describes an example of the methods described above. Turning to FIG. 14, the nodes depicted on the bottom row (such as node 1401) are the storage nodes. These nodes may be, for example, computers or servers having processing, storage and networking functions. Each node may be a separate physical device such as a chassis, card or blade. Alternatively, these nodes may be virtualized in which the functions of one or more nodes may operate on a single physical device.

Node 1420 is the client having the original copy of the file block to be replicated. The top-of-rack (ToR) switches (such as nodes 1402, 1412) are connected to the storage nodes on their southbound interface, and to the aggregation switches (such as nodes 1403, 1404, 1409) on their northbound interface. The aggregation switches are connected in turn to the core switches (such as nodes 1405, 1406). The aggregation switches may be used to aggregate connections from the ToR switches so that each ToR switch need not be directly connected to every other ToR switch. The client node 1420 is connected in this example directly to core switch 1405. Each line in FIG. 14 depicts a unique bidirectional network link between two network nodes or between a network node and a storage, host or client node. For example, the link may operate in a full duplex mode in which independent transmission channels exist for carrying traffic in each direction.

Now let us assume that the different link costs ($Cost_{Link}$) are determined based on the data obtained from the network (e.g., as per steps 1202 and 1205 in FIG. 12) and result in the data which is partially shown in the table below.

As mentioned earlier, link data that is obtained from the network may be obtained link by link, or in groups of links, or all links at the same time at the beginning of the algorithm.

| From | To | Link Id | Link Cost |
|---|---|---|---|
| 1420 | 1405 | 1 | 3 |
| 1405 | 1403 | 2 | 3 |
| 1405 | 1409 | 3 | 5 |
| 1405 | 1410 | 4 | 4 |
| 1405 | 1411 | 5 | 6 |
| 1403 | 1412 | 6 | 6 |
| 1403 | 1402 | 7 | 7 |
| 1403 | 1406 | 8 | 5 |

Each row of the table above depicts the configuration and status of a link. The first two columns ('From' and 'To') depict the network node ID which define the source ('from') and destination ('to') of each link. In this table, a bidirectional link, such as a full duplex Ethernet link would be depicted as two separate links on two rows of the table. A link ID is used to create a unique index to conveniently refer to each link. The link ID may be obtained in Step 1202 as information retrieved from each network node, or may be assigned by the enhanced DFS block placement module 600.

The link cost column depicts the cost determined for each link. In this example, the cost of each link is equal to the number of flows on each link. In this example, it may be assumed that the number of flows, and hence the cost per link, was obtained for the entire network of FIG. 14 in Step 1202.

Initially, the current SPL is an empty set and the associated cost is $Cost_{SPL}=0$. Additionally, the CPS is initially empty.

Since the data originates from the client node (1420), the first set of immediate links will contain only one link (link Id=1) having a cost of 3. Since the CPS is empty, the current SPL becomes (1), where the SPL (or any other pipeline) is the set of ordered link IDs depicted parenthetically, with an associated cost $Cost_{SPL}=3$.

For the next iteration of the algorithm, the set of immediate links includes the links (2,3,4,5). For each immediate link a CPL and $Cost_{CPL}$ is determined as follows:

CPL(1,2): $Cost_{CPL}=\max(Cost_{SPL}, Cost_{link})=\max(3,3)=3$

CPL(1,3): $Cost_{CPL}=\max(3,5)=5$

CPL(1,4): $Cost_{CPL}=\max(3,4)=4$

CPL(1,5) $Cost_{CPL}=\max(3,6)=6$

Since CPL (1,2) utilizing immediate link 2 has the lowest cost, it will be the selected CPL. And since the cost of the selected CPL is equal to the cost of the SPL (=3), then the selected CPL will become the new SPL: (1,2)

The other CPLs (1,3), (1,4), and (1,5) are stored in the CPS. The CPS at this stage will be as in the table below,

| $Cost_{CPL}$ | Pipeline Length | Pipeline (CPL) |
|---|---|---|
| 5 | 2 | (1, 3) |
| 4 | 2 | (1, 4) |
| 6 | 2 | (1, 5) |

At the next iteration of the algorithm, the set of immediate links will contain the links (6,7,8). However, due to a policy restriction that may be in place for this example which disallows pipelines to reverse direction at network nodes in the ToR and aggregation layers, the link with Id=8 is excluded from the immediate link set. Accordingly, the immediate link set will be links (6,7).

For link with Id=6, $Cost_{Link}=6$, and hence the associated CPL (1,2,6) will have a cost of $Cost_{CPL}=6$ For link with Id=7, $Cost_{Link}=7$, and hence the associated CPL (1,2,7) will have a cost of $Cost_{CPL}=7$ Because it has the lowest $Cost_{CPL}$ of all of the CPLs, the CPL associated with immediate link Id=6 becomes the selected CPL. The CPL associated with immediate link Id=7, or CPL (1,2,7) will be added to the CPS.

Because the $Cost_{CPL}$ of the selected CPL (=6) is larger than the current SPL cost (=3), the $Cost_{CPL}$ of the selected CPL is compared with the $Cost_{CPL}$ of other pipelines in the CPS. Referring to the table above, the $Cost_{CPL}$ for CPL (1,4) of 4 is less than the $Cost_{CPL}$ of the selected CPL and has the lowest cost of all CPLs in the CPS. Therefore, we remove CPL (1,4) from the CPS and designated it as the new SPL. Selected CPL (1,2,6) will be stored in the CPS. The CPS after this iteration of the algorithm will be as in table below,

| Costpipeline | Pipeline Length | Pipeline |
|---|---|---|
| 5 | 2 | (1, 3) |
| 6 | 2 | (1, 5) |
| 6 | 3 | (1, 2, 6) |
| 7 | 3 | (1, 2, 7) |

The algorithm proceeds in the same manner until the SPL pipeline is complete. This occurs when the number of storage data nodes included in the SPL is equal to the desired replication factor.

Crawler with Back Propagation Method

The basic crawler method described above may improve the scalability and processing efficiency of the file block placement decision over other methods. However, in the cases where the cost of links at later stages in the pipeline may tend to be higher than those in the first parts of the pipeline, the system may frequently add, and then remove pipelines from the CPS before the result pipeline is reached. This may result in increased processing in order to reach a placement decision.

The method described in this section improves this behavior by taking into consideration costs of links beyond those the crawler is comparing for its next move (the immediate links). This may be referred to as "Back Propagation" of link cost. The reason it is called Back Propagation, is that this algorithm will consider calculation of cost starting from the end point and moving backward for a set of hops, and the resultant cost is stored in the nodes. When the crawler algorithm reaches a node with the back propagation information stored in it, it will use this information in the remaining part of the crawling procedure By taking into consideration the cost of links beyond the immediate links, the crawler process examines fewer pipelines.

Figure 15:
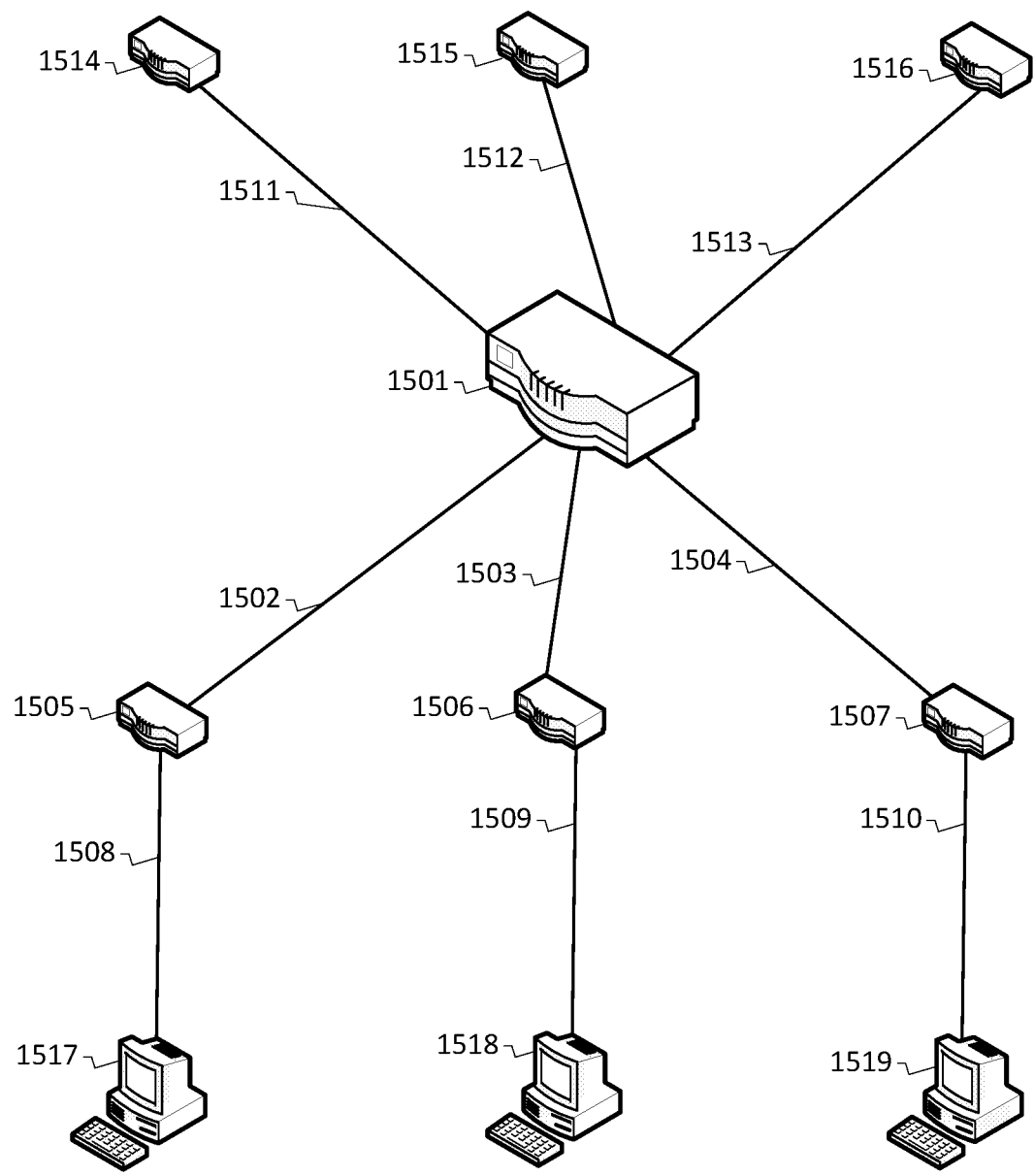
FIG. 15 is a diagram of an example network for use in illustrating the process of FIG. 16.

FIG. 15 shows an example of a portion of a network. Nodes (1517, 1518, and 1519) represent storage nodes. They are candidates to be the destination of the crawler Node (1501) represents the "Crawler Current Position". This is the network node that is located at the end of the current SPL.

Nodes (1505, 1506, and 1507) are referred to as "Candidate Next Nodes". Based on the network topology and the current SPL, let us assume that the set of immediate links will be from the Crawler Current Position to each of the "Candidate Next Nodes" (1502, 1503, 1504).

We will define the following metrics,
1. For network nodes in the network, the $BackCost_{node}$
2. For links in the network, $BackCost_{Link}$, where a link carries data traffic from $Link_{src}$ to $Link_{dest}$ Where,
a. For links whose $Link_{dest}$ is a storage node, $BackCost_{Link} = Cost_{link}$ b. For Links whose $Link_{dest}$ is not a storage node, instead it is a network node with $BackCost_{node}$, $BackCost_{Link} = \max(Cost_{link}, BackCost_{node})$ c. For a network node,
$BackCost_{node} = \min (BackCost_{link})$ across all links that connect the network node to a Candidate Next Node.
Note that this means that the $BackCost_{node}$ represents the least cost of the partial path from this network node to reach a storage node that may not be directly connected to this network node.

Figure 16:
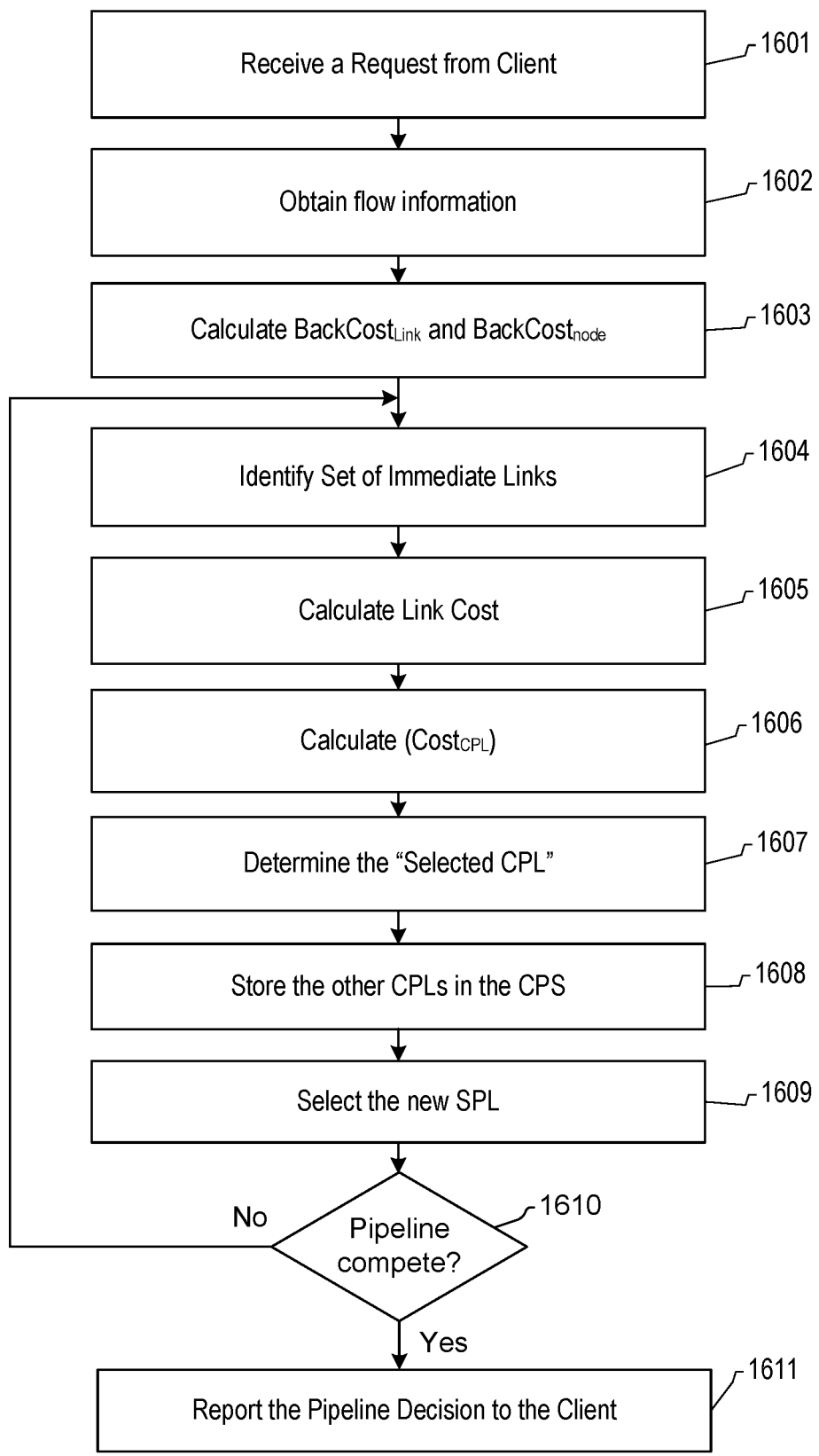
FIG. 16 is a flowchart of a further process for use in file block placement in accordance with aspects of the invention.

An example flowchart of a crawler with back propagation method is shown in FIG. 16. The steps of the method illustrated in FIG. 16 are the same or similar to like named steps shown in FIG. 12.

Step 1601, is similar to step 1201 in FIG. 12.

In step 1602, the link cost information is obtained (similar to step 1202 in FIG. 12). This information may be used by the algorithm for the back propagation cost calculations performed in step 1603.

In step 1603, the link and network node back cost are calculated using the definitions and the equations above. The link and network node back cost calculations may begin at each storage node and proceed iteratively until a stopping point is reached. The stopping point may depend on one or more criteria. One possible criterion is to calculate the back propagation link and node cost across a specified number of network levels or layers. For example, if two levels of calculations are to be used, then the back cost calculation is performed from the storage nodes up to and including the aggregate switch layer depicted in FIG. 14.

Step 1604 is similar to step 1203 of FIG. 12.

Step 1605 is a modified form of step 1204 of FIG. 12. In Step 1605, if BackCostLink is available (as previously calculated in step 1603) for this link, it is used as the link cost, otherwise CostLink is used as the link cost.

Steps 1606-1611 are similar to steps 1205-2010 of FIG. 12.

Limiting the Optimization Scope

The determination of the SPL pipeline aims to minimize $Cost_{SPL}$. The methods described thus far have applied to the whole replication pipeline (meaning one pipeline that spans over multiple storage nodes to achieve the desired replication factor).

Alternatively, the overall pipeline may be divided into a set of pipeline legs, each terminating at a storage node. In this aspect, the number of the pipeline legs will be equal to the desired replication factor.

The crawler method (whether the basic method, or the method with back propagation) may be used to determine each pipeline leg independently. This method makes use of the fact that storage nodes can perform the replication to the other nodes with different throughput since they already store the content within the node.

Network Switch Forwarding Path Applications

This section describes applications of the methods and techniques described above to the context of network switches and routers (hereinafter collectively referred to as "switches"). Specifically, aspects of such methods and techniques can be applied to make better, more intelligent decisions for the routing of traffic flows through network switches (or other network nodes that handle network flows). Such application to network routing may yield numerous advantages such as improved speed and latency for a data flow, reduction in the variability of flow performance, and compliance with SLA or QoS requirements associated with data flows.

Referring to FIG. 1, data center 100 may be used to inter-connect computers, such as computers 141 to 148. Network nodes such as gateway router 101, core switches 110-111, and top-of-rack (ToR) switches 120-123 are arranged to allow any computer to establish a flow of packets (e.g. a TCP connection) with any other computer, via one or more paths. One skilled in the art would appreciate that many different data center network topologies are possible (e.g. fat-tree, clos, mesh, etc.) and that networks may be scaled to be both larger and smaller than the network depicted in FIG. 1. Similarly, FIG. 1 depicts the interconnection of data center 100 to other data center(s) 4, and to the Internet 2, via transport network 3. The methods described herein may be applied to data center 100 and to the topologies of other data centers 4 and the Internet 2 as well.

For a data flow, such as a TCP connection, to be established between two computers, a set of network nodes must be programmed with forwarding table entries. A forwarding table entry instructs the network node how to identify a packet that arrives on an interface (such as a port, or link) of the network node and describes the action to be taken by the node with regard to the packet. A forwarding table entry includes packet characteristics used to identify a packet and to associate it with a flow. For example, a packet's source and destination address and associated port may be used by the switch to associate a packet with a flow.

The forwarding table entry also describes the action to be taken by the switch if a packet arrives having the matching packet characteristics. For example, an action may be to send the packet out on a specified interface of the switch. Or the action may be to discard the packet. Packet characteristics may be OSI Layer 2 characteristics such as source and destination computer MAC addresses, and are used in what is commonly termed a switched network. Packet characteristics may be OSI Layer 3 characteristics such as the source and destination computer IP addresses, and are used in what is commonly called a routed network. Other packet characteristics from Layers 2, 3 or other layers may also be used, and may include for example source/destination port numbers, VLAN ID value and/or MPLS label value. Forwarding table entries are commonly stored locally in each network node. Entries may be stored in memory in various forms including, for example, tables, databases and other structures.

Forwarding table entries may be generated or determined using a variety of methods. Entries may be programmed by an operator manually using, for example, management system 180 of FIG. 1 which may use protocols such as SNMP or SSH to read and write forwarding table entries to each network node. These entries may be static or dynamic. In other aspects, distributed protocols such as link-state routing protocols (e.g. OSPF) and distance vector routing protocol (e.g. RIP, BGP) may operate within each network node. A distributed protocol can take advantage of a node's ability to communicate with other network nodes in order to develop a suitable list of forwarding table entries.

Advances such as SDN, which may use protocols such as OpenFlow, allow for centralization of the forwarding table entry creation and maintenance. In an SDN system, a central controller, such as SDN Controller 190 of FIG. 1, may be responsible for determining the proper set of forwarding table entries for each network node. For example, in an initialization phase, a central controller may determine the topology of the network via use of a well-known discovery protocol (e.g. neighbor discovery protocol). Following the initialization phase, any network node which encounters a packet for which it does not have a forwarding table entry may forward the packet (or portions thereof) to the central controller. Using knowledge of the network topology, and network status, the central controller may then create a forwarding table entry and transmit it to the network node.

As described herein, both distributed and centralized protocols may be designed to determine forwarding table entries based on characteristics of connectivity and cost. At a minimum, a forwarding table entry must provide an action that allows the packet to reach its intended destination. In many networks, however, there may be multiple paths between a source and destination. In such a case, a cost is assigned to each link and/or path to help determine which path, or forwarding table entry, is best. A cost may be, for example, assigned based on the number of network nodes a packet must pass through between source computer and destination computer. A cost may also be assigned per link based on link capacity (e.g. 10 Gbps port with a cost of 100, a 1 Gbps with a cost of 500). In an aspect, the cost of using a particular network link or path for a new flow may be a function of the bandwidth available to the new flow.

A particular switch, such as switch 110 for example, may receive a packet of a new data flow that is destined for a particular node in the network. The switch may have multiple paths to choose from for forwarding the data flow to a next network node (next hop) on its way to its destination node.

As an example, assume that a switch has four ports, each of which is connected to a different network node in the network. The switch may receive, or internally generate, a request to create a "forwarding entry" for a new data flow (i.e. a flow for which there are no applicable forwarding table entries), and then must decide on which of the four ports to use as the forwarding entry for that data flow. Various methods and techniques described above may be applied by the switch to determine the forwarding entry for the new data flow. The methods and techniques may take into account network conditions related to the network path associated with each of the four ports, and also take into account the predicted impact on the SLA/QoS of each existing flow that is being handled by the switch if a particular port is selected as the forwarding entry for the new data flow.

Figure 17:
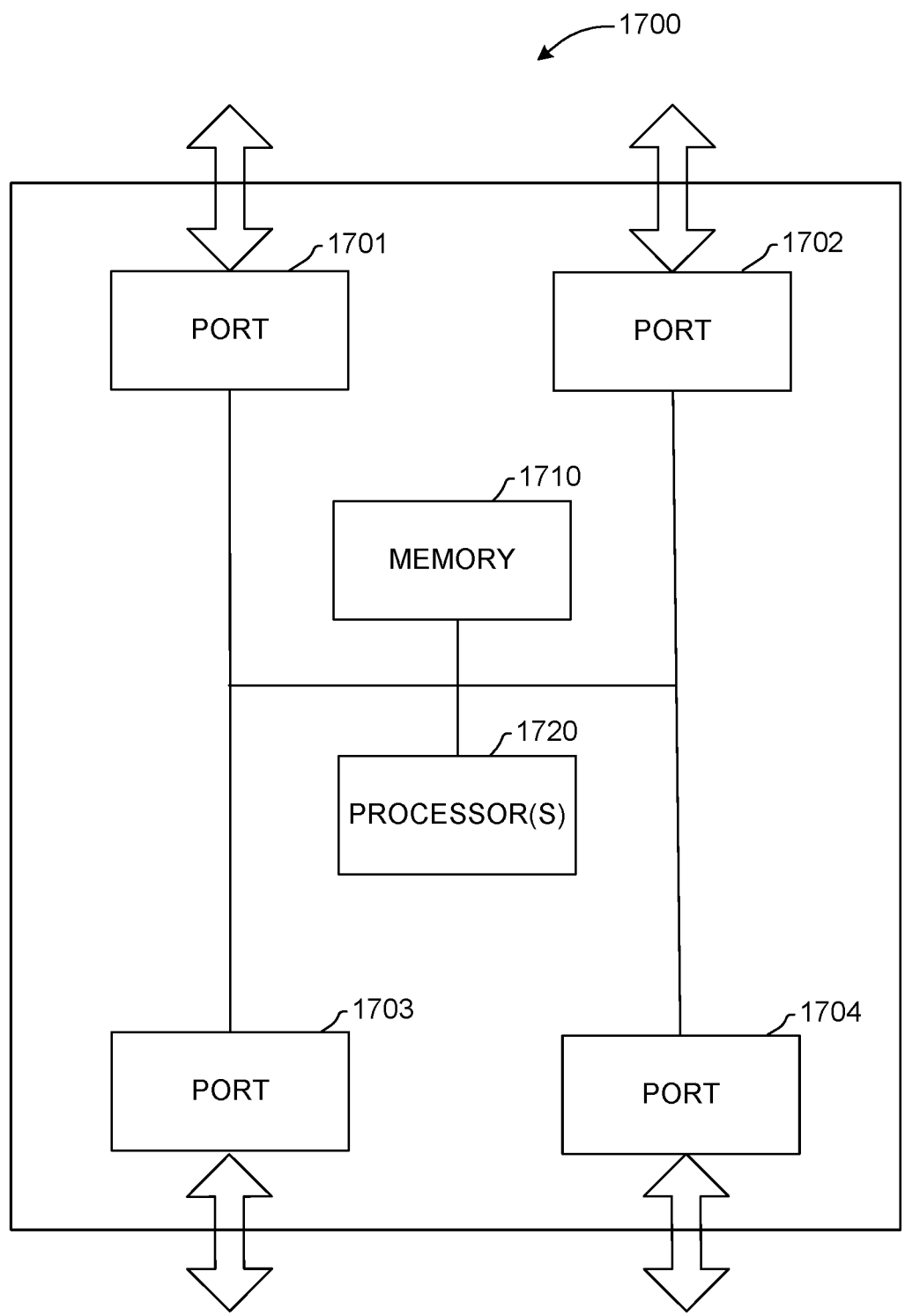
FIG. 17 is a block diagram of switch in accordance with aspects of the invention.

FIG. 17 depicts an example of a switch 1700 in which aspects described herein may be practiced. As seen in FIG. 17, switch 1700 includes memory 1710 for storing data (such as forwarding table entries) and executable instructions and processor(s) 1720 which may be one or more processors for running the executable instructions and operating some or all of the functionality of switch 1700. Memory 1710 and processor(s) 1720 are connected, directly or indirectly, by a bus and similarly are connected, directly or indirectly, by the bus to ports 1701-1704. In this regard, ports 1701-1704 each comprise communications ports for receiving and/or transmitting packets associated with data flows from/to other network nodes. Ports 1701-1704 may be any known type of network communication port, wired or wireless, and may be implemented in hardware, circuitry, modules, etc.

Figure 18:
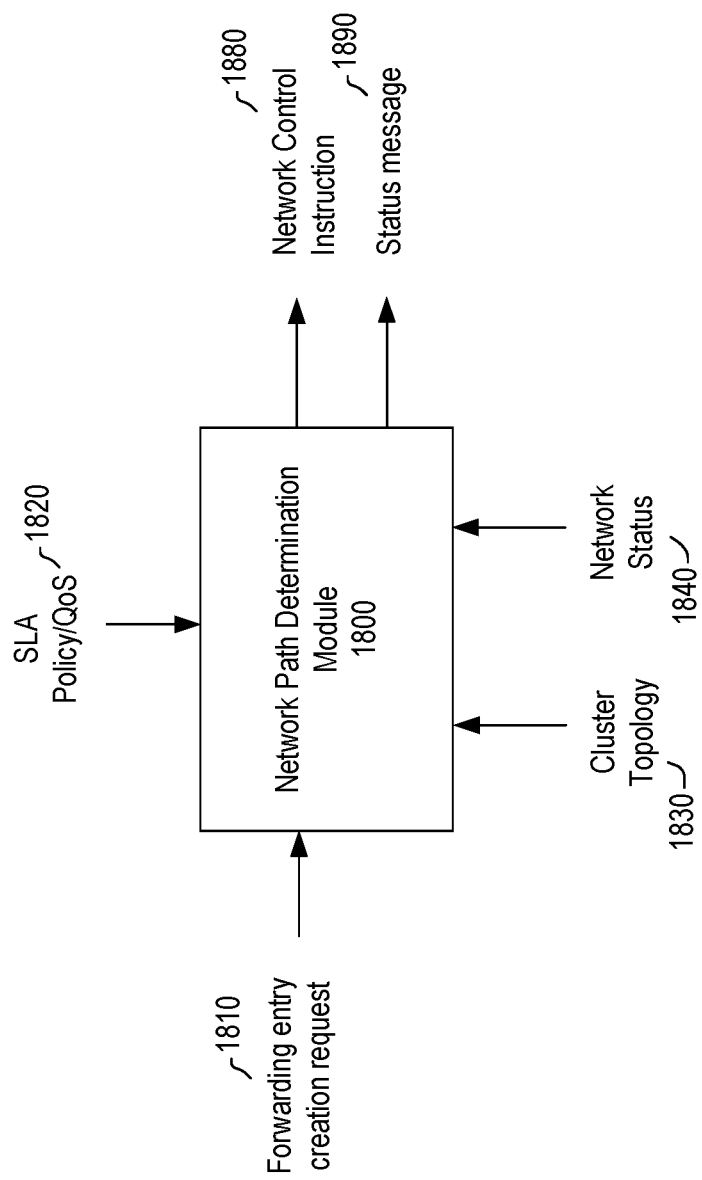
FIG. 18 is a block diagram of a network path determination module in accordance with aspects of the invention.

FIG. 18 is a block diagram that depicts a network path determination module (NPDM) 1800 used to determine a forwarding entry for a data flow. NPDM 1800 may be used to determine a best network path between the source and the destination of a flow. A network path may describe part or all of the complete path between flow source and destination. For example, a network path may describe the path taken by a packet from the input port of a network node to an output port of a network node.

Once a best network path is determined, NPDM 1800 may generate one or more network control instructions, for example, a forwarding table entry, that is used to direct packets along the best network path. In the example of FIG. 1, NPDM 1800 may be implemented in a central controller such as SDN controller 190, in management system 180 or in another computer within or outside of data center 100. In other aspects, NPDM 1800 may be implemented in a network node such as, for example, each of gateway router 101, core switches 110-111, and top-of-rack (ToR) switches 120-123. In the example of switch 1700 in FIG. 17, NPDM 1800 may be implemented through instructions executed by processor(s) 1720 of switch 1700. In other aspects, network path determination module 1800 may be implemented as a separate module or processor in switch 1700.

As seen in FIG. 18, NPDM 1800 has several inputs and outputs. The inputs include forwarding entry creation request 1810, SLA Policy/QoS information 1820, cluster topology information 1830, and network status information 1840. Forwarding entry creation request ("request") 1810 may be, for example, a request from another node in the network to create a forwarding entry (next hop destination) for a new data flow that is to be handled by the switch. For example, request 1810 may be created by a function implemented in SDN controller 190 upon its receipt of a packet forwarded from a network node without a corresponding forwarding table entry. Alternatively, request 1810 may be created by a function implemented within a network node upon receipt of a packet without a corresponding forwarding table entry. Request 1810 may contain information about the packet to be forwarded such as, for example, layer 2 or layer 3 packet characteristics, or request 1810 may contain the entire packet. Request 1810 may also contain a description of which node is making the request.

In an aspect, request 1810 may be made following the operation of another network path determination system, such as a system implementing an open shortest path first (OSPF) routing protocol. For example, request 1810 may be created by a router incorporating OSPF after determining that more than one equal cost route option exists for a new flow. In such a case, request 1810 may include one or more candidate network paths determined by the other network path determination system.

SLA Policy/QoS information 1820 may be, for example, service level agreement (SLA) and/or Quality of Service information that is related to a new requested data flow to be handled by the switch and/or related to each of the existing data flows currently being handled by the switch. Cluster topology information 1830 may be, for example, topology information of computers and network nodes in the network, including their respective connections (links) between each other. Network status information 1840 may be, for example, the bandwidth being used, the number and bandwidth consumption of flows, queue depth information, and/or packet discard information at each respective link in the network. Network topology information and network status information may be obtained, for example, from a central network node that gathers and maintains such information related to all nodes and links in the network, or within a portion of the network. For example, this information may be sent to NPDM 1800 from SDN controller 190 or from management system 180 of FIG. 1. In other aspects, NPDM 1800 may obtain this information from various sources within the network, including from (and potentially only pertaining to) the node in which NPDM 1800 is implemented using known network techniques for monitoring and/or collecting topology and status information.

The outputs of NPDM 1800 include network control instruction 1880 and status message 1890. Network control instruction 1880 may include, for example, the determined network path for a data flow, and may further include other instructions to facilitate the routing of the data flow through the network to its intended destination. The determined network path may include one or more forwarding table entries for use by one or more network nodes.

Status message 1890 may include, for example, an indication of bandwidth available for the determined network path (the forwarding entry), an indication of the effect of the determined network path on other existing flows, and may also include other information related to the network path determination made by NPDM 1800.

Figure 19:
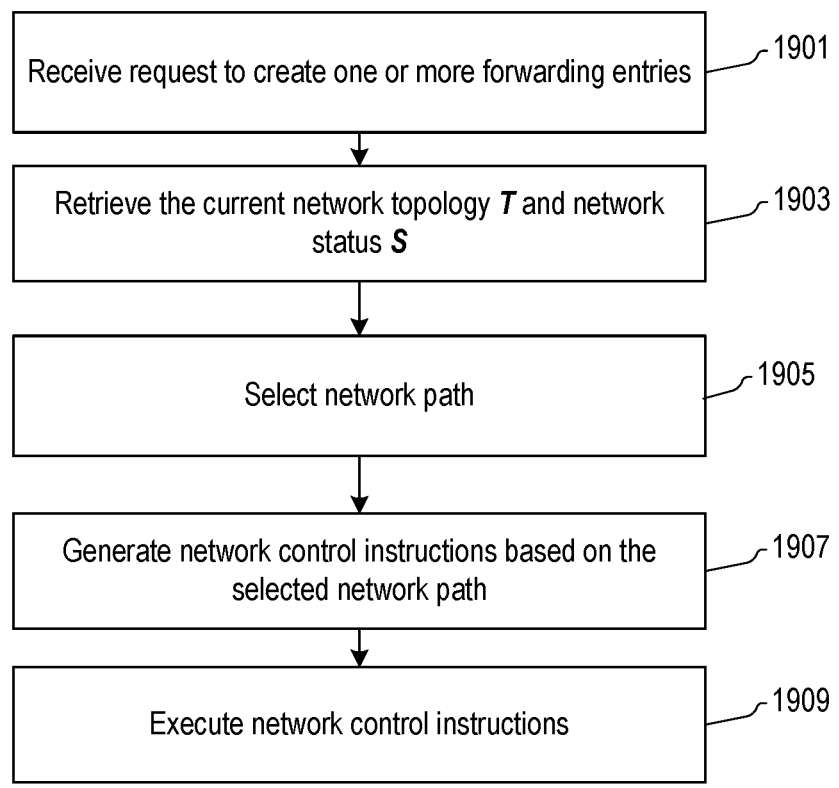
FIG. 19 is a flowchart of a process for determining a network path for a particular data flow in accordance with aspects of the invention.

FIG. 19 is a flowchart depicting an exemplary method for determining a network path for a particular data flow (such as may be performed by NPDM 1800). In FIG. 19, the process of making a network path determination begins upon receiving a request to create one or more forwarding entries in one or more network nodes (step 1901) for a data flow. The request may be generated by the detection of a new flow by one of the network nodes. For example, a network node may determine that the combination of source address, source port, destination address and destination port associated with a packet have not yet been observed by the network node. A network node may also determine this condition by searching for this information in its existing packet forwarding table. In other aspects, the request may also be generated by a computer in advance of initiating a new flow. Next, in step 1903, network topology information and network status information is retrieved for use in determining a selected network path for the data flow. As discussed above, such information may be sent to the local node in which NPDM 1800 is implemented (such as switch 1700), or may (at least partially) be collected or derived by the local node itself.

In step 1905, multiple candidate network paths are evaluated and the best candidate network path is selected based on the network topology information and network status information associated with the network nodes and links related to each candidate network path. In addition, the selection of the best candidate network path is also based on SLA/QoS requirements associated with the new data flow and/or associated with some or all of the existing data flows being managed by the network node (such as switch 1700, for example). For example, in the case of switch 1700 of FIG. 17, the switch will select the best port through which the new data path will be forwarded, wherein the port is selected, in part, to minimize the impact on the SLA/QoS of the existing data flows through that port. In this manner, a network path with available bandwidth sufficient (e.g. meeting a new flow's SLA) to handle the forwarding of the new data flow from the specified network node is selected in a manner that least impacts the SLA/QoS of existing data flows that are currently being forwarded from the specified network node. Exemplary methods for step 1905 are described in more detail below with regard to FIGS. 20 and 21.

After a network path is selected, network control instructions are generated based on the selected network path. For example, an appropriate forwarding entry is generated for each node in the selected network path. In step 1909, the generated network control instructions are executed to implement the forwarding of the new data flow in accordance with the selected network path. For example, in the case of switch 1700, the forwarding entry for the new data flow is entered into the forwarding table of switch 1700, which then enables the switch to forward all received packets associated with that data flow via the selected network path (such as via one of the ports of switch 1700). In other aspects, the execution of the network control instructions may include sending an appropriate forwarding entry, and or other control instruction, to one or more other network nodes in the selected network path. It should be appreciated that the steps of FIG. 19 may be performed in other orders, and that some or all of the steps may be combined.

Figure 20:
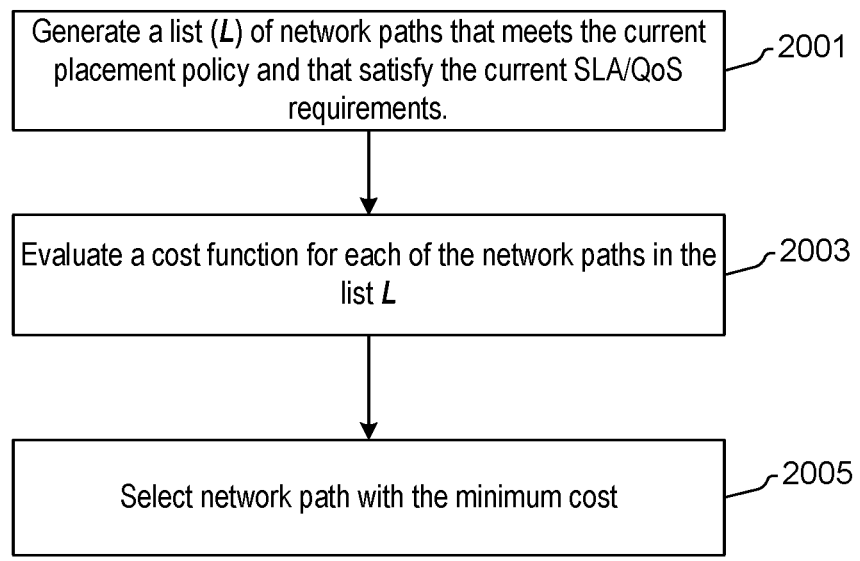
FIG. 20 is a flowchart of a process for the selection of a network path from a set of candidate network paths in accordance with aspects of the invention.

FIG. 20 is a flowchart that depicts an exemplary method for the selection of a network path from a set of candidate network paths. In step 2001, a list (L) of network paths is generated wherein each network path in the list meets a placement policy and also satisfies current SLA/QoS requirements associated with the new data flow. In an aspect, list L is provided partially or fully in the forwarding entry creation request 1810, allowing the method described in FIG. 20 to remain compatible with existing network path determination systems and protocols. Methods to determine whether a candidate network path meets a placement policy and SLA/QoS requirements are described above.

A cost function is then evaluated for each network path in the list (L) to determine predicted cost(s) associated with forwarding the new data flow via that candidate network path (step 2003). The cost function may be as described in more detail above. Based on the evaluated costs associated with each candidate network path, a network path is selected that has the minimum cost. It should be appreciated that the steps of FIG. 20 may be performed in other orders, and that some or all of the steps may be combined.

Figure 21:
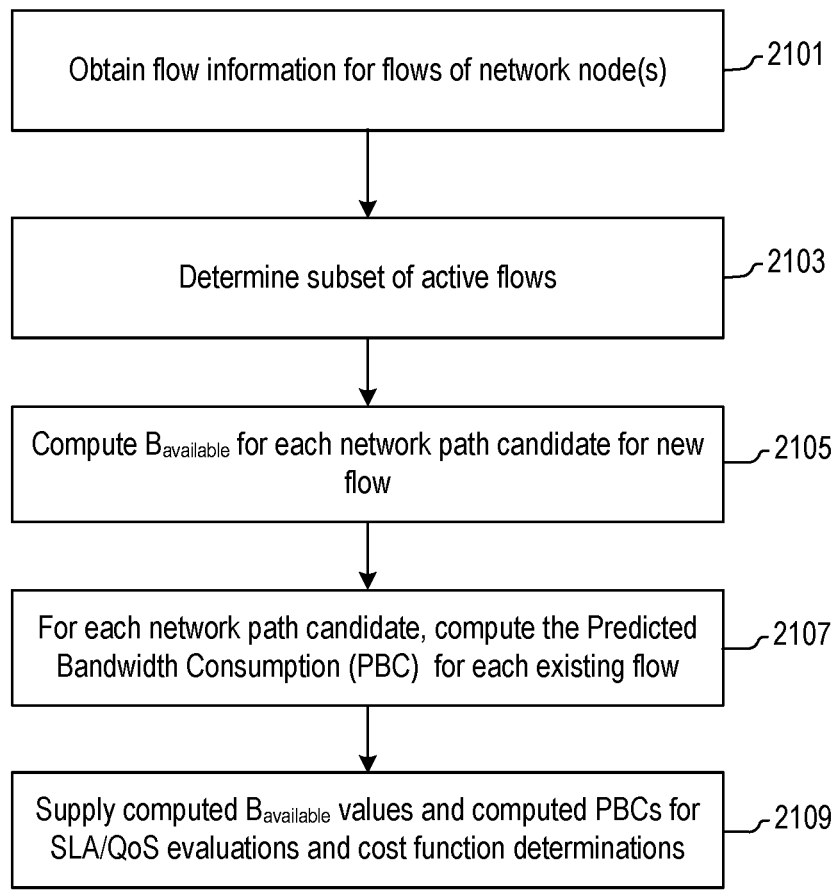
FIG. 21 is a flowchart of a process for determining network bandwidth parameters associated with a candidate network path for use in a cost function in accordance with aspects of the invention.

FIG. 21 is a flowchart depicting an exemplary method for determining network bandwidth parameters associated with each candidate network path for use in the cost function mentioned above with regard to step 2003 of FIG. 20. In this regard, the bandwidth available in each candidate network path for supporting the new data flow is an important parameter for consideration in the cost function. Similarly, predicted bandwidth consumption for each existing flow in a candidate network path is also an important parameter for consideration in the cost function. In this manner, the cost function can use these parameters to determine, for each candidate network path, costs related to the predicted bandwidth for the new flow and the costs related to the effect a new flow has on existing flows.

In step 2101 of FIG. 21, flow information is obtained for flows of one or more network nodes (such as of switch 1700, for example). In step 2103, a subset of active flows of the network nodes is selected. For example, a subset of flows may be selected based on the flow information such as SLA, QoS and/or other flow parameters (realtime, non-realtime, etc.) associated with each flow. This selection can be based on a policy such as, for example, a policy that requires the selection of only flows that have a silver or gold SLA for consideration in the cost function.

A bandwidth available ($B_{available}$) parameter is computed in step 2105 for each link in a candidate network path. As described above, the bandwidth available in a candidate network path is the lowest value of $B_{available}$ for all links of the candidate network path. This parameter may be computed, for example, based at least in part on the obtained network status information associated with each candidate network path. In step 2107, a predicted bandwidth consumption (PBC) parameter is computed for each existing flow associated with each candidate network path. In an aspect, the PBC parameter is computed for each existing flow of a candidate network path based on an assumption that the new data flow is implemented in that candidate network path. In this manner, the impact of using a particular candidate network path for the new data flow on each existing data flow of that candidate network path can be predicted and then used for evaluation to select the best candidate network path. The PBC may be determined, at least in part, on the obtained flow information associated with each existing flow, on the network status associated with the candidate network path, and on information related to the new data flow. The computed bandwidth available ($B_{available}$) parameter for each candidate network path and the computed predicted bandwidth consumption (PBC) parameter for each existing flow associated with each candidate network path are supplied to the cost function(s) for use in determining cost(s) associated with each candidate network path (as described above with regard to step 2003 of FIG. 20).

Completion-Time Based SLA Applications

This section relates to the application of other methods and techniques described herein to the context of an SLA that is defined in terms of "completion time" such as, for example, the time to complete transfer of a specified file. In another aspect, the SLA may be defined in terms of "completion time" of a multi-component job such as, for example, the time to complete the transfer of multiple files that are associated with a specified job. As used herein the term "transfer" is intended to mean the transfer of data from a source node to a destination node in a network, and such a transfer may be a "single-hop" transfer directly from the source node to the destination node, or may be a multi-hop transfer in which the data is conveyed through intermediate nodes between the source node to the destination node. The transfer of data may include the transfer of an amount of data, the transfer of a data file, or the transfer of a data unit, which may be a portion of a data file.

Completion-Time Based SLA

In this aspect, the user's SLA is based on the completion time of the transfer of a file. For example, the user's SLA for the network system, such as data center 100 of FIG. 1, may be set to 60 ms, which means that the system guarantees that the user's file will be, transferred to one or more nodes of data center 100 within 60 ms.

Figure 22:
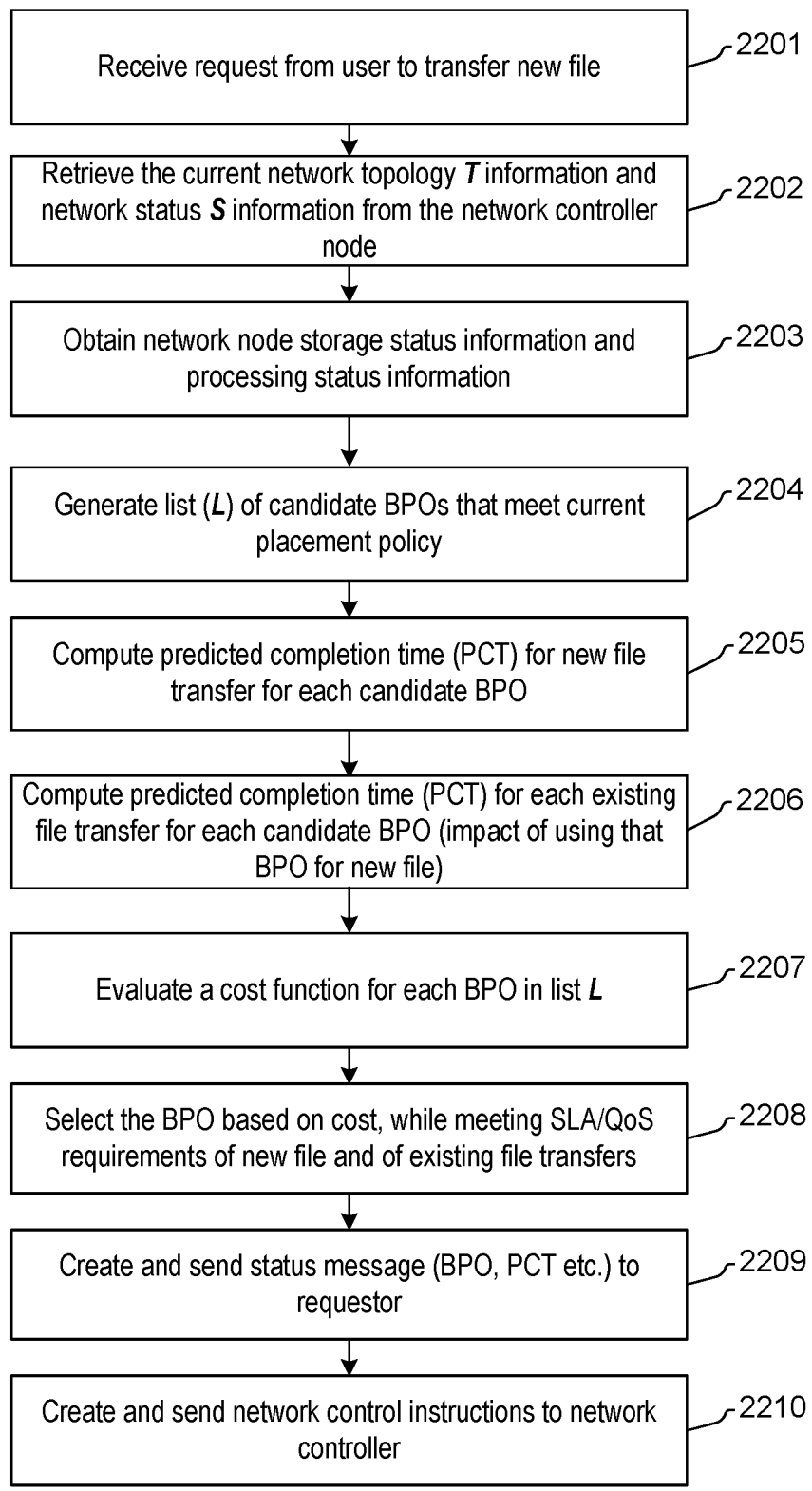
FIG. 22 is a flowchart of process for selecting a best block placement option in a system that where a service level agreement is defined in terms of file transfer completion time in accordance with aspects of the invention.

FIG. 22 is a flowchart that depicts an exemplary method for selecting the best block placement option (BPO) for a user's file in a system that defines SLA in terms of file transfer completion time. As used in this context, a block placement option (BPO) refers to a destination node for a data transfer and also refers to the path within the network for implementing the data transfer from the source node to the destination node. In step 2201 of FIG. 22, a node of the network system, such as management system node 180 of data center 100, or file manager node 428 receives a request from a user to transfer a new file from a source node (e.g. client computer) to a destination node via the network nodes of the network. In step 2202, current network topology T information and network status S information is obtained from the network controller node, such as SDN controller 190 of data center 100. As discussed above, this information may be obtained in other ways.

Network storage information, such as the status of memory usage in each network node, and network processing information, such as the status of current processing obligations of each network node, are optionally obtained in step 2203. This information may be obtained from a central network controller node, such as SDN controller 190 of data center 100, or may be obtained in other ways as discussed above. In step 2204, a list (L) is generated of all or a subset of the possible BPOs that, optionally, meet the current placement policy. Next, in step 2205, a predicted completion time (PCT) for the new file transfer is computed for each possible candidate BPO in list (L), or a subset thereof.

In this regard, the PCT is computed for a particular candidate BPO by using the file size of the new file (obtained, for example, in the request received in step 2201) and the bandwidth available in that candidate BPO for transferring the new file. An exemplary equation for the computation of PCT for a file associated with a candidate BPO is set forth below. Of course, it should be appreciated that other equations or algorithms may be used to compute a predicted completion time based on these concepts.

$$PCT(new)_{BPO} = \text{file\_size}/B_{available(BPO)} \quad (1)$$

Next, in step 2206, a PCT is computed for each existing file transfer for each candidate BPO, which thereby effectively determines the impact of using a particular candidate BPO for the new file transfer on the existing file transfers that are already in process. An exemplary equation for the computation of a PCT for each of "i" existing file transfers based on each candidate BPO is set forth below. Of course, it should be appreciated that other equations or algorithms may be used based on these concepts.

$$PCT(\text{existing}_i)_{BPO} = \text{elapsed\_time} + \text{remaining\_file\_size}/PBC(\text{existing}_i)_{(BPO)} \quad (2)$$

In this manner, the total PCT for the $i^{th}$ existing file transfer in association with the selection of a particular candidate BPO is the elapsed time already taken for that existing file transfer since its inception, plus an additional time to complete the existing file transfer that is based on the remaining file size (amount of data not yet transferred) divided by a predicted bandwidth consumption (PBC) for that $i^{th}$ existing file transfer as if the candidate BPO is used to transfer the new file.

In some aspects, the parameters elapsed_time and remaining_file_size may be obtained from the entity which initiated the transfer request in step 2201 (e.g. file manager node 428). In an aspect, the set of "i" existing file transfers may include all active file transfers or a subset of the active file transfers. The subset of active file transfers may be determined by considering only the active file transfers for files larger than a minimum size, files with a minimum remaining file size, files with a minimum remaining time to completion, and/or by considering other characteristics.

A cost function is then evaluated for each candidate BPO in the list (L) to determine a cost associated with each candidate BPO (step 2207). The cost function may be according to any of the methods and techniques described above, or may be another cost function for determining a cost associated with a candidate BPO. The "cost" that is evaluated in step 2207 may be based in-part or entirely on the computed PCT associated with each candidate BPO.

Step 2207 may be optional, in which case no "cost" is considered in the selection step 2208, and instead the selection in step 2208 is based at least in part on the computed PCTs. In step 2208, one of the candidate BPOs is selected based on the cost function (e.g. having the minimum cost, etc.) such that the SLA/QoS requirements associated with the new file transfer and with the existing file transfers are satisfied.

In an aspect, the cost associated with a BPO may be proportional to the computed PCT for that BPO, and in step 2208 the candidate BPO having the minimum cost while meeting the SLA/QoS requirements may be selected. This method serves to maximize performance because the selected BPO has the smallest PCT of the available options. Alternatively, the candidate BPO having the maximum cost while meeting the SLA/QoS requirements may be selected. This method serves to maximize fairness as the selected BPO utilizes the least amount of network resources while still meeting the SLA/QoS requirements.

If, in step 2208, none of the candidate BPOs meets the SLA/QoS requirements associated with the new file transfer and with the existing file transfers, then the SLA/QoS requirements may be relaxed. The SLA/QoS requirements may be relaxed by, for example, reducing the SLA's PCT requirement for the new file transfer, reducing the SLA PCT requirement for one or more existing file transfers, or some combination thereof. Step 2208 may be performed again, one or more times, using increasingly relaxed SLA/QoS requirements until a suitable BPO can be selected. Other methods may be used to relax the SLA/QoS requirements, including those previously described.

In step 2209, a status message is generated (such as status message 1890 of FIG. 18) that includes the selected BPO for the new file and that also includes the computed PCT for the new file associated with the selected BPO. The status message may also include the computed PCTs for the existing file transfers that are associated with the selected BPO. The status message may be sent to the requestor that sent the request for the new file transfer, and may be sent to other recipients as well. Based on the selected BPO for the new file, network control instructions may be generated in step 2210 in order to facilitate the new file transfer. Such network control instructions may be comprised of forwarding entries for nodes in the network that are in the BPO path, and may be other network control instructions to prepare the network for the new file transfer, as described above. Step 2209 and step 2210 may each be optional. For example, in a use case in which the new file transfer is requested between two known locations and network configuration will be performed to accommodate the new file transfer, both of steps 2209 and 2210 are performed. In a use case in which the new file transfer is requested between two known locations but network configuration will not be performed to accommodate the new file transfer, steps 2210 is not used, and the status message may not include the selected BPO. In this latter scenario, the selected BPO is not used by the requestor to control the transfer destination and is not used to configure the network for the new file transfer; however the PCT of the new and existing file transfers may be reported back to the requestor for purposes such as SLA management and analytics.

In other aspects, in a use case in which the new file transfer is from one known location to an unknown location, the selected BPO (which includes information regarding the destination for the file transfer) is returned to a network manager, such as file manager node 428 (for the purpose of the knowing the destination). In such a scenario, step 2210 may be used optionally.

It should be appreciated that some or all steps of FIG. 22 may be performed in combination and/or in other orders and sequences without departing from the spirit of the methods and techniques described therein. Some steps of FIG. 22 are optional and may be omitted without substantially impacting the functionality of aspects described above.

Job Completion-Time Based SLA

In other aspects, the principles, concepts and techniques described above regarding "completion time" based SLAs may be applied in the context of a new "job" that has multiple components requiring multiple, concurrent file transfers. For example, a user may wish to run a new job that would require the network system to transfer a plurality of files associated with that new job. In the case of video, this may require the transfer of a video file and an audio file. Other jobs may be comprised of a large number of associated files requiring concurrent, transfer between numerous computers across the network. Methods and techniques are provided herein to predict the completion time of such a multiple component job, wherein a BPO for each component file is selected based on the respective PCT associated with that component file.

Figure 23:
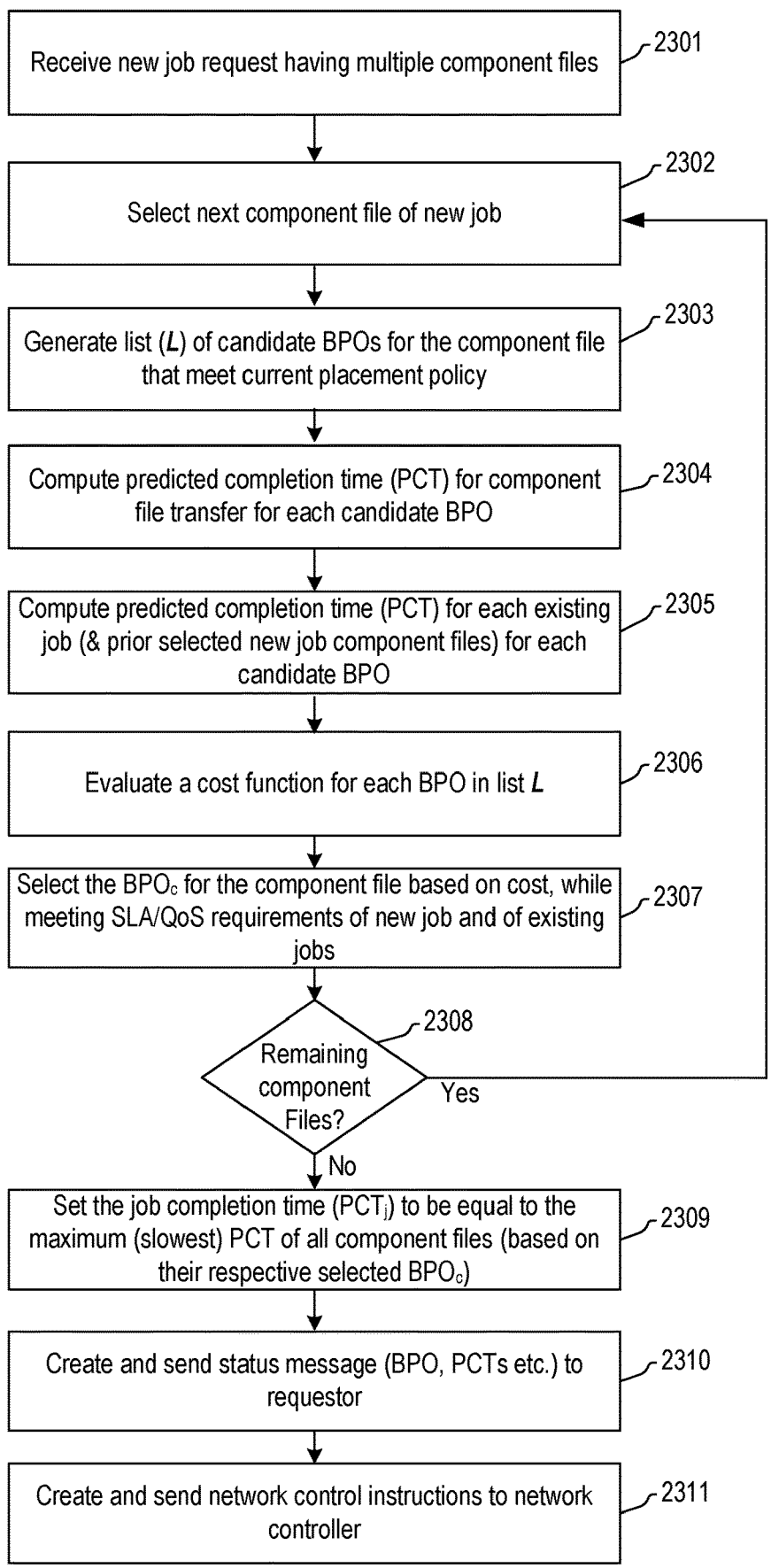
FIG. 23 is a flowchart of a process for use in block placement option selection for a new multiple-component job using a completion-time based service level agreement in accordance with aspects of the invention.

FIG. 23 is a flow chart depicting an exemplary aspect of a BPO selection scheme for a new multiple-component job using a completion-time based SLA in a network system. In the example depicted in FIG. 23, the BPOs are selected according to a scheme that minimizes the PCT for each separate component file of the job independently, while meeting the SLA requirements for the new multiple-component job and for the existing jobs that are already being processed by the network system.

It should be noted that many of the steps depicted in FIG. 23 are the same or similar to steps depicted in FIG. 22, and a detailed description of such steps is not provided below for the sake of brevity. The reader is referred to the discussion of FIG. 22 above as well as other portions of this disclosure for further description related to such steps.

Turning now to FIG. 23, the network system receives a new job request for a job having multiple component files in step 2301. Next, a series of steps 2302-2307 is repeated for each component file in the job. In step 2302, the next component file of the new job is selected (in the first instance of step 2302, the next component file is the first component file). A list (L) is generated that is comprised of possible candidate BPOs for the new job component file that optionally meet the current placement policy (step 2303). In step 2304, a predicted completion time (PCT) for transfer of the selected component file is computed for each candidate BPO, assuming that the selected BPOs for the previously processed component files are being used for their respective component file transfers. In step 2305, a predicted completion time (PCT) for each existing job is computed for each candidate BPO based an assumption that the candidate BPO is being used to transfer the component file of the new job, and that the selected BPOs for the previously processed component files are being used for their respective component file transfers. In this manner, each candidate BPO is analyzed to determine the impact on existing jobs of using that BPO for transfer of the new job's component file. For example, the predicted completion time (PCT) for each existing job is computed by determining the PCT for each component file (see Equation 2 above) of the existing job and then setting the existing job PCT to be equal to the maximum PCT (slowest) of its component files. In addition, in step 2305, a predicted completion time (PCT) for each of the previously processed component files is also computed for each candidate BPO for the selected component file based an assumption that the candidate BPO is being used to transfer the selected component file.

In step 2306, a cost function is evaluated for each BPO in list L. The "cost" that is evaluated in step 2306 may be based in-part or entirely on the computed PCT associated with each candidate BPO. Step 2306 may be optional, in which case no "cost" is considered in the selection step 2307 and the selection in step 2307 is based at least in part on the computed BPOs.

A selection is made in step 2307 of one of the candidate BPOs to be used for the new job component file based on the cost associated with each candidate BPO. In an aspect, the selected BPO is the candidate BPO having the optimal cost (e.g., minimum cost, maximum cost, etc.) while satisfying the SLA/QoS requirements of new job (based on the PCT of the selected component file and the PCTs of the previously processed component files) and also satisfying the SLA/QoS requirements of the existing jobs. The selected candidate BPO is termed "BPOc". In aspects, the cost associated with the BPO is related to the computed PCT of using that BPO for the new job component file, and the minimum cost corresponds to selecting the BPO with the minimum PCT.

If in step 2307, none of the candidate BPOs meet the SLA/QoS requirements associated with the new job and with the existing jobs, then the SLA/QoS requirements may be relaxed. The SLA/QoS requirements may be relaxed by, for example, reducing the SLA PCT requirement for the new job, reducing the SLA PCT requirement for one or more existing jobs, or some combination thereof. Step 2307 may be performed again, one or more times, using increasingly relaxed SLA/QoS requirements until a suitable BPO can be selected. Other methods may be used to relax the SLA/QoS requirements, including those described above.

The job is checked to see if there are any remaining component files in step 2308. If so, then the process reverts back to step 2302 in which the next component file of the new job is selected and then steps 2303 to 2307 are repeated for that selected new job component file. If it is determined in step 2308 that there are no remaining component files for the job, then the process proceeds to step 2309 in which the job completion time (PCTj) for the new job is set to be equal to the maximum (slowest) PCT of all of its component files based on their respective selected BPOs. In other words, the slowest component file sets the completion time of the entire job, given that all of the component files will be transferred in parallel.

In step 2310, a status message is generated (such as status message 1890 of FIG. 18) that includes the selected BPOs for the component files of the new job and that also includes the computed PCT for the new job. The status message may also include the computed PCTs for the existing jobs that are associated with the selected BPO for the last processed component file of the job (steps 2303-2307). The status message may be sent to the requestor that sent the new job request, and may be sent to other recipients in the network as well. Based on the selected BPOs for the component files of the new job, network control instructions may be generated in step 2311 in order to facilitate the component file transfers of the new job. Such network control instructions may be comprised of forwarding entries for nodes in the network that are in the BPO path, and may be other network control instructions to prepare the network for the component file transfers, as described above. Steps 2310 and 2311 may each be optional, as discussed above with regard to steps 2209 and 2210 of FIG. 22. In this manner, the BPO having the optimal PCT for each component file of the new job is selected while meeting the SLA/QoS requirements for the new job and for the existing jobs.

It should be appreciated that some or all steps of FIG. 23 may be performed in combination and/or in other orders and sequences without departing from the spirit of the methods and techniques described therein. Some steps of FIG. 23 are optional and may be omitted without substantially impacting the functionality of aspects described above.

In other aspects, an alternate process may be used in which PCTs for existing jobs and for previously processed component files are only computed for an identified candidate BPO for a current component file as long as that identified candidate BPO satisfies the SLA/QoS requirements of new job (based on the PCT of the current component file and the PCTs of the previously processed component files). Such a process may increase processing efficiency. In addition, some pre-filtering may be optionally applied at the start of the process to focus the process on only a set of the component files of the new job that may be considered to be most problematic (e.g. largest file size, etc.) and on only a set of the existing jobs that may be considered to be the most problematic (having current PCTs closest to their respective SLA requirements).

Figure 24:
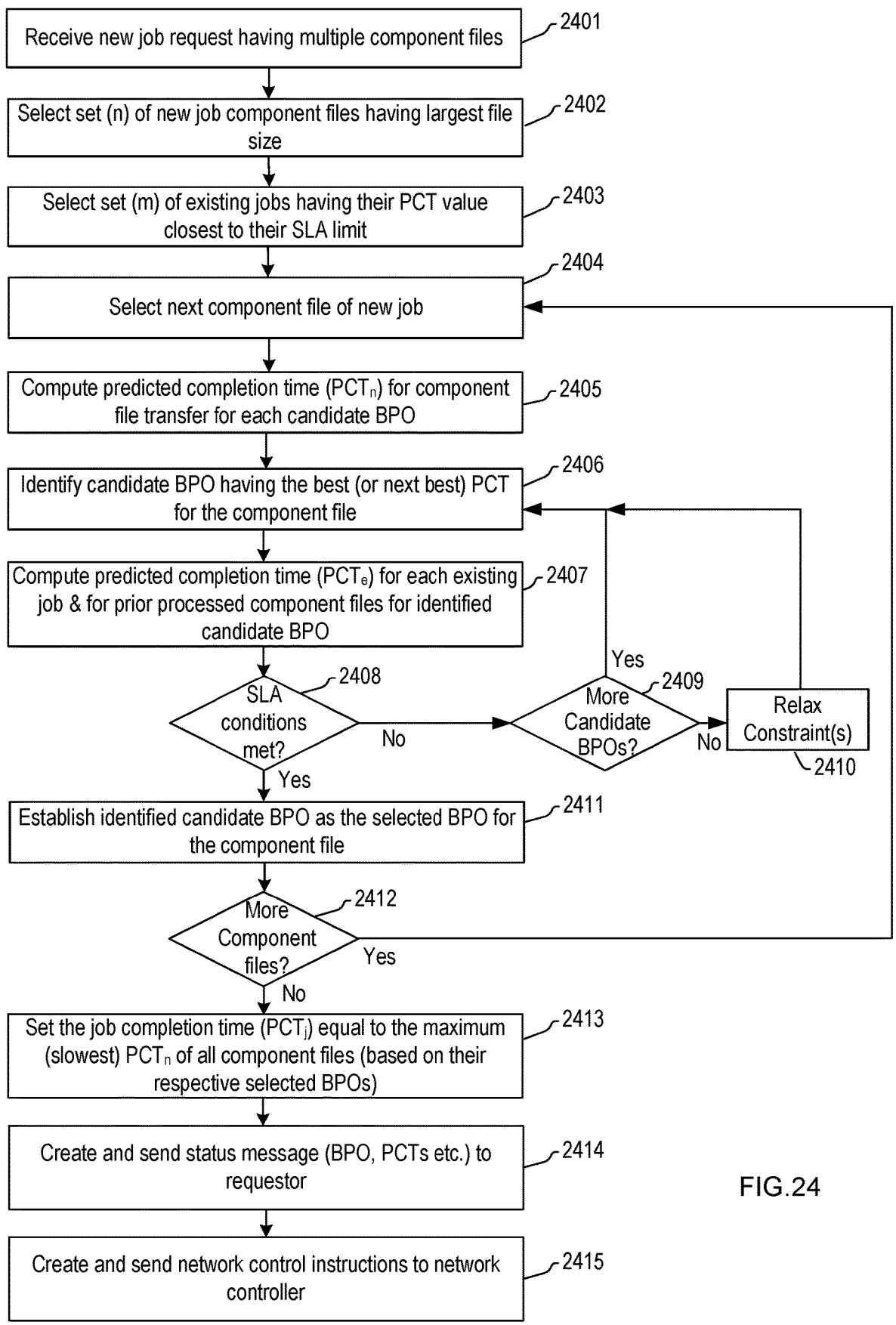
FIG. 24 is a flowchart of another process for use in block placement option selection for a new multiple-component job using a completion-time based service level agreement in a network system in accordance with aspects of the invention.

FIG. 24 is a flow chart depicting an exemplary aspect of such a BPO selection scheme for a new multiple-component job using a completion-time based SLA in a network system. It should be noted that many of the steps depicted in FIG. 24 are the same or similar to steps depicted in FIGS. 22 and 23, and a detailed description of such steps is not provided below for the sake of brevity. The reader is referred to the discussion of FIGS. 22 and 23 above, as well as other portions of this specification for a more description related to such steps.

Turning now to FIG. 24, the network system receives a new job request for a job having multiple component files in step 2401. Next, pre-filtering is optionally applied in steps 2402 and 2403 in which a set (n) of the new job component files that have the largest file size is selected (where n is some or all of the component files), and in which a set (m) of the existing jobs that have their current PCTs the closest to their respective SLA values is selected (where m is some or all of the existing jobs). In this manner, the BPO selection scheme depicted in FIG. 24 is focused on what are likely to be the most problematic component files (largest) and the most problematic existing jobs (those with a current PCT that may possibly exceed the respective SLA if impacted by the new job transfer). If optimal BPOs are selected to satisfy these problematic component files and existing jobs, then the other component files and existing jobs should be satisfied also.

In step 2404, the next component file (of set (n) if pre-filtering is applied) of the new job is selected (in the first instance of step 2404, the next component file is the first component file). In an aspect, the largest file is selected first with the next largest file being selected next, and so on. A loop is entered in which steps 2405 to 2412 are performed for the selected component file. In step 2405, a predicted completion time (PCT) for transfer of the selected component file is computed for each candidate BPO. The list of candidate BPOs for the selected component file may be created in a manner similar that described in step 2204 of FIG. 22 or step 2303 of FIG. 23. In an aspect, the PCT computation in step 2405 may be made assuming that the selected BPOs for the previously processed component files are being used for their respective component file transfers.

Then, in step 2406, the candidate BPO having the best (optimal) computed PCT for the selected component file is identified. In this regard, different schemes may be used to identify the BPO with the optimal PCT. In some aspects it may be desirable to identify the BPO for each component file of a new job in such a manner as to only utilize the minimum network system resources necessary to complete the new job (a "fairness" based result/policy) while meeting the new job SLA. For example, in step 2406 the BPO having the maximum possible PCT while still meeting the new job SLA may be identified for a component file. This result/policy scheme may be referred to as a fairness scheme because the BPOs are identified for the components of the new job such that the new job only takes the minimum network resources necessary (maximum PCTs equals slowest performance) for the new job transfer, thereby leaving as much resources as possible for other jobs.

In other aspects it may be desirable to identify the BPO for each component file of a new job in such a manner as to minimize the predicted completion time for the overall job by minimizing the predicted completion time of the component files in the job (a "maximum performance" based result/policy). For example, in step 2406 the BPO with the minimum PCT value (the best possible performance) is identified. In this manner, the best PCT possible for the overall job is achieved, because the BPO with the minimum PCT is identified for each component file.

In other aspects, the BPO with the maximum PCT for the current component file which is also lower (i.e. shorter) than all PCTs associated with the selected BPOs for the previously processed component files is identified. In this manner, resources are minimized because giving more resources to the current component file would be a waste as it will be completed before the previously processed slower component file(s). If, however, none of the BPOs for the current component file have PCTs lower than all of the PCTs associated with the selected BPOs for the previously processed component files, then the BPO with the minimum PCT for the current component file is identified.

In step 2407, a predicted completion time (PCT) for each existing job (or for each of "m" existing jobs if pre-filtering is used) is computed for the identified candidate BPO based an assumption that the identified candidate BPO is being used to transfer the selected component file of the new job and that the selected BPOs for the previously processed component files are being used for their respective component file transfers. In this manner, the identified candidate BPO is analyzed to determine the impact on existing jobs of using that BPO for transfer of the selected component file of the new job. In addition, in step 2407, a predicted completion time (PCT) for each of the previously processed component files of the new job is also computed for the identified candidate BPO for the selected component file based on an assumption that the identified candidate BPO is being used to transfer the selected component file.

In step 2408, the computed PCT of the identified candidate BPO, the computed PCTs of the previously processed component files of the new job in association with the identified candidate BPO, and the computed PCTs of the existing jobs in association with the identified candidate BPO are all compared to the SLA requirements of the new job and of the existing jobs, respectively, to determine if those SLA requirements are met for this identified candidate BPO. In an aspect, the computed PCT of the identified candidate BPO does not need to be compared to the SLA of the new job if the identified candidate BPO was already determined to meet the SLA of the new job in Step 2406).

If so, then the process proceeds to step 2411 in which the identified candidate BPO is established as the selected BPO for the selected component file. The job is then checked in step 2412 to see if there are more component files to process. If there are more component files to process, then the process proceeds to step 2404 in which the next component file is selected and the steps of 2405 to 2412 are repeated. If there are no more component files to process, then the process proceeds to step 2413 in which the job completion time (PCTj) for the new job is set to be equal to the maximum (slowest) PCT among all of the component files of the new job based on their respective selected BPOs. In other words, the slowest component file sets the completion time of the entire job, given that all of the component files will be transferred in parallel.

If, however, it is determined in step 2408 that any of the SLA requirements for the new job and for the existing jobs are not met for this identified candidate BPO, then the identified candidate BPO will not be established as the selected BPO for the current component file and so the process proceeds to step 2409 in which it is determined if there are more candidate BPOs for consideration for the selected component file. If so, then the process proceeds to step 2406 in order to identify another BPO having the next best (optimal) PCT, after which steps 2407 and 2408 are repeated for that new identified candidate BPO. If there are no more candidate BPOs for consideration for the selected component file, then the process proceeds to step 2410 in which one or more constraints (e.g. such as one or more of the SLAs associated with the new job and with the existing jobs) are relaxed, and then the process proceeds to step 2406 in which the first instance of the BPO having the best possible (optimal) PCT is selected again, and the steps 2407 and 2408 are repeated for that identified candidate BPO. In this manner, the constraints are relaxed until an identified candidate BPO is found for the selected component file that meets the relaxed SLA constraints. In some aspects, in step 2410 other methods and techniques as above may be applied in order to relax the constraints. For example, the selection of the best possible BPO in step 2406 may be selected based on relative SLAs/QoS of the existing jobs, based on the SLA/QoS of the new job, etc. Although some such methods and techniques are described herein in the context of a Hadoop system, they may be equally applicable to the selection schemes discussed above.

As mentioned above, when all component files have been processed such that a BPO is selected for each component file, the process proceeds to step 2413 in which the job completion time (PCTj) for the new job is set to be equal to the maximum (slowest) PCT among all of the component files of the new job based on their respective selected BPOs. Then, in step 2414, a status message is generated (such as status message 1890 of FIG. 18) that includes the selected BPOs for the component files of the new job and that also includes the computed PCT for the new job. The status message may also include the computed PCTs for the existing jobs, wherein these computed PCTs are associated with the selected BPO for the last processed component file of the job (steps 2304-2307). The status message may be sent to the requestor that sent the new job request, and may be sent to other recipients in the network as well. Based on the selected BPOs for the component files of the new job, network control instructions may be generated in step 2415 in order to facilitate the component file transfers of the new job. Such network control instructions may be comprised of forwarding entries for nodes in the network that are in the BPO path, and may be other network control instructions to prepare the network for the component file transfers, as described above. Steps 2414 and 2415 (or parts thereof) may each be optional, as discussed above with regard to steps 2209 and 2210 of FIG. 22, and steps 2310 and 2311 of FIG. 23.

It should be appreciated that some or all steps of FIG. 24 may be performed in combination and/or in other orders and sequences without departing from the spirit of the methods and techniques described therein. Some steps of FIG. 24 are optional and may be omitted without substantially impacting the functionality of aspects described above.

Block Placement Based on Traffic Analysis at the Edge

A further approach for making block placement decisions in a distributed file system (DFS) based on traffic analysis at the network edge, which is the interface between computation hosts and the network in a cluster is now described. In distributing the data to one or more storage devices, one decision central to the process is to determine where to place the blocks. This decision affects how quickly the block replicas may be sent to the desired storage devices. It may also result in better resource utilization which benefits other applications running on the same cluster.

Distributed File System and a Default Replication Strategy

A Distributed File System often consists of a file manager node and one or more storage nodes. A file manager node manages the metadata of the distributed file system. Storage nodes are responsible for storing the file blocks. A file manager node or storage node may be a software applications running on a host computer, which may be a physical machine, or a virtual machine (VM) operating on a physical machine. A host computer may be simply referred to as a host. Herein, "storage node" and "host with a storage node function" may be used interchangeably. Similarly, file manager node and "host with a file manager node function" may be used interchangeably.

Figure 25:
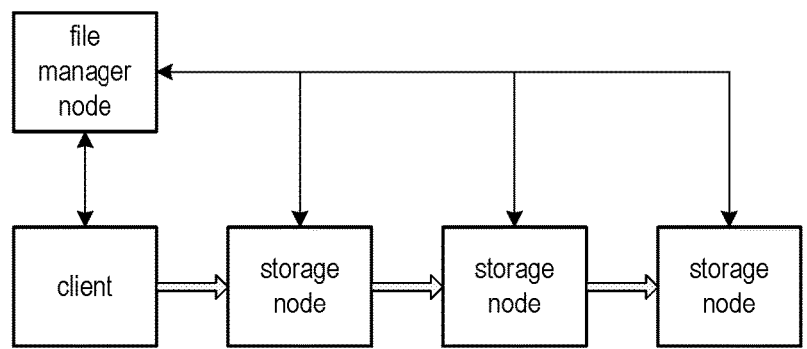
FIG. 25 illustrates a block replication process in a distributed file system in accordance with aspects of the invention.

The block replication process in a distributed file system (DFS) is illustrated in FIG. 25 in which only those storage nodes that are involved in copying one block are shown. The client contacts the file manager node to get an ordered list of storage nodes to which a block should be copied from client. The number of storage nodes on the list is defined as the replication factor. The next step is to establish a block replication pipeline from client node to storage nodes to copy the block. In a block replication pipeline, an intermediate storage node forwards the received data to the next storage node as soon as possible in order to minimize the time spent on the replication process.

A file manager node may select the storage nodes based on certain criteria. For example, the default Hadoop rack-aware block placement policy tries to simultaneously meet two goals: (a) to place the replicas of a block in more than one rack to improve reliability against a single rack failure; and (b) to place multiple replicas in a single rack to reduce inter-rack traffic during block creation. Such a block placement policy is simple, but it does not consider the network status. If some network link on the pipeline path is heavily congested, the replication process may take a long time to finish.

A replication pipeline is also called a storage node pipeline which is defined at the application level to consist of an ordered list of nodes, including client and storage nodes, without considering how data may be transferred through network. A pipeline path is defined as the network path on which the data of the block to be replicated through the replication pipeline will be transported. A network path consists of one or more network links. A network link refers to the network connection between two neighboring network nodes or between a host and its "edge network node," which is the network node that a host is directly connected to. A network link between two neighboring network nodes is referred to as an "inside link." A network link between a host and its edge network node is referred to as an "edge link."

Block Placement Policy Based on Software Defined Network

Ideally, a replication pipeline should be formed with such storage nodes that a pipeline path through the network may be found so that the data may be transferred at the highest possible data rate. A software defined network (SDN) may allow an application to read the network status, which includes traffic information, from the network nodes (e.g. switches, routers) and install forwarding rules on the network nodes. For a cluster that is constructed based on SDN, a block placement decision may be made based on network topology and current loading on the network links.

Figure 26:
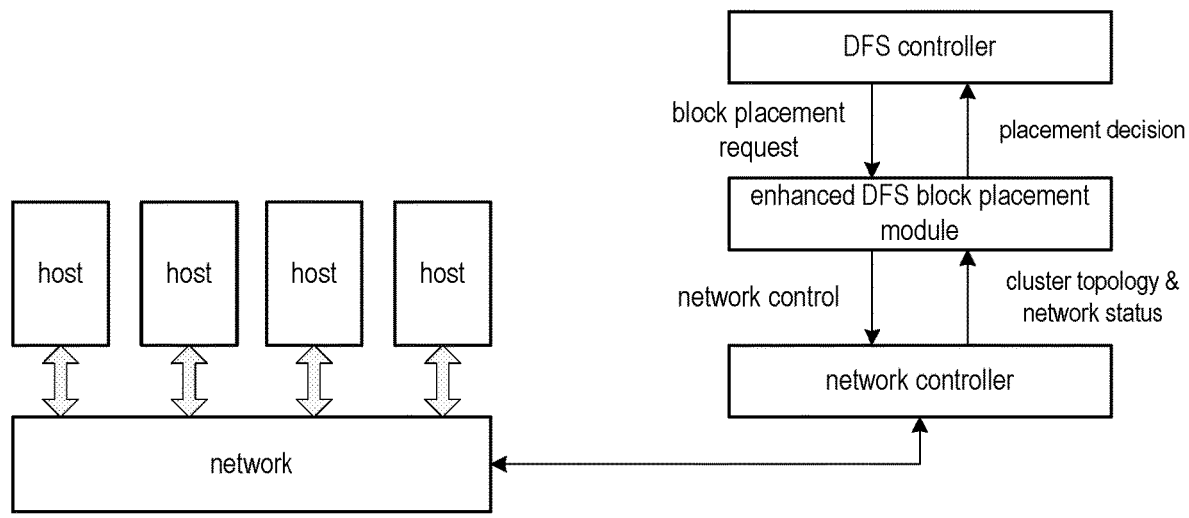
FIG. 26 illustrates a process for block placement decisions for clusters in a software defined network in accordance with aspects of the invention.

FIG. 26 shows one approach of optimizing the block placement decision for a cluster with an SDN. In this diagram, the left side is the basic structure of a cluster, and the right side shows the software stack comprising the block placement decision function. Each component of the software may run on one or more hosts in the cluster.

When the DFS controller needs to make a block placement decision, it sends a block placement request to the enhanced DFS block placement module. The enhanced DFS block placement module determines a placement decision based on cluster topology, network status, and additional parameters such as storage status, processing status, SLA policy/QoS, and block placement policy. This placement decision is communicated to the DFS controller. Optionally the enhanced DFS block placement module will generate a network control output used to configure the network nodes so that the new traffic flow, which is formed with the transfer of packets in the new replication pipeline, will be transported on the desired network path. A traffic flow may also be referred to simply as a flow. The enhanced DFS block placement module may interact with the network through a network controller (e.g. an SDN controller such as an OpenFlow controller) to obtain the cluster topology and network status, and to send the network control output to configure the network nodes.

Although the methods and examples described herein may take advantage of an SDN architecture, one skilled in the art would appreciate how these methods may also be applied to non-SDN architectures.

The following algorithm, performed in an enhanced DFS block placement module, illustrates one method to determine a better block placement decision.

1. Read the network traffic information from all network nodes.
2. Select storage nodes in a certain order to form a replication pipeline candidate. The storage nodes may be selected following some constraints, such as for example in Hadoop a default block replication policy.
3. Predict the available bandwidth for a new traffic flow on each possible pipeline path for the replication pipeline candidate. Find the best pipeline path which has the maximum predicted available bandwidth.
4. Set the predicted available bandwidth of the replication pipeline candidate to the predicted available bandwidth of the best pipeline path. Also record the best pipeline path for this replication pipeline candidate.
5. Repeat step 2 to step 4 for some or all of the possible replication pipeline candidates.
6. Select the replication pipeline candidate with the highest predicted available bandwidth. This will be the best replication pipeline.
7. Send the ordered set of storage nodes, corresponding to the best replication pipeline, to the DFS controller or client.
8. Optionally, program the forwarding rules in the network nodes according to the best replication pipeline.

There may be different approaches to predict the available bandwidth for a new traffic flow through a network path. For example, if the traffic in a network is mostly from long TCP traffic flows with same priority, it is possible to use the flow count of each network link on the network path to predict the available bandwidth of a new traffic flow to be added to the same path. The network link currently having the most active flows will be the bottleneck link after the addition of a new traffic flow. If we assume that the egress port of this bottleneck link shares the network link bandwidth (or capacity) equally among all active flows, the available bandwidth for the new traffic flow can be calculated by dividing total bandwidth of the link by the number of active flows plus 1. For some applications, it may be sufficient to find the network path that has the highest predicted available bandwidth. It may not be necessary to calculate the actual value of the predicted available bandwidth. If all the links have the same link capacity, it is only necessary to find the network path whose bottleneck link has the lowest flow count among all possible network paths.

Block Placement Based on Edge Traffic Analysis

The block placement algorithm discussed above may have some limitations. The algorithm works for a network which provides traffic information for each network node. In addition, the complexity of the algorithm may increase with the number of hosts in the cluster such that its application to a large cluster may become an issue.

A typical cluster may be organized hierarchically as shown in FIG. 1. It is often comprised of many racks of computers, where each rack contains a number of computers. Each computer on a rack is connected to the "top of rack" (ToR) switch on the rack. A ToR switch may also be referred to as edge switch, since it is at the edge of network and directly connected to the hosts (computers). The ToR switch is also connected to one or more aggregation or core switches in the cluster. Together the ToR, aggregation and core switches provide interconnectivity among all computers in the cluster, and access to the external world via one or more gateways connected to the cluster.

Figure 27:
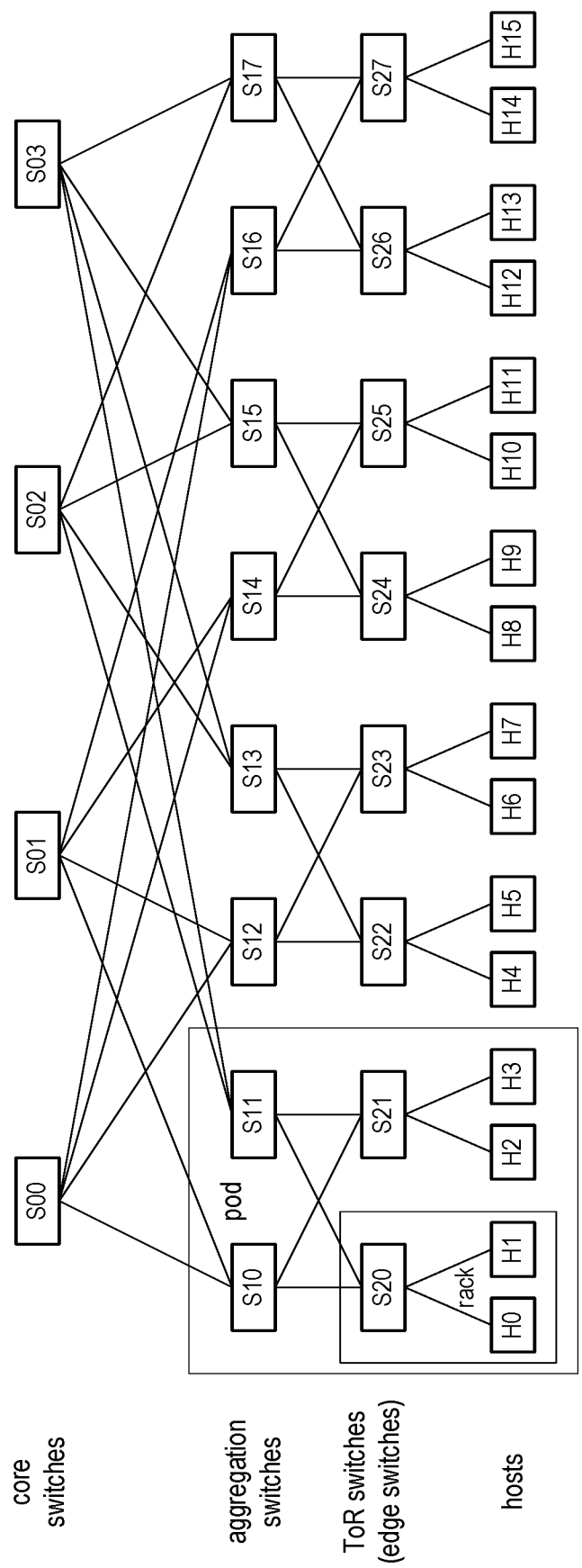
FIG. 27 is a block diagram of a distributed file system fat-tree network in accordance with aspects of the invention.

In order to avoid making the network a limiting factor in distributed data processing, it is important that network has sufficient bandwidth at each level of the hierarchy. A cluster may often use a non-blocking network to provide maximum performance for the hosts. For example, the fat-tree network shown in FIG. 27 is one type of non-blocking network that has the same bi-sectional bandwidth at all levels. In other words, any arbitrary combination of two hosts may communicate between each other at full link bandwidth. Compared with the cluster in FIG. 1, the network of this cluster has one layer of aggregation switches. The hosts that can communicate with each other without going through any core switch are said to belong to the same pod.

Even in a non-blocking network, there may be more than one traffic flow through a network link, because a host may have more than one connection to one or more other hosts. Sharing of a network link among multiple traffic flows may result in the reduction of available bandwidth for each traffic flow. The data rate of a traffic flow is often determined by the available bandwidth at the most congested link on the network path of the traffic flow. This network link is called the communication bottleneck for the traffic flow.

When a host communicates with another host, a packet must be transported on some edge links, but it will be transported on an inside link only if the two communicating hosts are not on the same rack. In addition, a distributed application running in a cluster may be designed in a way so that communication happens more frequently between the hosts that are adjacent to each other than between the hosts that are far apart. The distance between two hosts may be measured based on the number of links of the shortest path from one host to the other. The result is that more communication happens between the hosts on the same rack, less communication happens between the hosts in the same pod but different racks, and the least communication happens between the hosts in different pods.

Considering the characteristics of the communication traffic in a cluster, for a network with the same bi-sectional bandwidth at all levels of the cluster hierarchy, an edge link on average has a heavier load than an inside link, and more likely becomes a communication bottleneck. Even for a network that may not have the same bi-sectional bandwidth at each level of the cluster hierarchy, the traffic may be skewed so that an edge link on average is still more heavily loaded than an inside link. In developing a better optimized block placement decision that takes the network status into consideration, the main challenge is how to find the storage nodes so that a replication pipeline can be established with the highest possible available bandwidth while certain placement constraints are met. If we assume that the communication bottleneck happens only at the edge links, a much simpler block placement algorithm may be developed, because the available bandwidth of a new traffic flow between two hosts may be predicted from the current traffic only at the edge links. Since the traffic information on the edge links may be analyzed on the host side (e.g. by obtaining port status information from the virtual or physical egress port of the virtual machine or host computer), it may no longer be necessary to get the detailed statistics from the network nodes. The computation on examining different possible paths inside the network may also no longer be needed.

Figure 28:
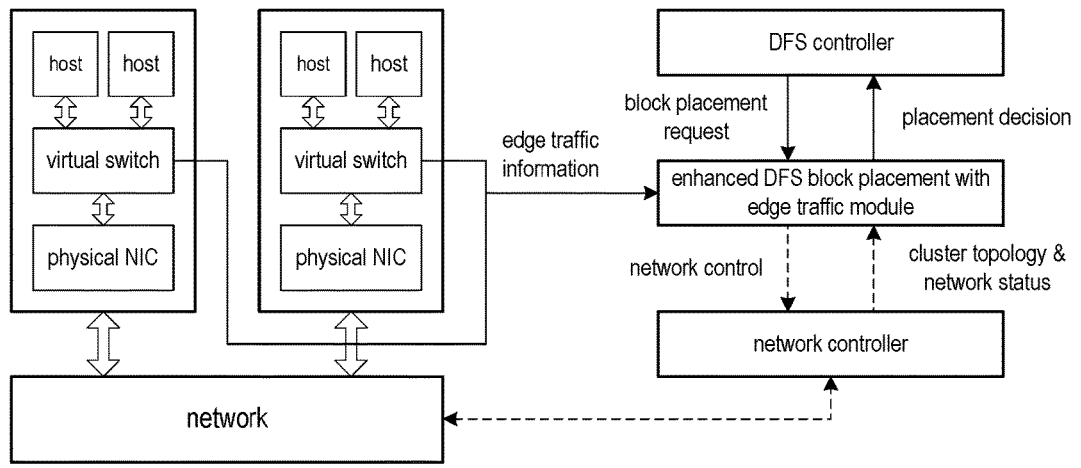
FIG. 28 illustrates a process for block placement decisions using edge traffic information in accordance with aspects of the invention.

FIG. 28 illustrates a system using the edge traffic information to make a block placement decision. In the diagram, the left side is the basic structure of a cluster, and the right side shows the software stack of which each component may run on one or more hosts in the cluster. Virtualization technology may be used so there can be more than one host in one physical machine. In this cluster, it is assumed each host is connected to the network through a virtual switch.

In this system, the virtual switch is capable of monitoring the packets to and from each host to get the edge traffic information which is sent to the enhanced DFS block placement module. The function of generating edge traffic information may also be implemented in a software or hardware module other than virtual switch between the host and its edge network node. For example, edge traffic information may be obtained in the network stack residing on each host. Edge traffic information may include: number of traffic flows, number of active traffic flows, number of traffic flows with a rate or duration greater than a threshold, total bandwidth usage, bandwidth usage per network link, dropped packets, duplicate ACKs, etc.

Upon receiving a block placement request, the enhanced DFS block placement based on edge traffic module (or 'edge module' for short) may make a placement decision based only on the edge traffic information from all hosts. It may also use the information about cluster topology, but it may not use dynamic information such as network status from network nodes in making the placement decision, and it may not configure the network nodes. This is termed the "basic edge algorithm" which will be further explained below. Once the block placement decision has been made using edge traffic information, the edge module may also incorporate additional information, such as cluster topology and network status, from, for example, a network controller to determine and configure the best network path for network traffic associated with the block placement decision. This is termed the "edge algorithm with optimal network path" and will be explained further below.

Given a client "Hc" in a cluster of N hosts each having a storage node function, the basic edge algorithm determines an ordered list of R storage nodes, Hd[i], i=0, ..., R−1, from storage nodes available in a cluster, H[i], i=0, ..., N−1. R is the replication factor. A storage node pipeline, Hc→Hd[0]→ ... →Hd[R−1]→Hd[R−1], is formed for block replication. The selection of the storage nodes is based on the edge traffic information which consists of traffic information on an egress link of each host, Te[i], i=0, ..., N−1, and traffic information on an ingress link of each host, Ti[i], i=0, ..., N−1.

Figure 29:
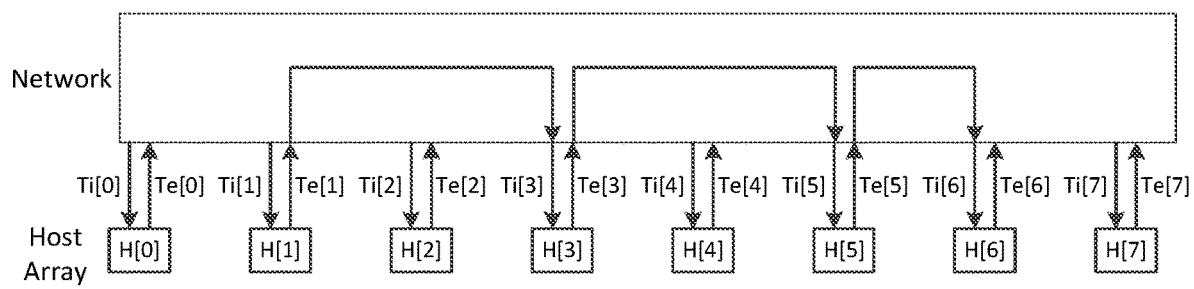
FIG. 29 is a block diagram of an example distributed file system for use in illustrating the process of FIG. 28.

FIG. 29 shows a cluster of 8 hosts used in explaining the basic edge algorithm. As an example, the client runs on host H[1], and it needs to copy a block to three storage nodes. The storage nodes in a candidate pipeline being evaluated are H[3], H[5], and H[6], in this order. The client and storage nodes are all on different hosts. The internal details of the network are not depicted in FIG. 29 since the basic algorithm makes a placement decision based on the edge traffic information from all hosts.

Figure 30:
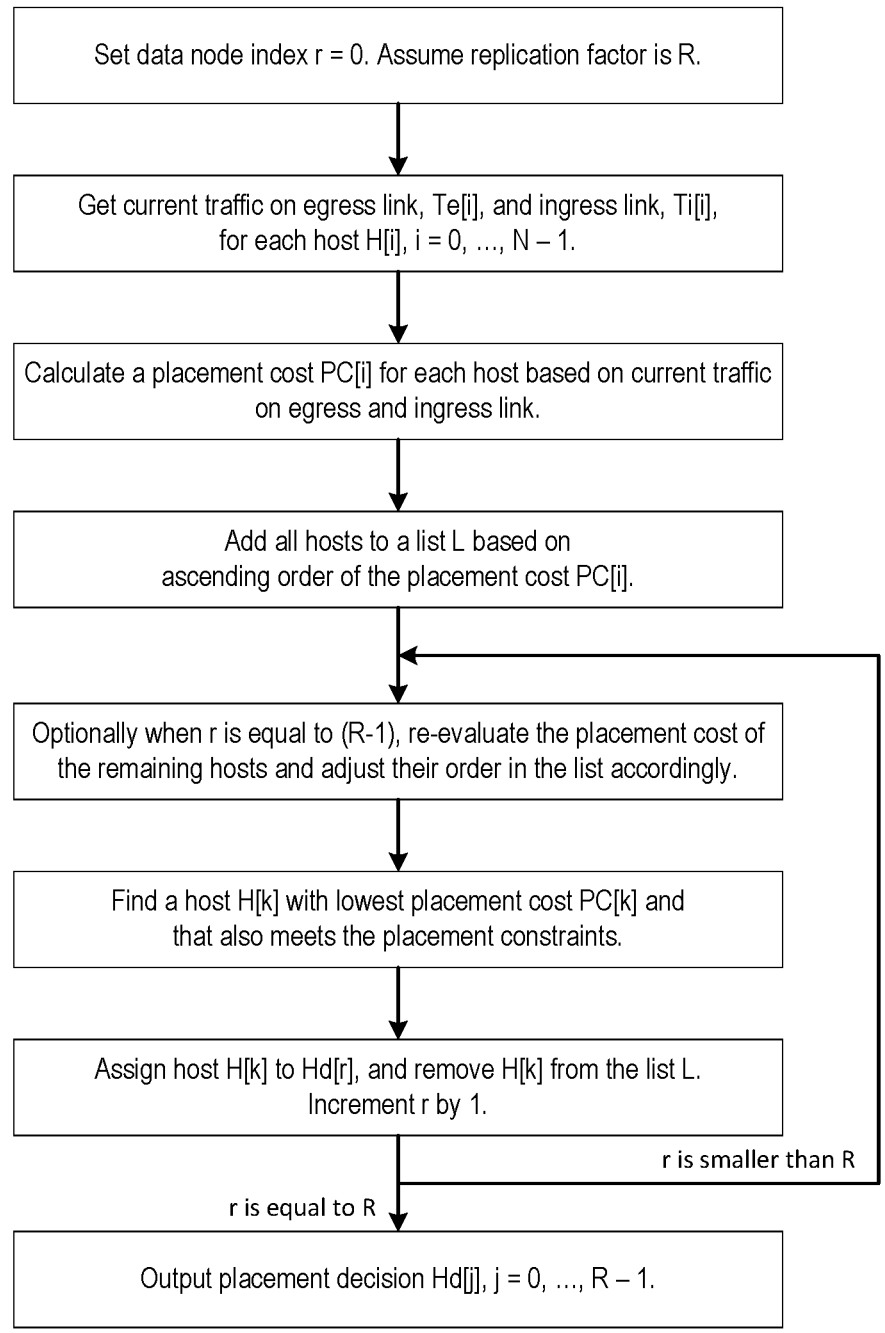
FIG. 30 is a flowchart of process performing an edge rate algorithm in accordance with aspects of the invention.

FIG. 30 is a flowchart of the basic edge algorithm. The algorithm starts with initialization. The number of storage nodes that are to be selected to form the storage node pipeline is equal to the replicator factor "R", and the index of the first storage node to be selected is "r=0". In the next step, the edge traffic information on each egress link, Te[i], and traffic information on each ingress link, Ti[i], is retrieved and a placement cost PC[i] for each host H[i] is calculated. Next, the hosts are added to a list L in ascending order based on placement cost.

In the loop, the basic algorithm picks the hosts to form the storage pipeline. In each iteration, the host having the lowest placement cost among the remaining hosts, and meeting certain constraints, is selected. The selected host will be moved from the original list to a new list, Hd[r], r=0, ... R−1, which consists of the storage nodes that form the storage node pipeline for block replication. The constraint can be an input to the algorithm. For example, if the replication factor is 3, a constraint might be defined as the following: the first storage node in the pipeline must be from a different pod, and last two storage nodes may be from the same rack. The placement cost used in selecting a host as the last storage node in the pipeline may be defined in the same way as the placement cost used in selecting a host as other storage nodes in the pipeline. Optionally the placement cost for the last storage node may be defined differently.

Additional parameters may be used as criteria in selecting the storage node. Such criteria may be used for the calculation of placement cost, or may be applied as a secondary selection criteria only when multiple storage nodes have the same placement cost.

For example, the storage node that has the smallest distance from the previous node in the storage node pipeline may be selected as the next storage node. The distance between two storage nodes may be based on the minimum number of network links a packet is required to traverse from one host to the other host. The distance between two hosts may be derived from the cluster topology.

The placement cost function may be defined as the predicted available bandwidth of a replication pipeline on a network path.

One approach for estimating the available bandwidth of a new traffic flow is to use the number of active flows, or active flow count, on a bottleneck network link on the network path carrying the new traffic flow. Assume that currently there are "n" active flows on this bottleneck link. The available bandwidth for a new flow can be estimated using the following equation.

$$B_{available} = \frac{C_{link}}{n+1}$$

If the active flow count is used in estimating the available bandwidth of a new flow, the traffic information on the egress link of host H[m], Te[m], to be collected is the active flow count AFCe[m], and the traffic information on the ingress link of host H[m], Ti[m], to be collected is the active flow count AFCi[m].

If a storage node will be used as one intermediate node, which is not the last node in the pipeline, on the replication pipeline, the available bandwidth will be determined by the larger one of AFCe[m] and AFCi[m], so the cost function may be defined in the following equation assuming all the edge links have the same link capacity in both directions.

PC[$m$]=max(AFC$i$[$m$],AFC$e$[$m$])

In one implementation, the last storage node for the replication pipeline is selected using the same cost function as previous storage nodes in the replication pipeline.

Alternatively, since the last storage node will only have data coming in at its ingress link for this replication pipeline, the cost function calculated for each host when selecting the last storage node, PCL[m] may be the following:

PCL[$m$]=AFC$i$[$m$]

In some networks, the edge links may have different link capacities. The link capacity of egress link of host H[m] may be designated as Ce[m] and that of ingress link of host H[m] may designated as Ci[m]. The cost functions may be defined alternatively as follows.

$$PC[m] = \max\left(\frac{AFCi[m]+1}{Ci[m]}, \frac{AFCe[m]+1}{Ce[m]}\right)$$

Similarly the cost function of the last storage node to be selected may be alternatively defined based on the number of active flows on the ingress link and the ingress link capacity.

$$PCL[m] = \frac{AFCi[m] + 1}{Ci[m]}$$

In the above procedure, the traffic information at the egress link of the client is not considered. This may be used for situations when the traffic information on the egress link of the client may not be readily available. For example, the client may be located outside of the cluster.

However, if the traffic information at the egress link of the client is available, it may be used in the process of selecting a storage node, for example, by creating an additional placement constraint used in the procedure described in FIG. 30. A Placement Cost Reference, PCR[c] in which the index "c" corresponds to a particular client, may be defined based on the traffic information of a client. PCR[c] is used in helping select the storage nodes that are to be evaluated. For example, only a storage node whose placement cost function falls within a range will be selected if such storage node is available. In the following formulae, l and h defines such a range.

$l \cdot PCR[c] < PC[m] < h \cdot PCR[c]$

In an implementation, if the placement cost of a storage node is defined based on the active flow counts, the placement cost reference of a client may be defined based on the active flow count at the egress link of the client.

PCR[c]=AFCe[c]

For example, if l is set to 0.5 and h is set to 2, only the storage nodes whose cost function falls within the range (0.5·AFCe[c], 2·AFCe[c]) may be evaluated using the procedure describe in FIG. 30.

If an insufficient number of storage nodes meet this additional constraint, then a storage node may be selected based on the original procedure without the use of this constraint.

In the basic edge algorithm, it is not necessary to read the network status from the network nodes or configure the network nodes.

Figure 31:
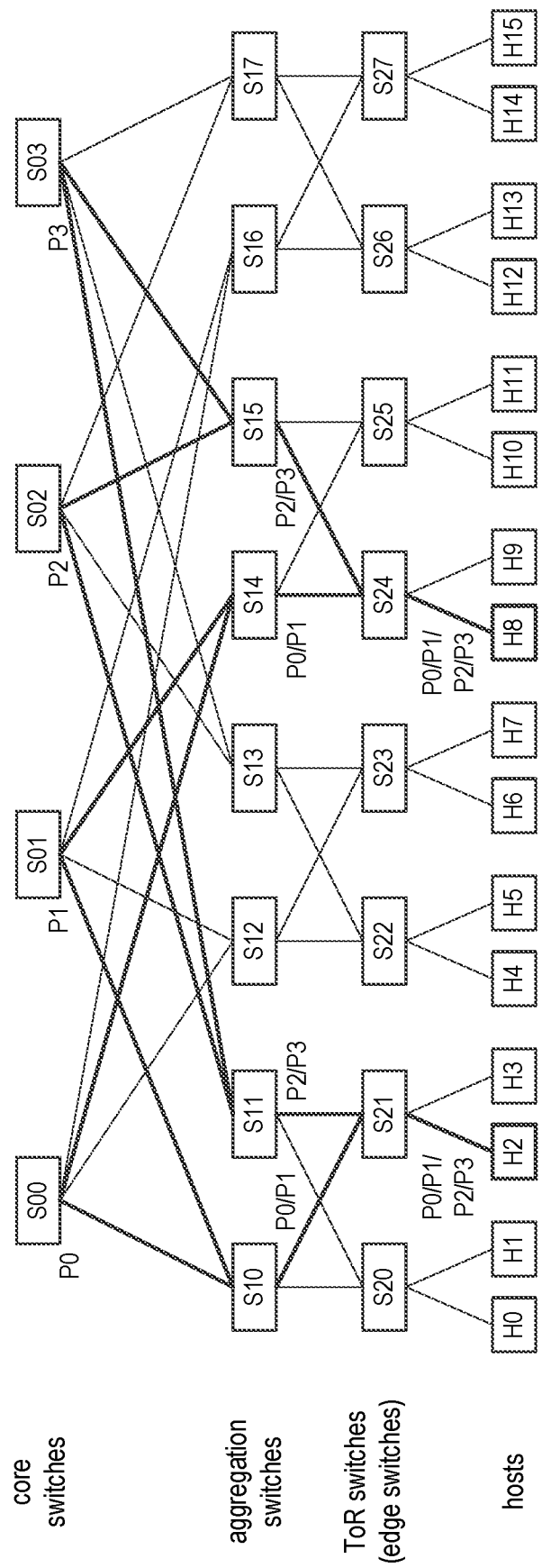
FIG. 31 is a block diagram of an example distributed file system for use in illustrating the process of FIG. 30.

There often exist multiple network paths for a replication pipeline. FIG. 31 shows an example that multiple paths exist between two storage nodes H2 and H8 in a cluster with a K-4 fat-tree network. If the network has the capability of reporting the network status from the network nodes and allowing the configuration of the network nodes, the algorithm may be improved by selecting the optimal network path for the replication pipeline formed with the storage nodes that are selected in the edge traffic based block placement.

After the block placement decision is made based on the edge traffic information, a storage node pipeline is formed as Hc→Hd[0]→ . . . →Hd[R−2]→Hd[R−1], in which R is the replication factor. In this storage node pipeline, each pair of storage nodes forms one stage of the pipeline. The first pair, Hc and Hd[0], forms the first stage. The next pair, Hd[0] and Hd[1], form the second stage, and so on. The following steps may be performed to find the best network path for this storage node replication pipeline.

1. Read the network traffic information from all network nodes.
2. Starting from the first stage of the storage node pipeline, predict the available bandwidth for a new traffic flow on each possible network path between the pair of storage nodes in one stage of pipeline. Find the best network path which has the maximum predicted available bandwidth.
3. Repeat step 2 to find the best network path between the pair of the storage nodes for all remaining stages.
4. Program the forwarding rules in the network nodes so that the replication data will be forwarded on these best network paths.

In step 2, the flow count may be used in predicting the available bandwidth. Alternatively, the best network path may be selected by determining the network path whose bottleneck link (e.g. the link having the most number of flows in a stage, or in the storage node replication pipeline) has the least number of active flows.

So far the edge traffic associated with a host is used in calculating the placement cost of that host. This can be referred to as scalar placement cost. One improvement is to calculate an adjusted placement cost (or 'APC') of a host further considering the traffic information of the neighboring hosts, as follows:

$$\begin{bmatrix} APC[0] \\ APC[1] \\ \ldots \\ APC[N-1] \end{bmatrix} = G \cdot \begin{bmatrix} PC[0] \\ PC[1] \\ \ldots \\ PC[N-1] \end{bmatrix}$$

In this equation, the APC of each host is a linear combination of the set of PCs. Each PC may be determined through methods previously described above. The linear combination is calculated by multiplying the vector {PC[0] . . . PC[N−1]} by matrix G. Matrix G describes the relative contribution of all N PCs to each APC.

The following is an example of the matrix G for the K-4 fat-tree network (i.e. 4 pods, 8 racks, 16 hosts) in FIG. 31, in which both P and Q are 4×4 block matrices.

$$G = \begin{bmatrix} P & Q & Q & Q \\ Q & P & Q & Q \\ Q & Q & P & Q \\ Q & Q & Q & P \end{bmatrix}$$

The following is an example of a block matrix P. In this example, the weight of the placement cost of a host in the same rack (i.e. ¼) is larger than the weight of the placement cost of a host in the same pod, but different rack (i.e. ⅛).

$$P = \begin{bmatrix} 1/2 & 1/4 & 1/8 & 1/8 \\ 1/4 & 1/2 & 1/8 & 1/8 \\ 1/8 & 1/8 & 1/2 & 1/4 \\ 1/8 & 1/8 & 1/4 & 1/2 \end{bmatrix}$$

In one implementation, block matrix Q can be a zero matrix. A zero Q matrix means that the adjustment of the placement cost for a host does not take into consideration the active flows of the hosts outside of the pod.

When all edge links have the same link capacities, the placement cost may be calculated using the active flow count. The adjusted placement cost in this scenario, may be considered an adjusted active flow count (AAFC) and calculated, in a fashion similar to APC above, by using the following equation:

$$\begin{bmatrix} AAFC[0] \\ AAFC[1] \\ ... \\ AAFC[N-1] \end{bmatrix} = G \cdot \begin{bmatrix} AFC[0] \\ AFC[1] \\ ... \\ AFC[N-1] \end{bmatrix}$$

The foregoing systems and methods and associated devices and modules are susceptible to many variations. Additionally, for clarity and concision, many descriptions of the systems and methods have been simplified. For example, the figures generally illustrate one (or a small number) of each type of device, but a system may have many of each type of device.

As described herein, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A network path determination module comprising:
a first port;
a non-transitory storage medium; and
a processor coupled to the non-transitory storage medium, configured at least to:
 receive, through the first port, a request, generated by a detected data flow to create a forwarding entry in a network node for the data flow;
 retrieve a current network topology and a network status;
 generate a list of network paths that meets a current placement policy and satisfies a current quality of service (QoS) requirement;
 evaluate a cost function for each of the list of network paths based on a predicted bandwidth for a new flow in relation to the current network topology and a cost of the new flow in relation to the current network topology at least by:
  obtaining flow information for flows of network nodes within the current network topology;
  determining a subset of active flows from the flow information as one or more candidate network paths for the new flow;
  calculating an available bandwidth for each of the one or more candidate network paths for the new flow;
  calculating a predicted bandwidth consumption (PBC) of each of the one or more candidate network paths for the new flow; and
  evaluating the cost function based on the PBC;
 select a network path having a minimum cost based on the cost function that has been evaluated;
 generate a network control instruction based on the network path which has been selected; and
 execute the network control instruction to forward the data flow on the network path.

2. The network path determination module of claim 1, wherein the processor configured to calculate the predicted bandwidth consumption (PBC) of each of the one or more candidate network paths for the new flow comprising:
calculate the PBC of the new flow as the available bandwidth when the current bandwidth consumption (CBC) of the new flow is greater than the available bandwidth.

3. The network path determination module of claim 1, wherein the processor configured to calculate the predicted bandwidth consumption (PBC) of each of the one or more candidate network paths for the new flow comprising:
calculate the PBC of the new flow as the current bandwidth consumption (CBC) of the new flow when the current bandwidth consumption (CBC) of the new flow is less than or equal to the available bandwidth.

4. The network path determination module of claim 1, wherein the processor configured to calculate the available bandwidth comprising:
subtracting a sum of the current bandwidth consumption (CBC) of flows carried by a path used by a new flow having a remote constraint from a capacity of the path; and
dividing the difference by the number of flows carried by the path plus one minus a quantity of flows carried by the path having a remote constraint.

5. The network path determination module of claim 4, wherein the remote constraint is a throughput constraint of each flow of another path other than the path used by the new flow.

6. The network path determination module of claim 1, wherein the processor is configured to determine a subset of active flows from the flow information comprising:
determine, the subset of active flows from a plurality of flows contained within the flow information by comparing a current bandwidth consumption (CBC) of each flow of the plurality of flows to a threshold.

7. The network path determination module of claim 1 further comprising a second port which is used to transmit the network control instruction to another switch within the current network topology.

8. A method of determining a network path used by a network path determination module, the method comprising:
receiving a request generated by a detected data flow to create a forwarding entry in a network node for the data flow;
retrieving a current network topology and a network status;
generating a list of network paths that meets a current placement policy and satisfies a current quality of service (QoS) requirement;
evaluating a cost function for each of the list of network paths based on a predicted bandwidth for a new flow in relation to the current network topology and a cost of the new flow in relation to the current network topology at least by:
obtaining flow information for flows of network nodes within the current network topology;
determining a subset of active flows from the flow information as one or more candidate network paths for the new flow;
calculating an available bandwidth for each of the one or more candidate network paths for the new flow;
calculating a predicted bandwidth consumption (PBC) of each of the one or more candidate network paths for the new flow; and
evaluating the cost function based on the PBC;
selecting a network path having a minimum cost based on the cost function that has been evaluated;
generating a network control instruction based on the network path which has been selected; and
executing the network control instruction to forward the data flow on the network path.

9. The method of claim 8, wherein calculating the predicted bandwidth consumption (PBC) of each of the one or more candidate network paths for the new flow comprising:
calculating the PBC of the new flow as the available bandwidth when the current bandwidth consumption (CBC) of the new flow is greater than the available bandwidth.

10. The method of claim 8, wherein calculating the predicted bandwidth consumption (PBC) of each of the one or more candidate network paths for the new flow comprising:
calculating the PBC of the new flow as the current bandwidth consumption (CBC) of the new flow when the current bandwidth consumption (CBC) of the new flow is less than or equal to the available bandwidth.

11. The method of claim 8, wherein calculating the available bandwidth comprising:
subtracting a sum of the current bandwidth consumption (CBC) of flows carried by a path used by a new flow having a remote constraint from a capacity of the path; and
dividing the difference by the number of flows carried by the path plus one minus a quantity of flows carried by the path having a remote constraint.

12. The method of claim 11, wherein the remote constraint is a throughput constraint of each flow of another path other than the path used by the new flow.

13. The method of claim 8, wherein determining a subset of active flows from the flow information comprising:
determining the subset of active flows from a plurality of flows contained within the flow information by comparing a current bandwidth consumption (CBC) of each flow of the plurality of flows to a threshold.

14. A non-transitory storage medium comprising a plurality of computer readable instructions to be loaded into a processor of a network path determination module, the computer readable instructions cause the processor to implement functions comprising:
receiving a request generated by a detected data flow to create a forwarding entry in a network node for the data flow;
retrieving a current network topology and a network status;
generating a list of network paths that meets a current placement policy and satisfies a current quality of service (QoS) requirement;
evaluating a cost function for each of the list of network paths based on a predicted bandwidth for a new flow in relation to the current network topology and a cost of the new flow in relation to the current network topology at least by:
obtaining flow information for flows of network nodes within the current network topology;
determining a subset of active flows from the flow information as one or more candidate network paths for the new flow;
calculating an available bandwidth for each of the one or more candidate network paths for the new flow;
calculating a predicted bandwidth consumption (PBC) of each of the one or more candidate network paths for the new flow; and
evaluating the cost function based on the PBC;

selecting a network path having a minimum cost based on the cost function that has been evaluated;
generating a network control instruction based on the network path which has been selected; and
executing the network control instruction to forward the data flow on the network path.

\* \* \* \* \*